(12) United States Patent
Evans et al.

(10) Patent No.: US 10,179,446 B2
(45) Date of Patent: *Jan. 15, 2019

(54) METHODS FOR ADDITIVELY MANUFACTURING COMPOSITE PARTS

(71) Applicant: The Boeing Company, Chicago, IL (US)

(72) Inventors: Nick S. Evans, Lynnwood, WA (US); Faraón Torres, Seattle, WA (US); Ryan G. Ziegler, Mill Creek, WA (US); Samuel F. Harrison, Bothell, WA (US); Ciro J. Grijalva, III, Seattle, WA (US); Hayden S. Osborn, Seattle, WA (US)

(73) Assignee: The Boeing Company, Chicago, IL (US)

(*) Notice: Subject to any disclaimer, the term of this patent is extended or adjusted under 35 U.S.C. 154(b) by 119 days.

This patent is subject to a terminal disclaimer.

(21) Appl. No.: 15/063,417

(22) Filed: Mar. 7, 2016

(65) Prior Publication Data

US 2017/0028588 A1 Feb. 2, 2017

Related U.S. Application Data

(60) Provisional application No. 62/199,665, filed on Jul. 31, 2015.

(51) Int. Cl.
*B29C 67/00* (2017.01)
*B33Y 70/00* (2015.01)
(Continued)

(52) U.S. Cl.
CPC .............. *B33Y 70/00* (2014.12); *B05D 1/265* (2013.01); *B05D 1/34* (2013.01); *B05D 3/06* (2013.01);
(Continued)

(58) Field of Classification Search
CPC .............................. B29C 64/165; B33Y 70/00
See application file for complete search history.

(56) References Cited

U.S. PATENT DOCUMENTS

| 3,600,272 A | 8/1971 | Cortigene et al. |
| 3,813,976 A | 6/1974 | Greer |

(Continued)

FOREIGN PATENT DOCUMENTS

| CN | 103817937 | 5/2014 |
| DE | 201310103973 | 10/2014 |

(Continued)

OTHER PUBLICATIONS

European Patent Office, Extended European Search Report for related European patent application EP 16 16 8652, dated Dec. 15, 2016.

(Continued)

*Primary Examiner* — Galen H Hauth
(74) *Attorney, Agent, or Firm* — DASCENZO Intellectual Property Law, P.C.

(57) ABSTRACT

A method of additively manufacturing a composite part comprises applying a thermosetting resin to a non-resin component to create a continuous flexible line by pulling a non-resin component through a first resin-part applicator, in which a first quantity of a first part of the thermosetting resin is applied to the non-resin component, and by pulling a non-resin component through a second resin-part applicator, in which a second quantity of a second part of the thermosetting resin is applied to at least a portion of the first quantity of the first part of the thermosetting resin, applied to the non-resin component. The method further comprises routing the continuous flexible line into a delivery guide and depositing, via the delivery guide, a segment of the continuous flexible line along a print path.

43 Claims, 33 Drawing Sheets

(51) Int. Cl.

| | | |
|---|---|---|
| *B29C 69/00* | (2006.01) | |
| *B29C 70/28* | (2006.01) | |
| *B05D 1/26* | (2006.01) | |
| *B05D 1/34* | (2006.01) | |
| *B05D 3/06* | (2006.01) | |
| *B05D 3/12* | (2006.01) | |
| *B29C 35/16* | (2006.01) | |
| *B29C 70/16* | (2006.01) | |
| *B29C 70/38* | (2006.01) | |
| *B29C 70/54* | (2006.01) | |
| *C09D 5/00* | (2006.01) | |
| *B29B 11/00* | (2006.01) | |
| *B29B 11/16* | (2006.01) | |
| *C09D 201/00* | (2006.01) | |
| *B29C 47/00* | (2006.01) | |
| *B29C 64/106* | (2017.01) | |
| *B29K 105/00* | (2006.01) | |
| *B33Y 10/00* | (2015.01) | |
| *B29L 31/30* | (2006.01) | |
| *B29L 31/00* | (2006.01) | |
| *B33Y 30/00* | (2015.01) | |
| *B33Y 40/00* | (2015.01) | |
| *B29K 63/00* | (2006.01) | |
| *B29K 105/08* | (2006.01) | |
| *B29K 105/10* | (2006.01) | |
| *B33Y 50/02* | (2015.01) | |
| *B29K 101/10* | (2006.01) | |
| *B29K 105/12* | (2006.01) | |
| *B29C 35/08* | (2006.01) | |
| *B29K 105/06* | (2006.01) | |
| *B29C 64/135* | (2017.01) | |
| *B29C 64/129* | (2017.01) | |
| *B29C 64/25* | (2017.01) | |

(52) U.S. Cl.
CPC ............ *B05D 3/067* (2013.01); *B05D 3/068* (2013.01); *B05D 3/12* (2013.01); *B29B 11/00* (2013.01); *B29B 11/16* (2013.01); *B29C 35/16* (2013.01); *B29C 47/0002* (2013.01); *B29C 64/106* (2017.08); *B29C 69/001* (2013.01); *B29C 70/16* (2013.01); *B29C 70/28* (2013.01); *B29C 70/38* (2013.01); *B29C 70/545* (2013.01); *C09D 5/00* (2013.01); *C09D 201/00* (2013.01); *B29C 35/0805* (2013.01); *B29C 64/129* (2017.08); *B29C 64/135* (2017.08); *B29C 64/25* (2017.08); *B29C 2035/0822* (2013.01); *B29C 2035/0827* (2013.01); *B29C 2035/0833* (2013.01); *B29C 2035/0838* (2013.01); *B29C 2035/0844* (2013.01); *B29K 2063/00* (2013.01); *B29K 2101/10* (2013.01); *B29K 2105/0058* (2013.01); *B29K 2105/06* (2013.01); *B29K 2105/0872* (2013.01); *B29K 2105/10* (2013.01); *B29K 2105/101* (2013.01); *B29K 2105/12* (2013.01); *B29K 2105/25* (2013.01); *B29K 2105/253* (2013.01); *B29K 2995/005* (2013.01); *B29L 2031/00* (2013.01); *B29L 2031/3076* (2013.01); *B33Y 10/00* (2014.12); *B33Y 30/00* (2014.12); *B33Y 40/00* (2014.12); *B33Y 50/02* (2014.12)

(56) References Cited

U.S. PATENT DOCUMENTS

| | | | |
|---|---|---|---|
| 4,154,634 A | | 5/1979 | Shobert et al. |
| 4,378,343 A | | 3/1983 | Sugiura et al. |
| 4,435,246 A | | 3/1984 | Green |
| 4,943,472 A | | 7/1990 | Dyksterhouse et al. |
| 5,204,124 A | * | 4/1993 | Secretan ............... B29C 64/124 425/145 |
| 5,294,461 A | | 3/1994 | Ishida |
| 5,340,433 A | * | 8/1994 | Crump ................... B22F 3/115 118/202 |
| 5,398,193 A | | 3/1995 | deAngelis |
| 5,495,328 A | * | 2/1996 | Spence ................. G01J 1/4257 356/121 |
| 5,936,861 A | * | 8/1999 | Jang ...................... B29C 70/384 700/98 |
| 6,129,872 A | | 10/2000 | Jang |
| 6,149,856 A | | 11/2000 | Zemel et al. |
| 6,214,279 B1 | | 4/2001 | Yang et al. |
| 6,395,210 B1 | | 5/2002 | Head et al. |
| 6,722,872 B1 | | 4/2004 | Swanson et al. |
| 7,114,943 B1 | | 10/2006 | Fong et al. |
| 8,133,537 B2 | | 3/2012 | Nair et al. |
| 8,801,990 B2 | | 8/2014 | Mikulak et al. |
| 8,920,697 B2 | | 12/2014 | Mikulak et al. |
| 9,149,989 B2 | * | 10/2015 | Uckelmann ......... A61C 13/0018 |
| 2003/0044593 A1 | | 3/2003 | Vaidyanathan et al. |
| 2004/0119188 A1 | * | 6/2004 | Lowe ...................... B29C 70/50 264/131 |
| 2005/0023719 A1 | | 2/2005 | Nielsen et al. |
| 2005/0038222 A1 | | 2/2005 | Joshi et al. |
| 2005/0104241 A1 | | 5/2005 | Kritchman et al. |
| 2005/0116391 A1 | | 6/2005 | Lindemann et al. |
| 2005/0248065 A1 | * | 11/2005 | Owada ................. B29C 64/106 264/494 |
| 2007/0029030 A1 | | 2/2007 | McCowin |
| 2008/0213419 A1 | * | 9/2008 | Skubic ................ B29C 47/0806 425/113 |
| 2008/0315462 A1 | | 12/2008 | Batzinger et al. |
| 2009/0095410 A1 | | 4/2009 | Oldani |
| 2009/0130449 A1 | | 5/2009 | El-Siblani |
| 2009/0314391 A1 | | 12/2009 | Crump et al. |
| 2010/0024964 A1 | | 2/2010 | Ingram, Jr. et al. |
| 2010/0084087 A1 | | 4/2010 | McCowin et al. |
| 2010/0190005 A1 | | 7/2010 | Nair et al. |
| 2011/0147993 A1 | | 6/2011 | Eshed et al. |
| 2011/0300301 A1 | | 12/2011 | Fernando et al. |
| 2014/0061974 A1 | | 3/2014 | Tyler |
| 2014/0086780 A1 | | 3/2014 | Miller et al. |
| 2014/0154347 A1 | | 6/2014 | Dilworth et al. |
| 2014/0263534 A1 | | 9/2014 | Post et al. |
| 2014/0265000 A1 | | 9/2014 | Magnotta et al. |
| 2014/0265040 A1 | | 9/2014 | Batchelder |
| 2014/0291886 A1 | | 10/2014 | Mark et al. |
| 2014/0328964 A1 | | 11/2014 | Mark et al. |
| 2014/0375794 A1 | | 12/2014 | Singh |
| 2015/0008422 A1 | | 1/2015 | Lee et al. |
| 2015/0037599 A1 | | 2/2015 | Blackmore |
| 2015/0044377 A1 | | 2/2015 | Tibor et al. |
| 2015/0048553 A1 | | 2/2015 | Dietrich et al. |
| 2015/0140230 A1 | * | 5/2015 | Jones ..................... B23P 23/04 427/532 |
| 2015/0165691 A1 | | 6/2015 | Mark et al. |
| 2015/0174824 A1 | | 6/2015 | Gifford et al. |
| 2015/0217517 A1 | | 8/2015 | Karpas et al. |
| 2015/0266243 A1 | | 9/2015 | Mark et al. |
| 2015/0291833 A1 | | 10/2015 | Kunc et al. |
| 2016/0136897 A1 | * | 5/2016 | Nielsen-Cole ......... B33Y 30/00 425/131.1 |
| 2016/0159009 A1 | | 6/2016 | Canale |
| 2016/0303793 A1 | | 10/2016 | Ermoshkin et al. |
| 2016/0332363 A1 | * | 11/2016 | Moore ................. B29C 65/1412 |
| 2017/0129180 A1 | | 5/2017 | Coates et al. |

FOREIGN PATENT DOCUMENTS

| | | |
|---|---|---|
| DE | 102015002967 | 10/2016 |
| EP | 1151849 | 11/2001 |
| JP | 2015174284 | 10/2015 |
| WO | WO 2006/020685 | 2/2006 |
| WO | WO 2012/039956 | 3/2012 |
| WO | WO 2013/086577 | 6/2013 |

(56) References Cited

FOREIGN PATENT DOCUMENTS

| WO | WO 2014/153535 | 9/2014 |
|---|---|---|
| WO | WO 2015/009938 | 1/2015 |
| WO | WO2015193819 | 12/2015 |
| WO | WO 2016/053681 | 4/2016 |
| WO | WO 2016125138 | 8/2016 |
| WO | WO 2016139059 | 9/2016 |
| WO | WO2016149181 | 9/2016 |

OTHER PUBLICATIONS

Printout of online article, "Improving Additive Manufacturing (3D Printing) using Infrared Imaging," Aug. 10, 2016, from AZoM.com website, downloaded on Nov. 4, 2016.

Website screenshots showing Stratonics ThermaViz® Sensor Systems, from Stratonics.com website, downloaded on Nov. 4, 2016.

Farshidianfar et al., "Real-Time Control of Microstructure in Laser Assitive Manufacturing," International Journal of Advanced Manufacturing Technology (2016), vol. 82, pp. 1173-1186, published online Jul. 1, 2015.

Hu et al., "Sensing, Modeling and Control for Laser-Based Additive Manufacturing," International Journal of Machine Tools and Manufacture, No. 43, pp. 51-60, 2003.

Ogale et al., "Fabrication of Fiber Reinforced Plates with Curvilinear Layout by 3-D Photolithography," 26$^{th}$ International SAMPE Technical Conference, vol. 26, pp. 54-61, Oct. 17-20, 1994.

Ogale et al., "3-Dimensional Composite Photolithography," Proceedings of the American Society for Composites, Eleventh Technical Conference, pp. 822-828, Oct. 7-9, 1996.

Renault et al., "Photo Dynamic Mechanical Analysis for Cure Monitoring of Fiber Reinforced Photoresin Composites," Journal of Advanced Materials, vol. 29, No. 1, pp. 42-47, Oct. 12, 1996.

Gupta et al., "Dual Curing of Carbon Fiber Reinforced Photoresins for Rapid Prototyping," Polymer Composites, vol. 23, No. 6, pp. 1162-1170, Dec. 2002.

Website screenshots showing "Fiber Composite 3D Printing," downloaded from makezine.com/2014/11/05/fiber-composite-3d-printing/, Jun. 2, 2015.

User Manual for 3Doodler 2.0, downloaded from the3doodler.com/manuals/, Aug. 19, 2015.

Website article "Automated Fiber Placement," downloaded from automateddynamics.com/article/thermoplastic-composite-basics/processing-methods/automated-fiber-placement, Aug. 19, 2015.

Website screenshots showing abstract of Debout et al., "Tool Path Smoothing of a Redundant Machine: Application to Automated Fiber Placement," Computer-Aided Design, vol. 43, Issue 2, pp. 122-132, Feb. 2011, downloaded from sciencedirect.com/science/article/pii/S0010448510001788, Aug. 19, 2015.

Website screenshots showing The Mark One Composite 3D Printer, downloaded from markforged.com/mark-one/, Aug. 19, 2015.

Website article "Carbon-Fiber Epoxy Honeycombs Mimic the Material Performance of Balsa Wood," Jun. 27, 2014, downloaded from redorbit.com/news/science/1113180114/carbon-fiber-epoxy-honeycombs-mimic-the-material-performance-of-balsa-wood/, Aug. 19, 2015.

Website screenshots showing Krassenstein "Orbital Composites to Make 3D Printing 100 Times Faster Using Carbon Fiber, Fiber Optics, Injection & More," Apr. 28, 2015, downloaded from 3dprint.com160662/orbital-composites/, Aug. 19, 2015.

Website article "Carbon3D Introduces Breakthrough Clip Technology for Layerless 3D Printing, 25-100x Faster," Mar. 17, 2015, downloaded from 3ders.org/articles/20150317-carbon3d-introduces-breakthrough-clip-technology-for-layerless-3d-printing.html, Aug. 19, 2015.

Website screenshots showing The Form 1+ SLA 3D Printer, downloaded from formlabs.com/products/form-1-plus/, Aug. 20, 2015.

Formlabs, Frequently Asked Questions (re the Form1+ SLA 3D Printer), downloaded from formlabs.com/support/faq/, Aug. 19, 2015.

Website screenshots showing "Fiber Composite 3D Printing (The Bug)," downloaded from instructables.com/id/Fiber-Composite-3D-Printing-The-Bug/?ALLSTEPS, Aug. 20, 2015.

Screenshots of online article, Evan Milberg, "Arevo Labs Introduces First Robot-Based Platform for 3-D Printing Composite Parts," Composites Manufacturing Magazine website, Nov. 23, 2015, downloaded from compositesmanufacturingmagazine.com/2015/11/arevo-labs-introduces-first-robot-based-platform-for-3-d-printing-composite-parts/ on Jan. 12, 2016.

Printout of online article, Jeff Sloan, "Arevo Labs launches 3D printing platform for composite parts fabrication," CompositesWorld website, Nov. 16, 2015, downloaded from compositesworld.com/products/arevo-labs-launches-3D-printing-platform-for-composite-parts-fabrication on Dec. 9, 2015.

Machine generated English translation of abstract for DE 201310103973 downloaded from Espacenet.com dated Nov. 1, 2017.

Machine generated English translation of the abstract of JP2015174284, downloaded from Espacenet.com dated Jun. 12, 2018.

Machine generated English translation of the abstract of DE102015002967, downloaded from Espacenet.com dated Jun. 12, 2018.

Machine generated English translation of CN 103817937, dated Mar. 26, 2018.

\* cited by examiner (CONT.)

```
┌─────────────────────────────────────────────────────────────────────────────────┐ ┌─418
│ THE NON-RESIN COMPONENT (108) COMPRISES ONE OR MORE OF A FIBER, A CARBON FIBER, │
│ A GLASS FIBER, A SYNTHETIC ORGANIC FIBER, AN ARAMID FIBER, A NATURAL FIBER, A   │
│ WOOD FIBER, A BORON FIBER, A SILICON-CARBIDE FIBER, AN OPTICAL FIBER, A FIBER   │
│ BUNDLE, A FIBER TOW, A FIBER WEAVE, A WIRE, A METAL WIRE, A CONDUCTIVE WIRE,    │
│                            OR A WIRE BUNDLE                                     │
└─────────────────────────────────────────────────────────────────────────────────┘
```

┌─424

WHILE ADVANCING THE CONTINUOUS FLEXIBLE LINE (106) TOWARD THE PRINT PATH (122), DELIVERING A PREDETERMINED OR ACTIVELY DETERMINED AMOUNT OF CURING ENERGY (118) AT LEAST TO A PORTION (124) OF THE SEGMENT (120) OF THE CONTINUOUS FLEXIBLE LINE (106) AT A CONTROLLED RATE AFTER THE SEGMENT (120) OF THE CONTINUOUS FLEXIBLE LINE (106) IS DEPOSITED ALONG THE PRINT PATH (122) TO AT LEAST PARTIALLY CURE AT LEAST THE PORTION (124) OF THE SEGMENT (120) OF THE CONTINUOUS FLEXIBLE LINE (106)

PARTIALLY CURING A FIRST LAYER (140) OF THE SEGMENT (120) OF THE CONTINUOUS FLEXIBLE LINE (106) AS THE FIRST LAYER (140) IS BEING DEPOSITED AND FURTHER CURING THE FIRST LAYER (140) AS A SECOND LAYER (142) IS BEING DEPOSITED AGAINST THE FIRST LAYER (140) ─426

PARTIALLY CURING A FIRST LAYER (140) OF THE SEGMENT (120) OF THE CONTINUOUS FLEXIBLE LINE (106) AS THE FIRST LAYER (140) IS BEING DEPOSITED AND FULLY CURING THE FIRST LAYER (140) AS A SECOND LAYER (142) IS BEING DEPOSITED AGAINST THE FIRST LAYER (140) ─428

CURING LESS THAN AN ENTIRETY OF THE COMPOSITE PART (102) ─430

RESTRICTIVELY CURING AT LEAST A PORTION OF THE COMPOSITE PART (102) ─432

THE PORTION OF THE COMPOSITE PART (102) IS RESTRICTIVELY CURED TO FACILITATE SUBSEQUENT PROCESSING OF THE PORTION ─434

SELECTIVELY VARYING AT LEAST ONE OF A DELIVERY RATE OR A DELIVERY DURATION OF THE CURING ENERGY (118) TO IMPART VARYING PHYSICAL CHARACTERISTICS TO THE COMPOSITE PART (102) ─436

THE VARYING PHYSICAL CHARACTERISTICS INCLUDE AT LEAST ONE OF STRENGTH, STIFFNESS, FLEXIBILITY, DUCTILITY, OR HARDNESS ─438

┌─440

SIMULTANEOUSLY WITH DELIVERING THE PREDETERMINED OR ACTIVELY DETERMINED AMOUNT OF THE CURING ENERGY (118) AT LEAST TO THE PORTION (124) OF THE SEGMENT (120) OF THE CONTINUOUS FLEXIBLE LINE (106) AT THE CONTROLLED RATE, AT LEAST PARTIALLY PROTECTING AT LEAST THE PORTION (124) OF THE SEGMENT (120) OF THE CONTINUOUS FLEXIBLE LINE (106) FROM ENVIRONMENTAL EXPOSURE AFTER THE SEGMENT (120) EXITS A DELIVERY GUIDE (112)

AT LEAST THE PORTION (124) OF THE SEGMENT (120) OF THE CONTINUOUS FLEXIBLE LINE (106) IS AT LEAST PARTIALLY PROTECTED FROM THE ENVIRONMENTAL EXPOSURE WITH A SHIELDING GAS (221) ─442

```
┌─ 524
│ WHILE ADVANCING THE CONTINUOUS FLEXIBLE LINE (106) TOWARD THE PRINT PATH (122), DELIVERING A
│ PREDETERMINED OR ACTIVELY DETERMINED AMOUNT OF CURING ENERGY (118) AT LEAST TO A
│ PORTION (124) OF THE SEGMENT (120) OF THE CONTINUOUS FLEXIBLE LINE (106) AT A CONTROLLED RATE
│ AFTER THE SEGMENT (120) OF THE CONTINUOUS FLEXIBLE LINE (106) IS DEPOSITED ALONG THE PRINT
│ PATH (122) TO AT LEAST PARTIALLY CURE AT LEAST THE PORTION (124) OF
│ THE SEGMENT (120) OF THE CONTINUOUS FLEXIBLE LINE (106)
│  ┌─ 526
│  │ PARTIALLY CURING A FIRST LAYER (140) OF THE SEGMENT (120) OF THE CONTINUOUS FLEXIBLE
│  │ LINE (106) AS THE FIRST LAYER (140) IS BEING DEPOSITED AND FURTHER CURING THE FIRST
│  │ LAYER (140) AS A SECOND LAYER (142) IS BEING DEPOSITED AGAINST THE FIRST LAYER (140)
│  ┌─ 528
│  │ PARTIALLY CURING A FIRST LAYER (140) OF THE SEGMENT (120) OF THE CONTINUOUS FLEXIBLE
│  │ LINE (106) AS THE FIRST LAYER (140) IS BEING DEPOSITED AND FULLY CURING THE FIRST LAYER (140)
│  │ AS A SECOND LAYER (142) IS BEING DEPOSITED AGAINST THE FIRST LAYER (140)
│  ┌─ 530
│  │ CURING LESS THAN AN ENTIRETY OF THE COMPOSITE PART (102)
│  ┌─ 532
│  │ RESTRICTIVELY CURING AT LEAST A PORTION OF THE COMPOSITE PART (102)
│  │  ┌─ 534
│  │  │ THE PORTION OF THE COMPOSITE PART (102) IS RESTRICTIVELY CURED
│  │  │ TO FACILITATE SUBSEQUENT PROCESSING OF THE PORTION
│  ┌─ 536
│  │ SELECTIVELY VARYING AT LEAST ONE OF A DELIVERY RATE OR A DELIVERY DURATION OF THE CURING
│  │ ENERGY (118) TO IMPART VARYING PHYSICAL CHARACTERISTICS TO THE COMPOSITE PART (102)
│  │  ┌─ 538
│  │  │ THE VARYING PHYSICAL CHARACTERISTICS INCLUDE AT LEAST ONE OF STRENGTH,
│  │  │ STIFFNESS, FLEXIBILITY, DUCTILITY, OR HARDNESS

┌─ 540
│ SIMULTANEOUSLY WITH DELIVERING THE PREDETERMINED OR ACTIVELY DETERMINED AMOUNT OF THE
│ CURING ENERGY (118) AT LEAST TO THE PORTION (124) OF THE SEGMENT (120) OF THE CONTINUOUS
│ FLEXIBLE LINE (106) AT THE CONTROLLED RATE, AT LEAST PARTIALLY PROTECTING AT LEAST THE
│ PORTION (124) OF THE SEGMENT (120) OF THE CONTINUOUS FLEXIBLE LINE (106) FROM ENVIRONMENTAL
│ EXPOSURE AFTER THE SEGMENT (120) EXITS A DELIVERY GUIDE (112)
│  ┌─ 542
│  │ AT LEAST THE PORTION (124) OF THE SEGMENT (120) OF THE CONTINUOUS FLEXIBLE LINE (106) IS AT
│  │ LEAST PARTIALLY PROTECTED FROM THE ENVIRONMENTAL EXPOSURE WITH A SHIELDING GAS (221)

┌─ 544
│ AT LEAST ONE OF DEPOSITING THE SEGMENT (120) OF THE CONTINUOUS FLEXIBLE LINE (106)
│ ALONG THE PRINT PATH (122) OR DELIVERING THE PREDETERMINIED OR ACTIVELY DETERMINED
│ AMOUNT OF THE CURING ENERGY (118) AT LEAST TO THE PORTION (124) OF THE SEGMENT (120)
│ OF THE CONTINUOUS FLEXIBLE LINE (106) AT THE CONTROLLED RATE PROVIDES DIFFERENT
│ PHYSICAL CHARACTERISTICS AT DIFFERENT LOCATIONS OF THE COMPOSITE PART (102)
│  ┌─ 546
│  │ THE PHYSICAL CHARACTERISTICS INCLUDE AT LEAST ONE OF STRENGTH,
│  │ STIFFNESS, FLEXIBILITY, DUCTILITY, OR HARDNESS
```

METHODS FOR ADDITIVELY MANUFACTURING COMPOSITE PARTS

RELATED APPLICATION

This application claims priority to U.S. Provisional Patent Application No. 62/199,665, entitled "SYSTEMS AND METHODS FOR ADDITIVELY MANUFACTURING COMPOSITE PARTS," which was filed on Jul. 31, 2015, and the complete disclosure of which is hereby incorporated by reference.

BACKGROUND

Conventionally, manufacturing of typical composite parts relies on sequential layering of multiple plies of composite material, with each ply containing, e.g., unidirectional reinforcement fibers or randomly oriented chopped fibers. Parts manufactured in this manner must have laminar construction, which undesirably increases the weight of the finished part, since not all of the reinforcement fibers are oriented along the direction(s) of the force(s) to be applied to the parts. Additionally, limitations inherent to laminar techniques of manufacturing composites are not conducive to implementation of many types of advanced structural designs.

SUMMARY

Accordingly, apparatuses and methods, intended to address at least the above-identified concerns, would find utility.

The following is a non-exhaustive list of examples, which may or may not be claimed, of the subject matter according the present disclosure.

One example of the present disclosure relates to a system for additively manufacturing a composite part. The system comprises a delivery guide, movable relative to a surface. The delivery guide is configured to deposit at least a segment of a continuous flexible line along a print path. The continuous flexible line comprises a non-resin component and a thermosetting-resin component. The thermosetting-resin component comprises a first part of a thermosetting resin and a second part of a thermosetting resin. The print path is stationary relative to the surface. The system further comprises a first resin-part applicator, configured to apply a first quantity of the first part of thermosetting resin to the non-resin component. The system also comprises a second resin-part applicator, configured to apply a second quantity of the second part of the thermosetting resin to at least a portion of the first quantity of the first part of the thermosetting resin, applied to the non-resin component. The system additionally comprises a feed mechanism, configured to pull the non-resin component through the first resin-part applicator and through the second resin-part applicator, and to push the continuous flexible line out of the delivery guide.

Another example of the present disclosure relates to a system for additively manufacturing a composite part. The system comprises a delivery guide, movable relative to a surface. The delivery guide is configured to deposit at least a segment of a continuous flexible line along a print path. The continuous flexible line comprises a non-resin component and a thermosetting-resin component. The thermosetting-resin component comprises a first part of a thermosetting resin and a second part of the thermosetting resin. The print path is stationary relative to the surface. The non-resin component comprises at least a first element and a second element. The system further comprises a first resin-part applicator, configured to apply a first quantity of the first part of the thermosetting resin to the first element of the non-resin component. The system also comprises a second resin-part applicator, configured to apply a second quantity of the second part of the thermosetting resin to the second element of the non-resin component. The system additionally comprises a feed mechanism, configured to pull the first element of the non-resin component through the first resin-part applicator, to pull the second element of the non-resin component through the second resin-part applicator, and to push the continuous flexible line out of the delivery guide.

Another example of the present disclosure relates to a method of additively manufacturing a composite part. The method comprises applying a thermosetting resin to a non-resin component to create a continuous flexible line by pulling the non-resin component through a first resin-part applicator, in which a first quantity of a first part of the thermosetting resin is applied to the non-resin component, and by pulling the non-resin component through a second resin-part applicator, in which a second quantity of a second part of the thermosetting resin is applied to at least a portion of the first quantity of the first part of thermosetting resin, applied to the non-resin component. The method further comprises routing the continuous flexible line into a delivery guide and depositing, via the delivery guide, a segment of the continuous flexible line along a print path.

Yet another example of the present disclosure relates to a method of additively manufacturing a composite part. The method comprises applying a first quantity of a first part of a thermosetting resin to a first element of a non-resin component by pulling the first element of the non-resin component through a first resin-part applicator. The method further comprises applying a second quantity of a second part of the thermosetting resin to a second element of the non-resin component by pulling the second element of the non-resin component through a second resin-part applicator. The method also comprises combining the first element with the first quantity of the first part and the second element with the second quantity of second part, to create a continuous flexible line. The continuous flexible line comprises the non-resin component and a thermosetting-resin component that comprises at least some of the first quantity of the first part of the thermosetting resin and at least some of the second quantity of the second part of the thermosetting resin. The method additionally comprises routing the continuous flexible line into a delivery guide and depositing, via the delivery guide, a segment of the continuous flexible line along a print path.

BRIEF DESCRIPTION OF THE DRAWINGS

Figure 1:
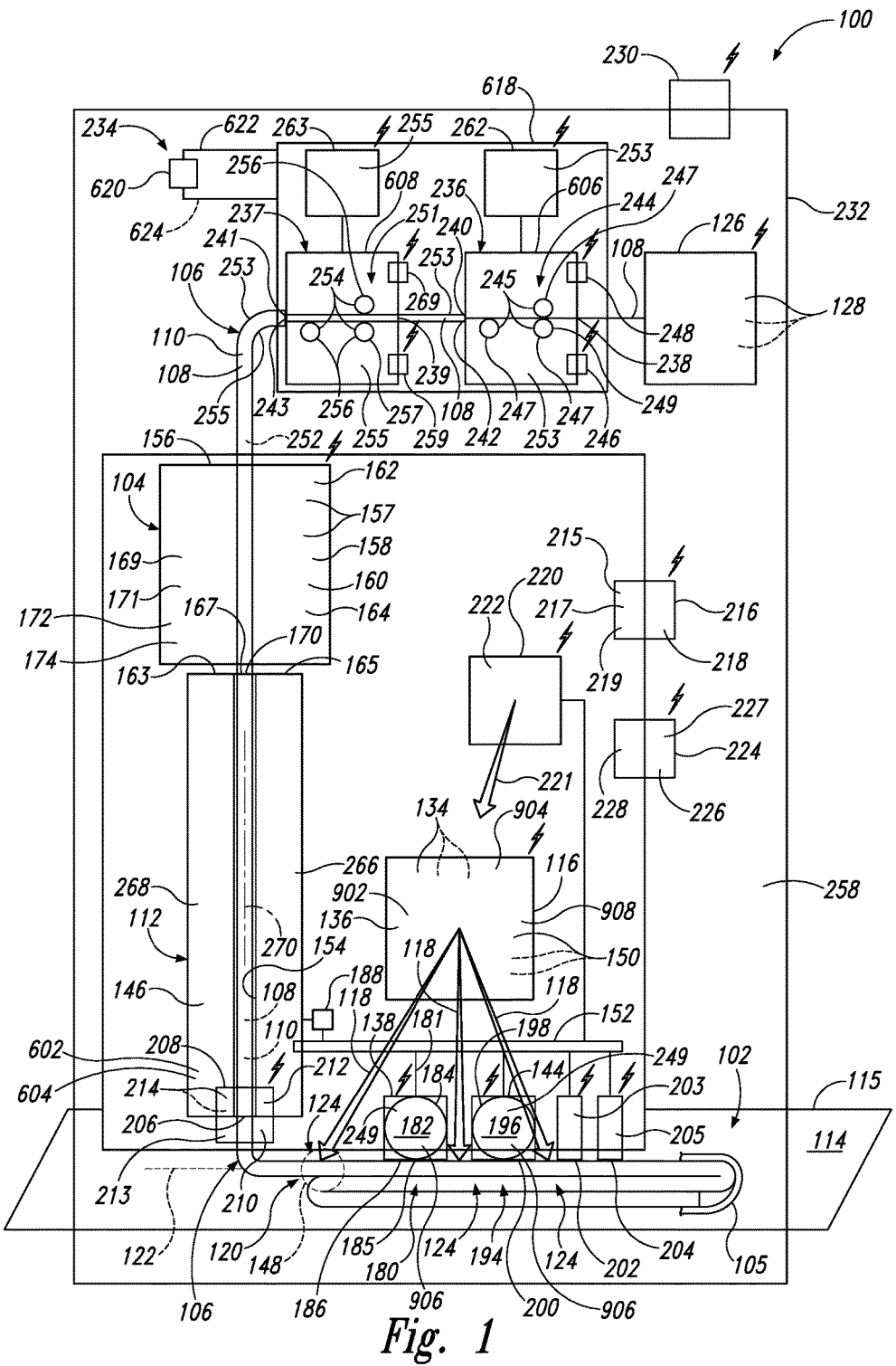
Figure 2:
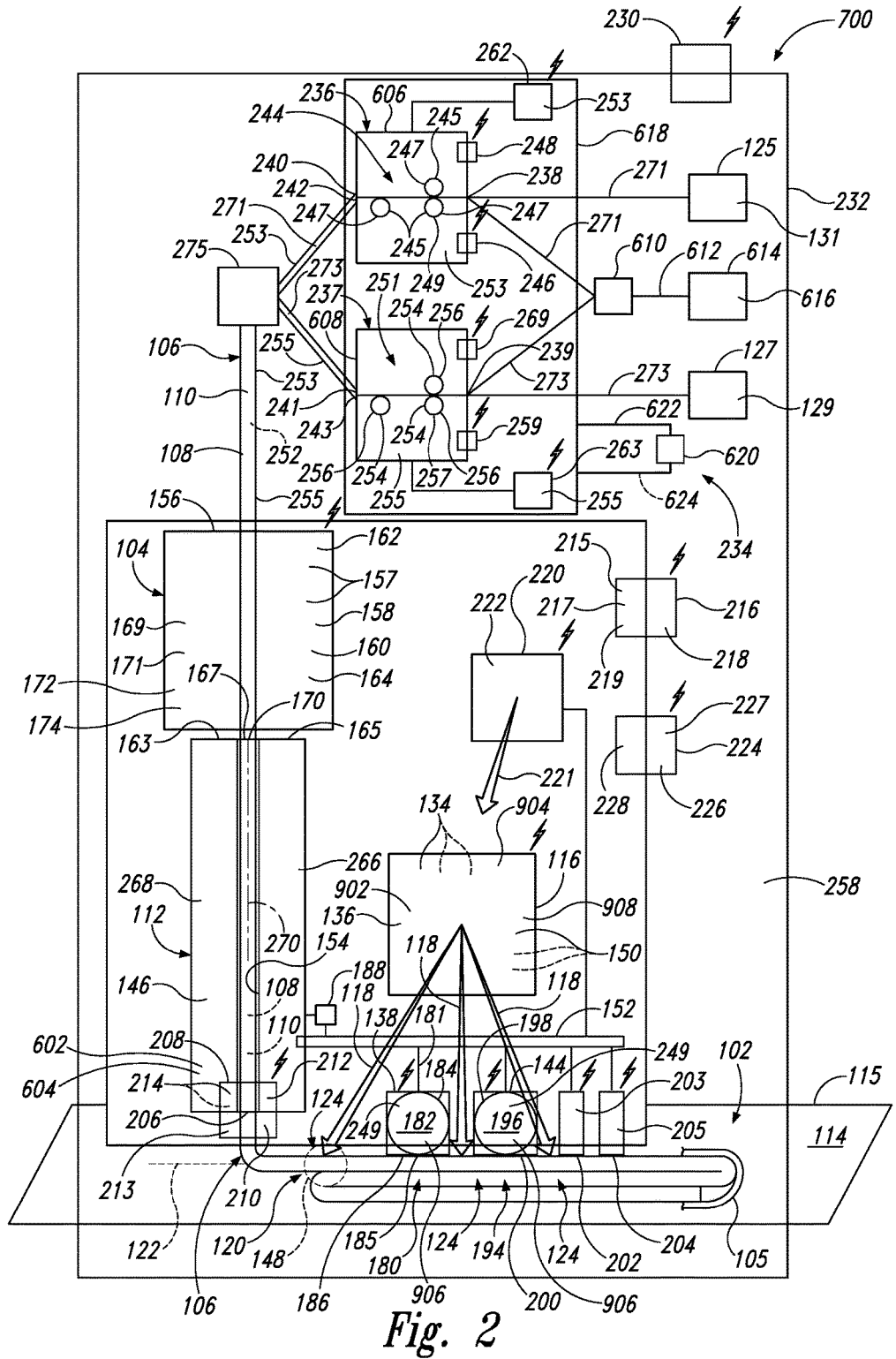
Figure 3:
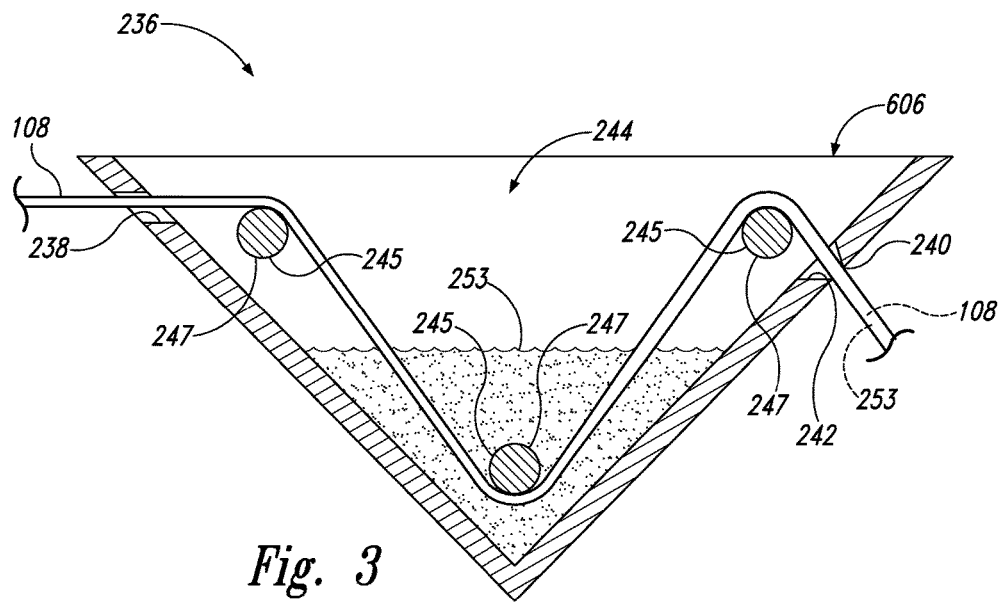
Figure 4:
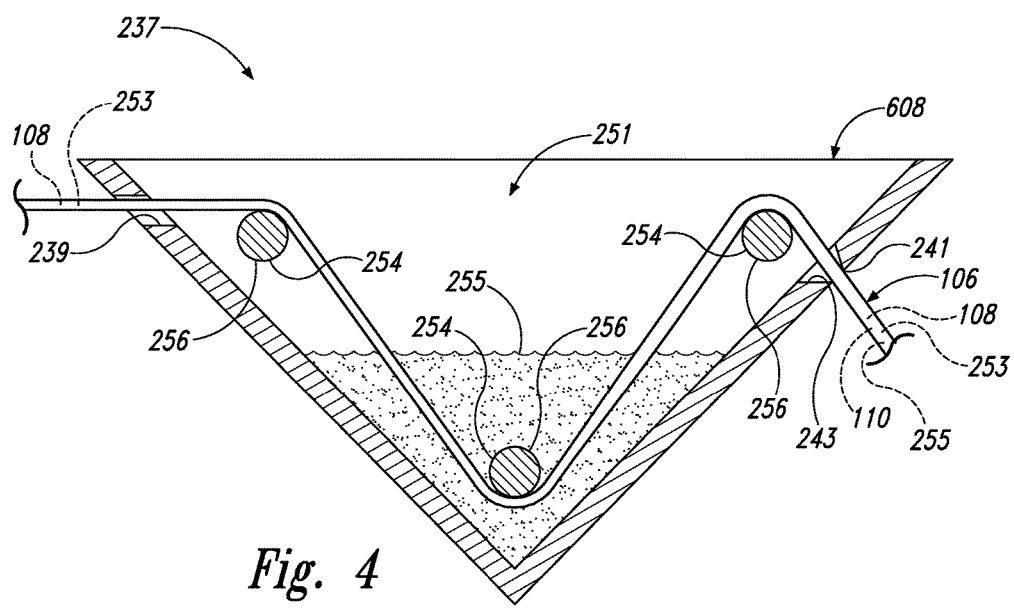
Figure 5:
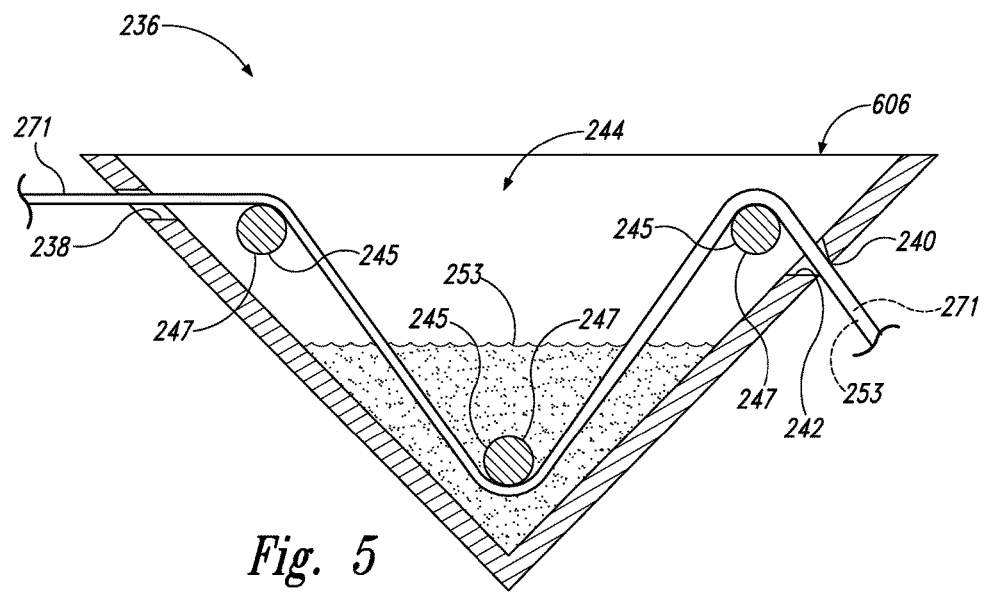
Figure 6:
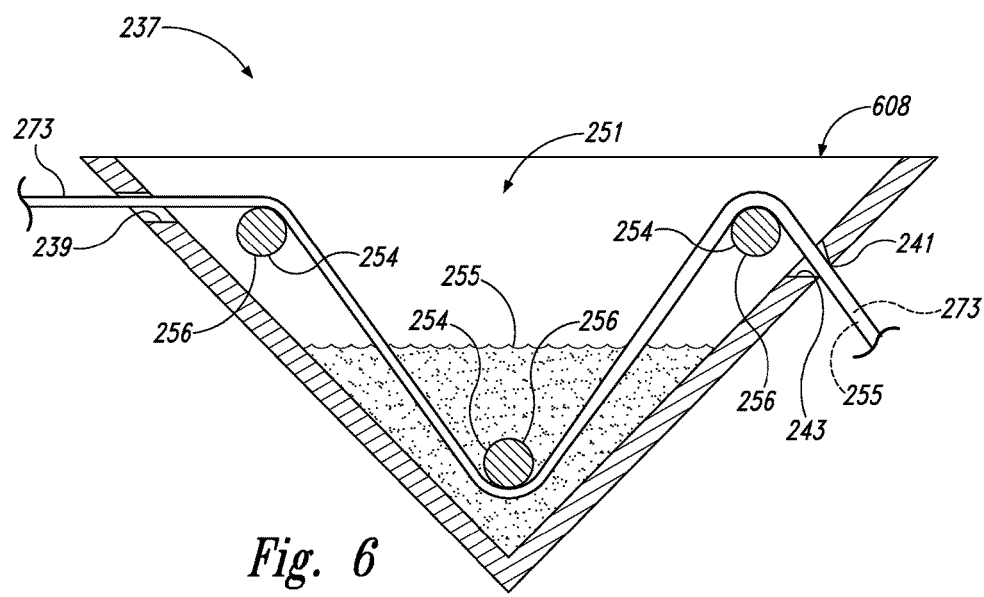
Figure 7:
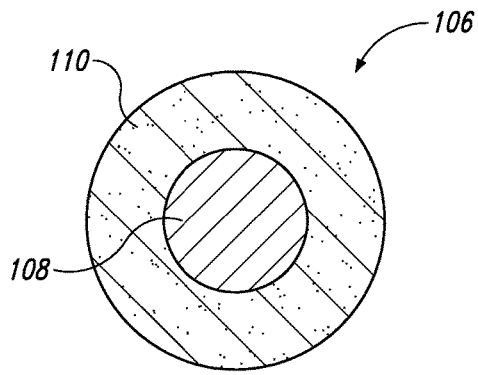
Figure 8:
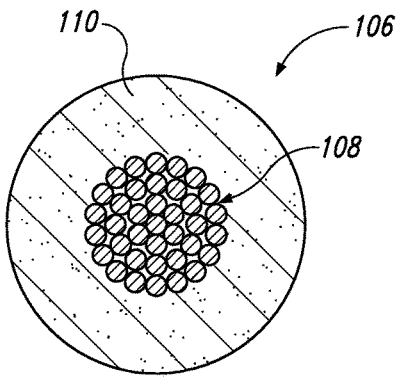
Figure 9:
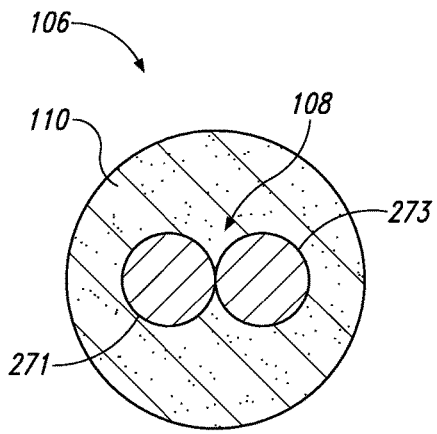
Figure 10:
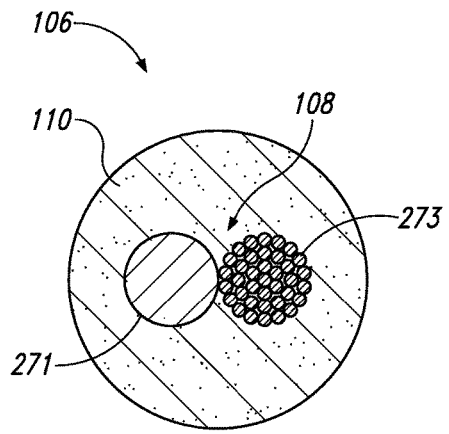
Figure 11:
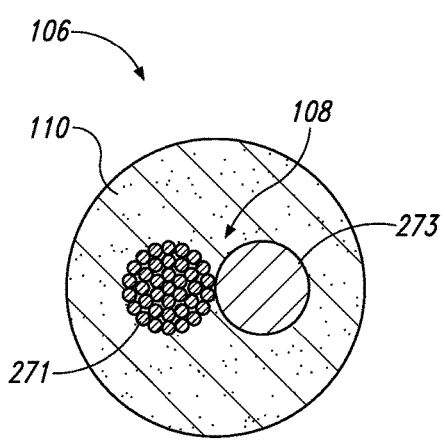
Figure 12:
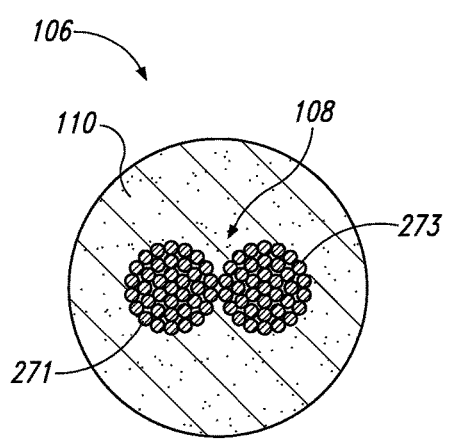
Figure 13:
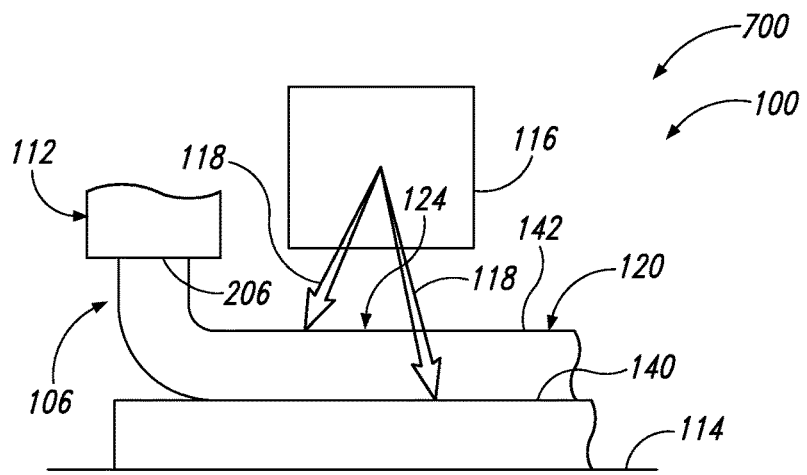
Figure 14:
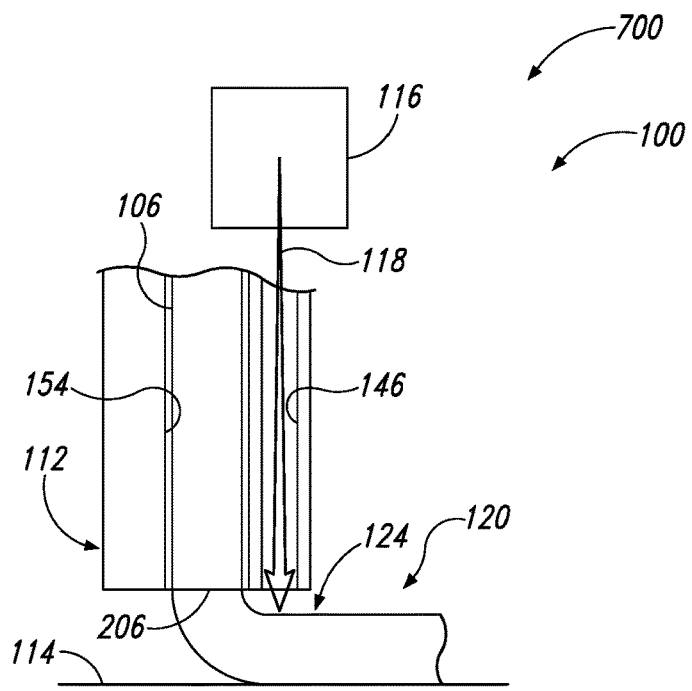
Figure 15:
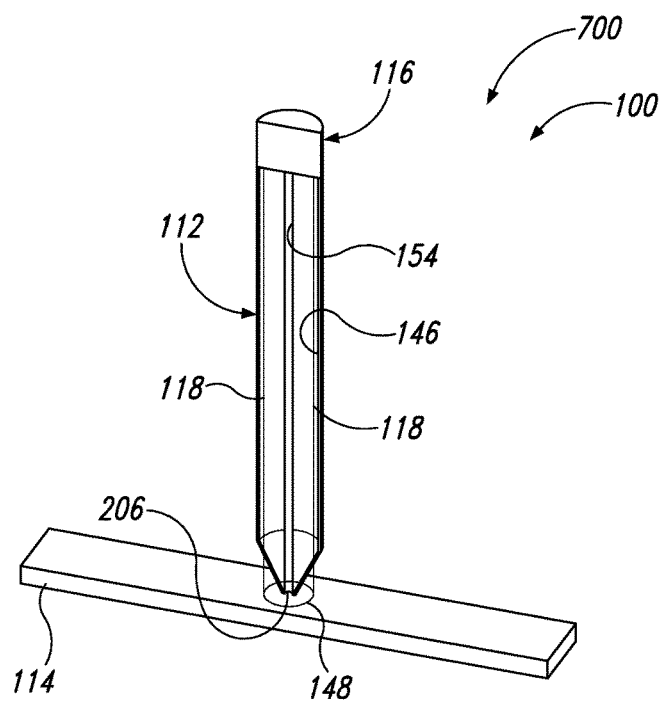
Figure 16:
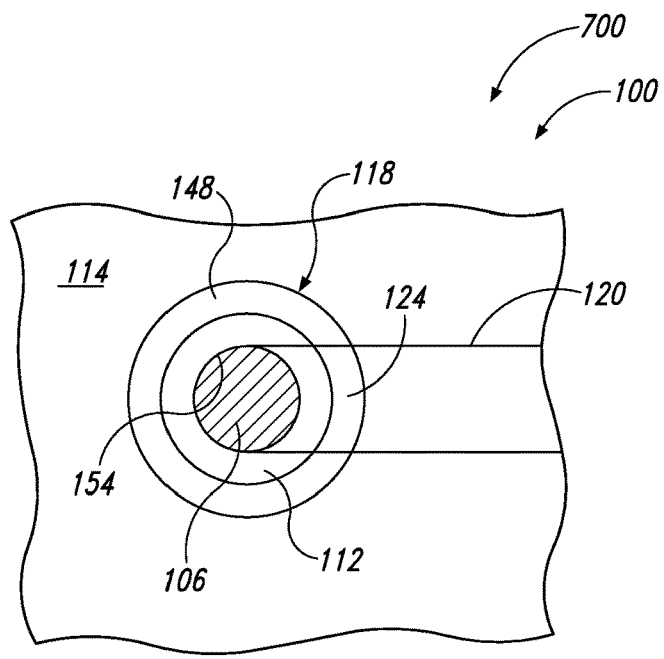
Figures 17, 18:
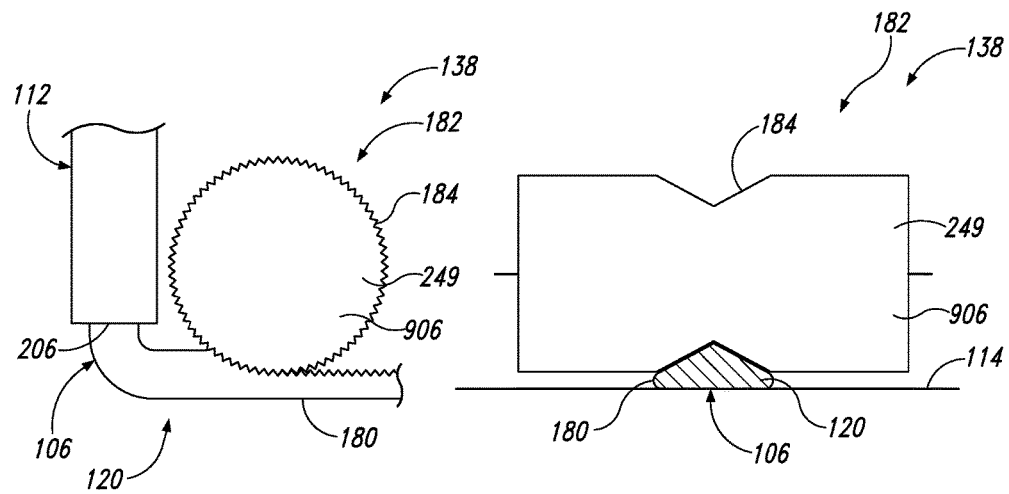
Figure 19:
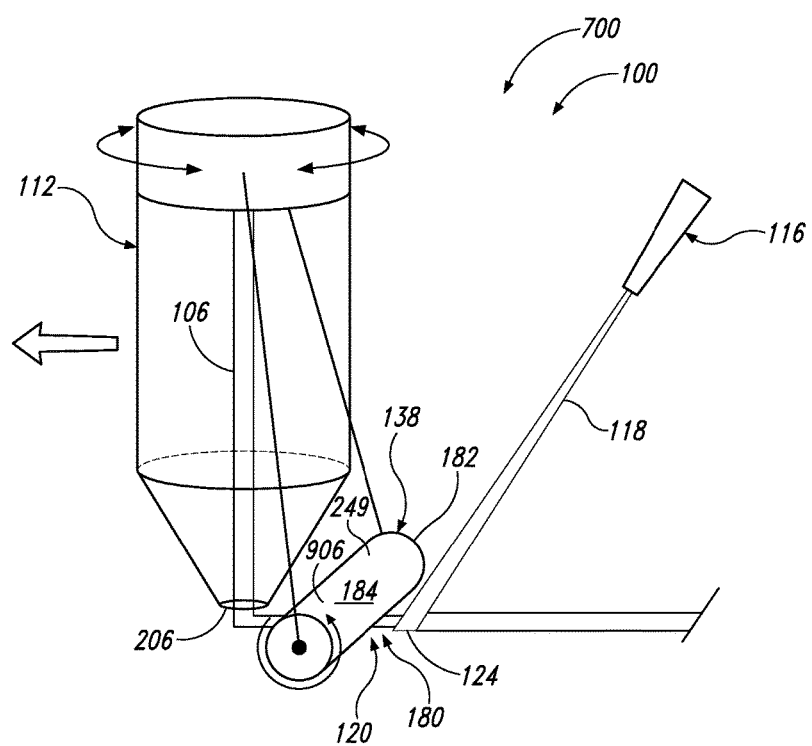
Figure 20:
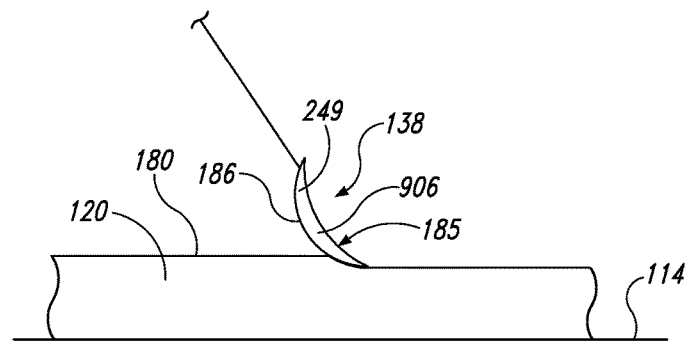
Figure 21:
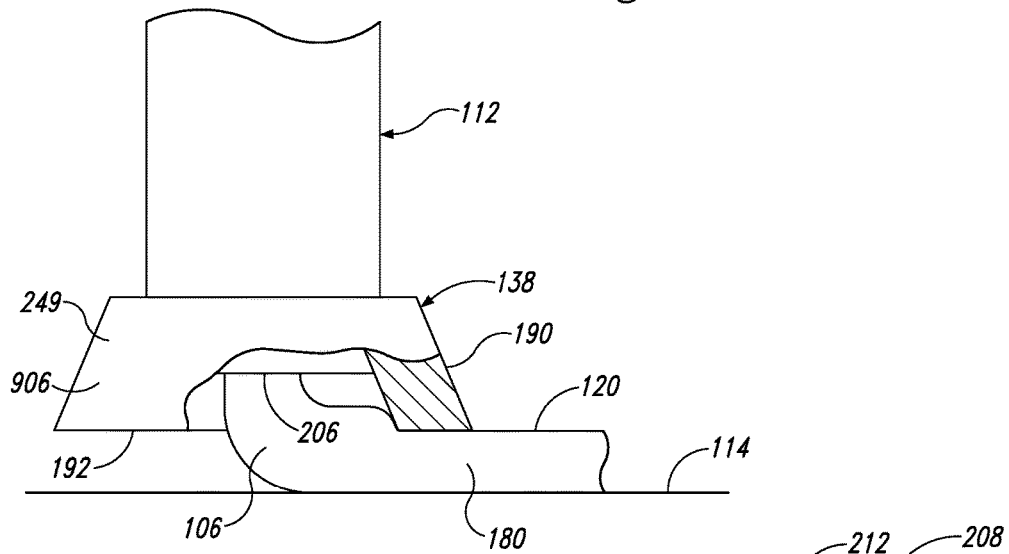
Figure 22:
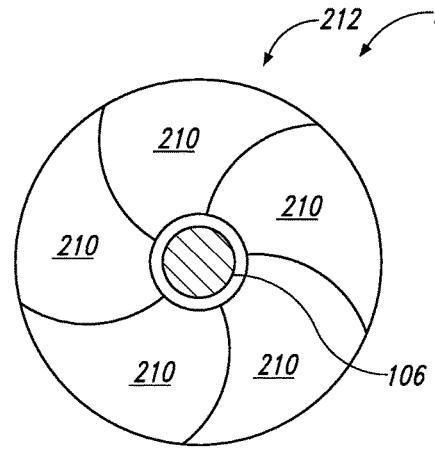
Figure 23:
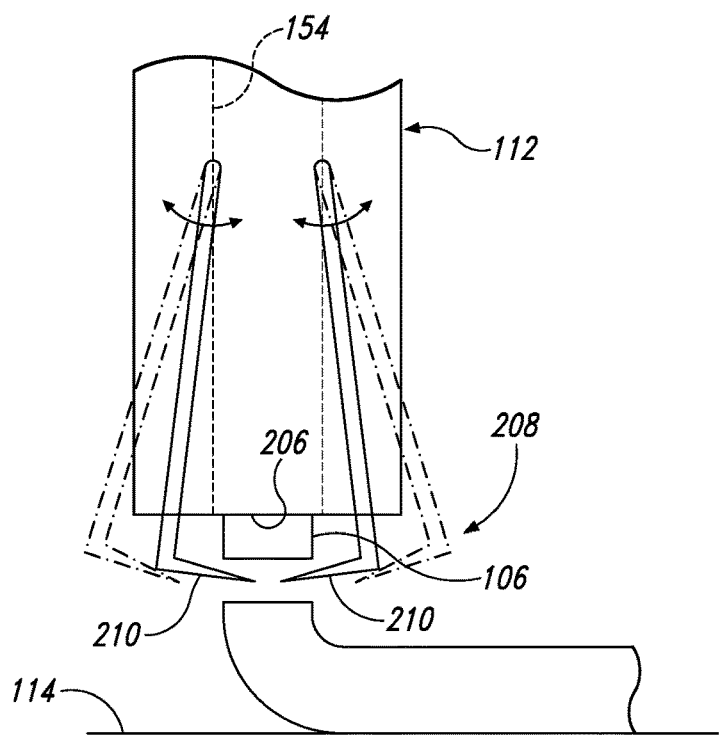
Figure 24:
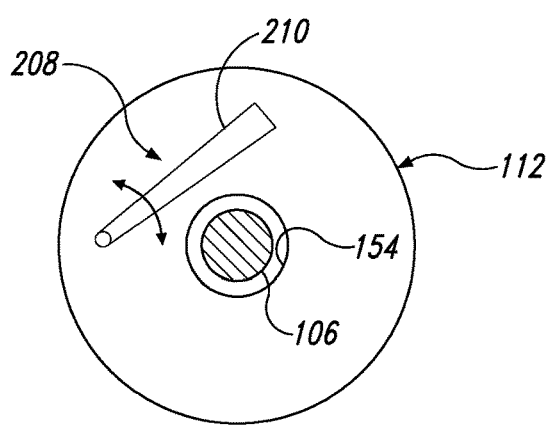
Figure 25:
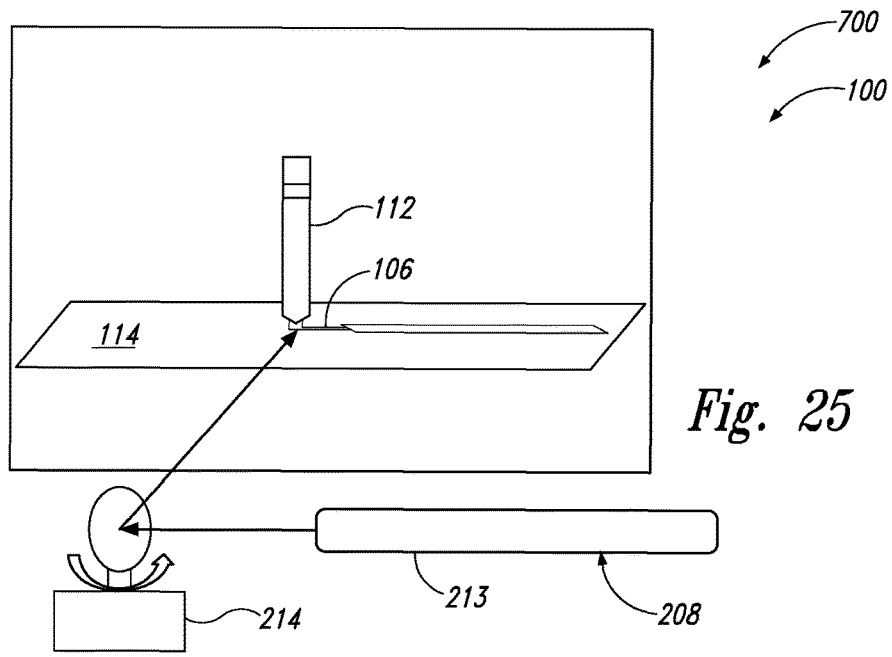
Figure 26:
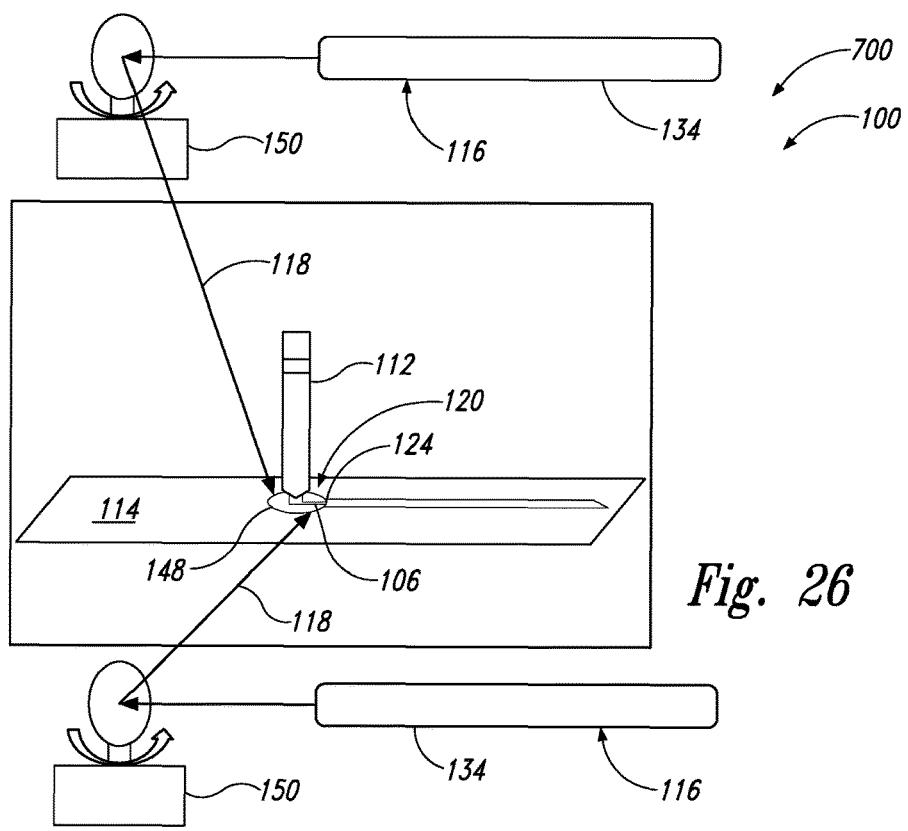
Figure 27:
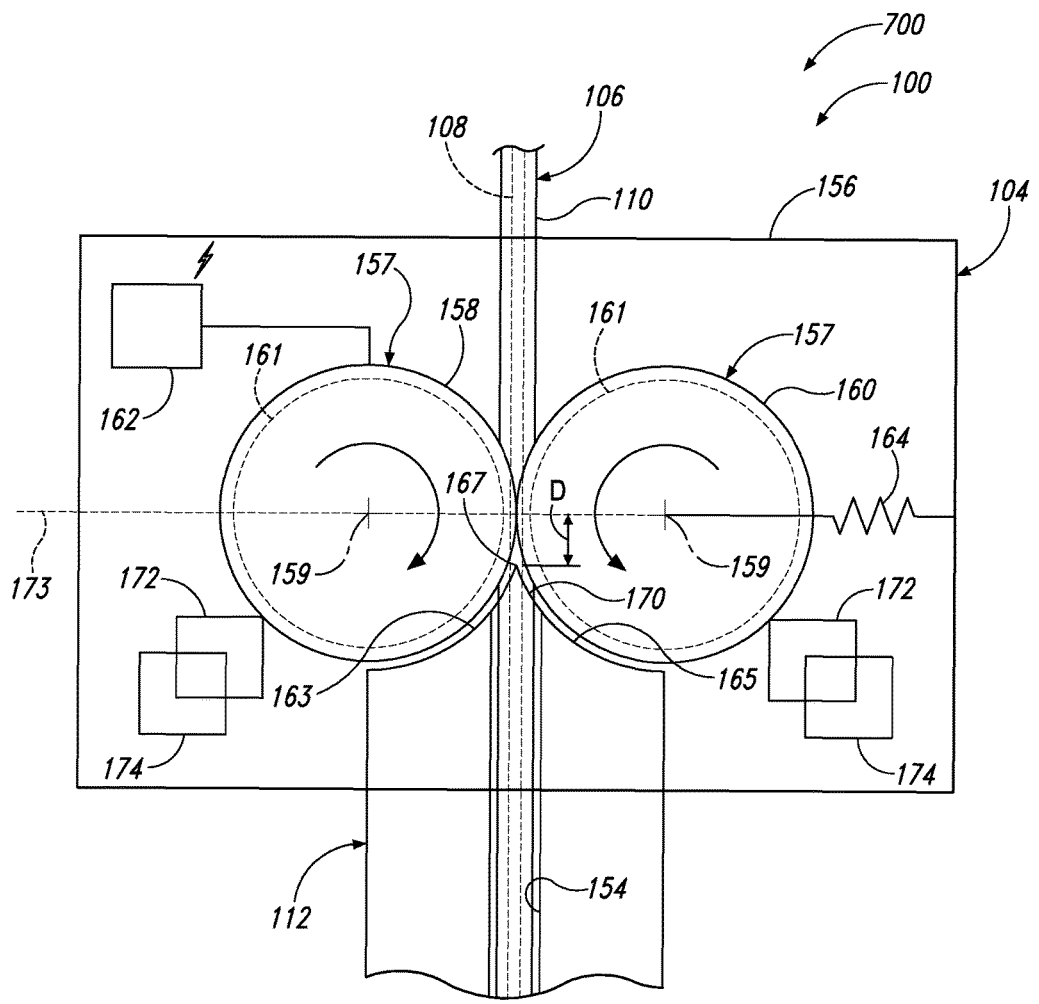
Figure 28:
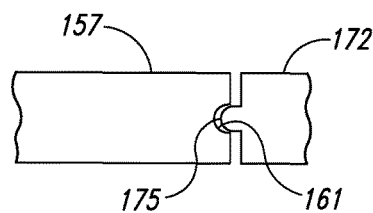
Figure 29:
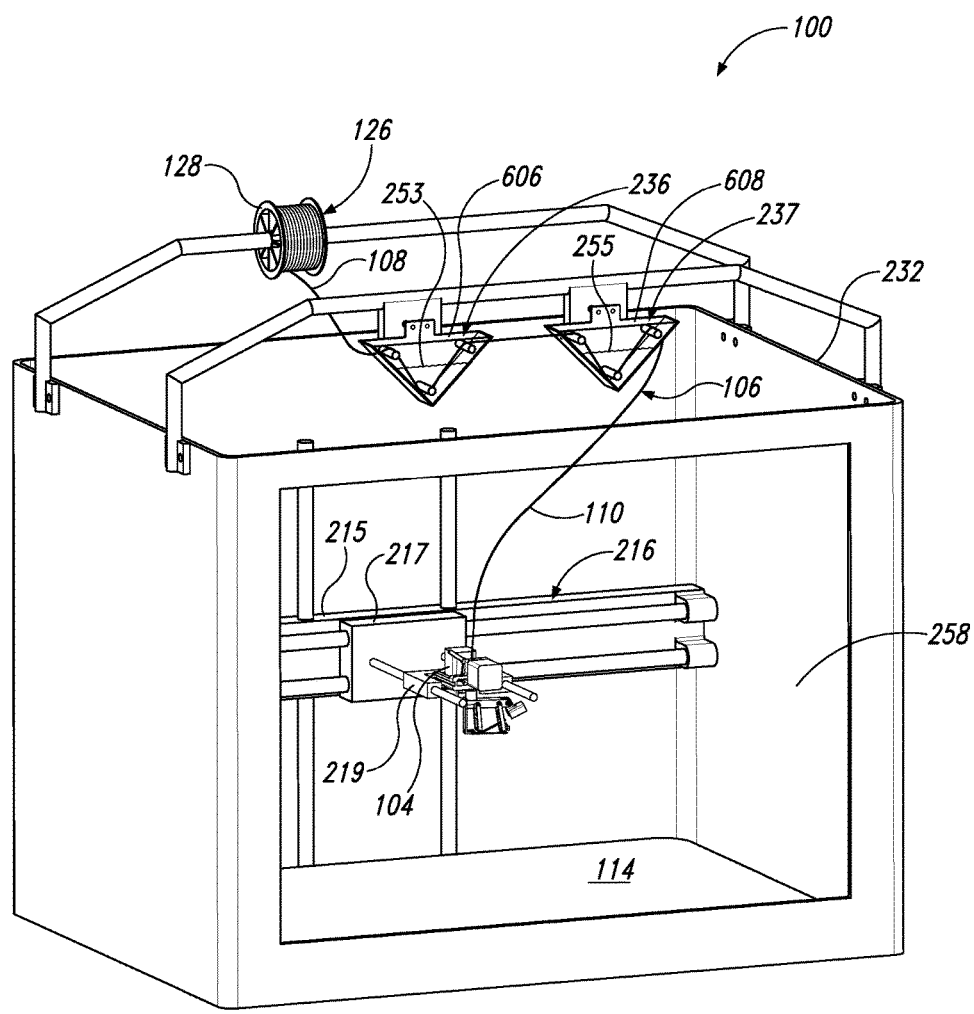
Figure 30:
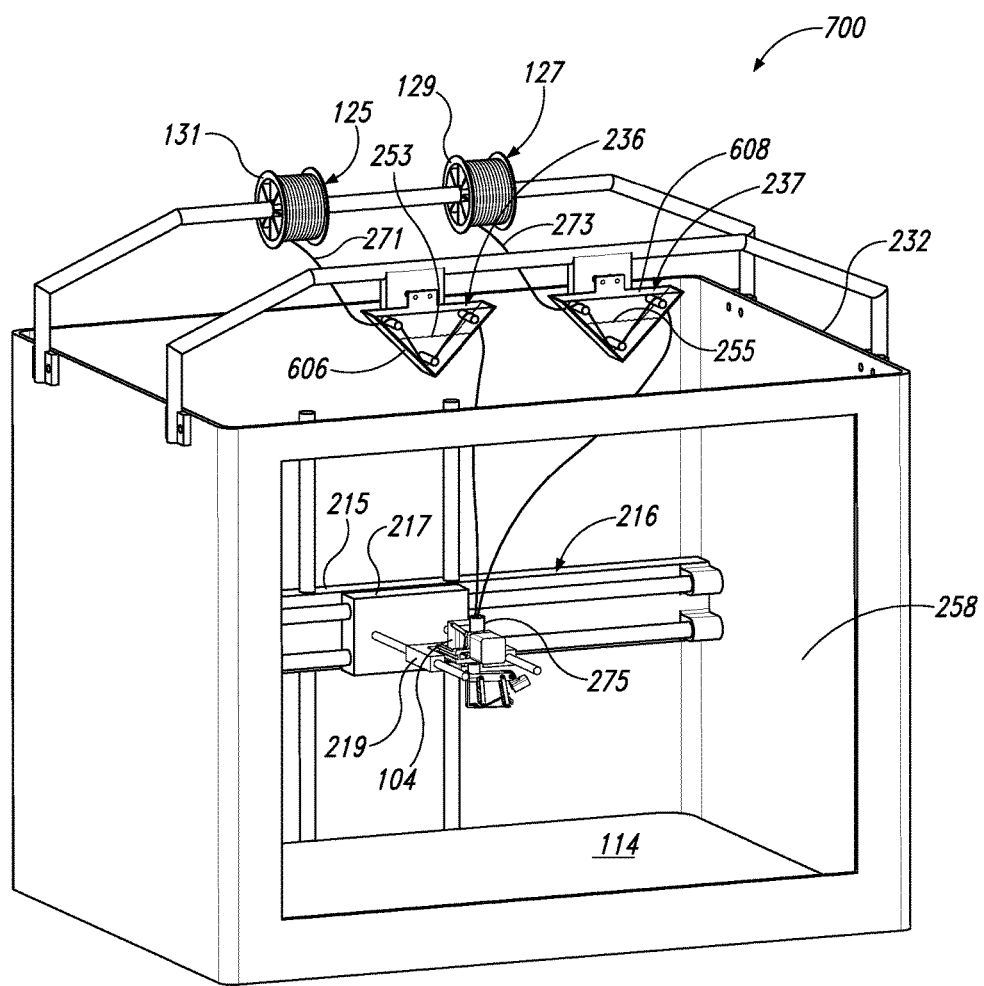
Figure 31:
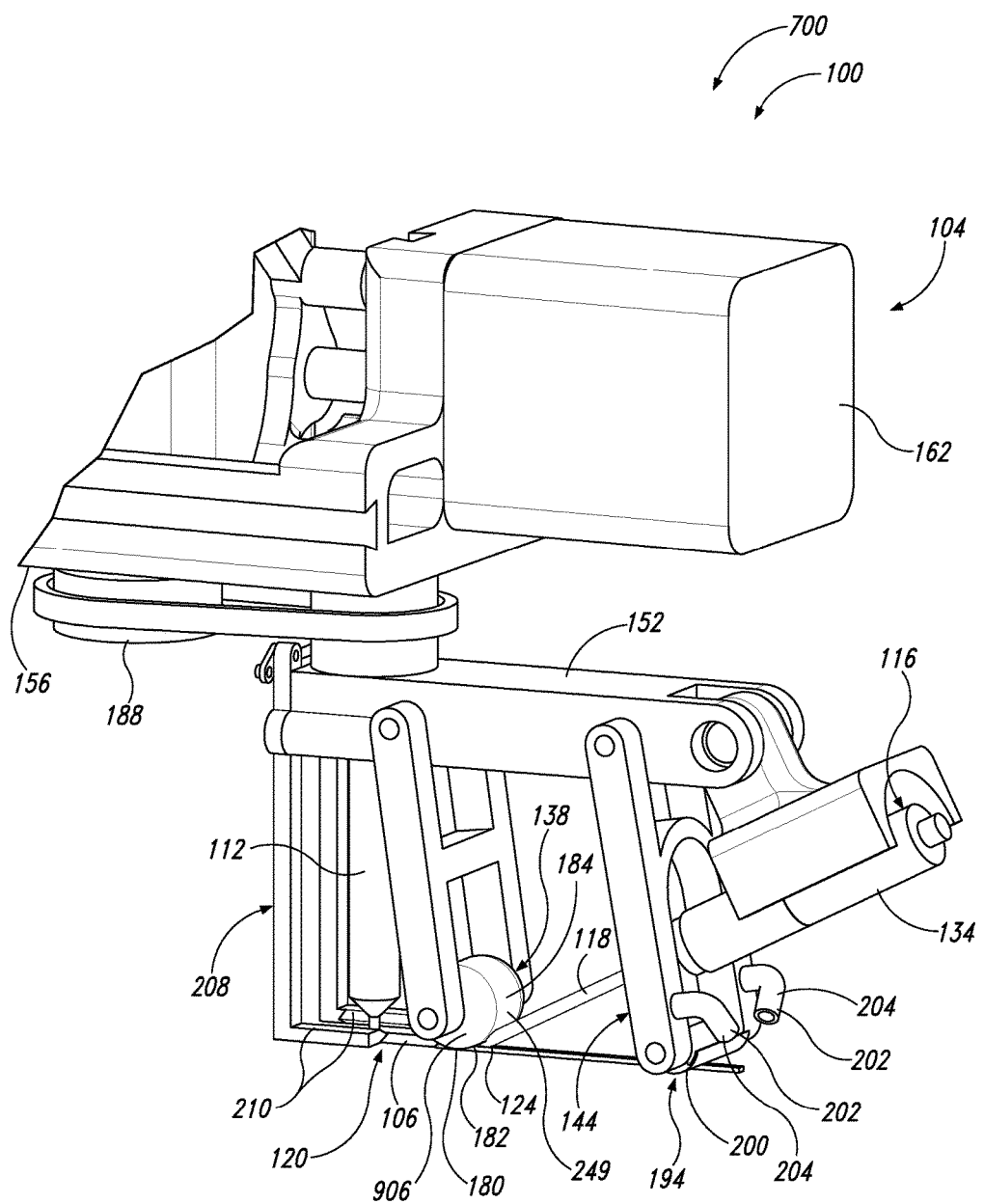
Figure 32:
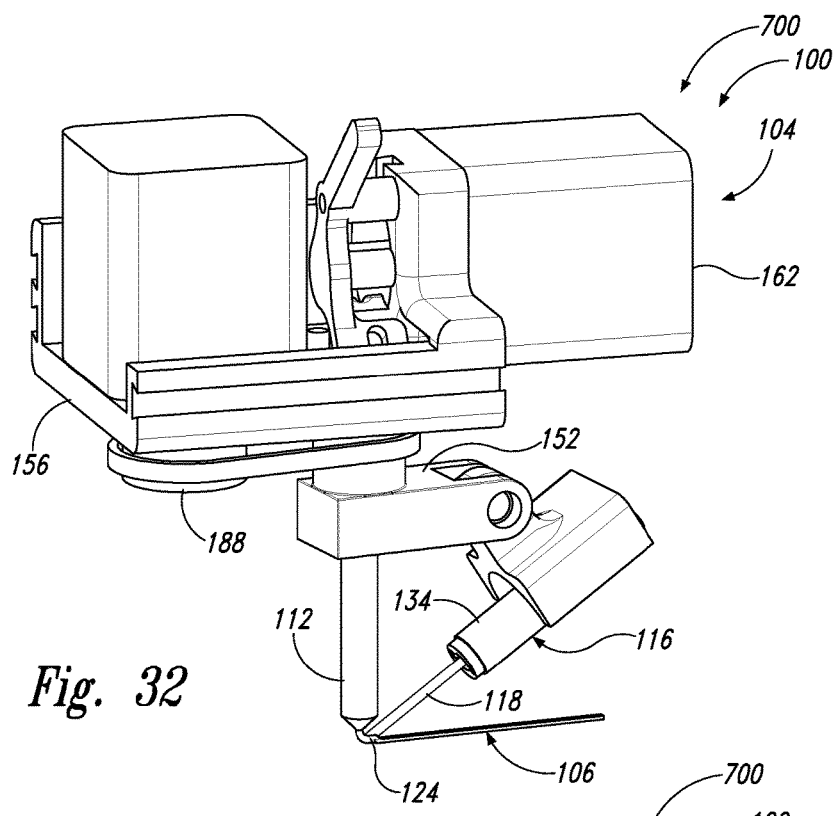
Figure 33:
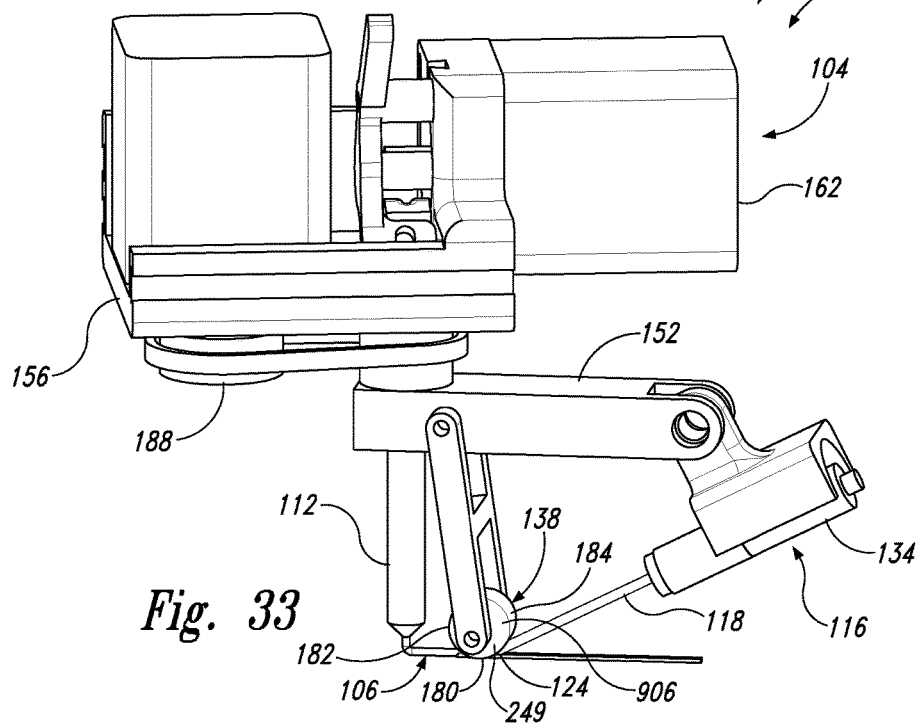
Figure 34:
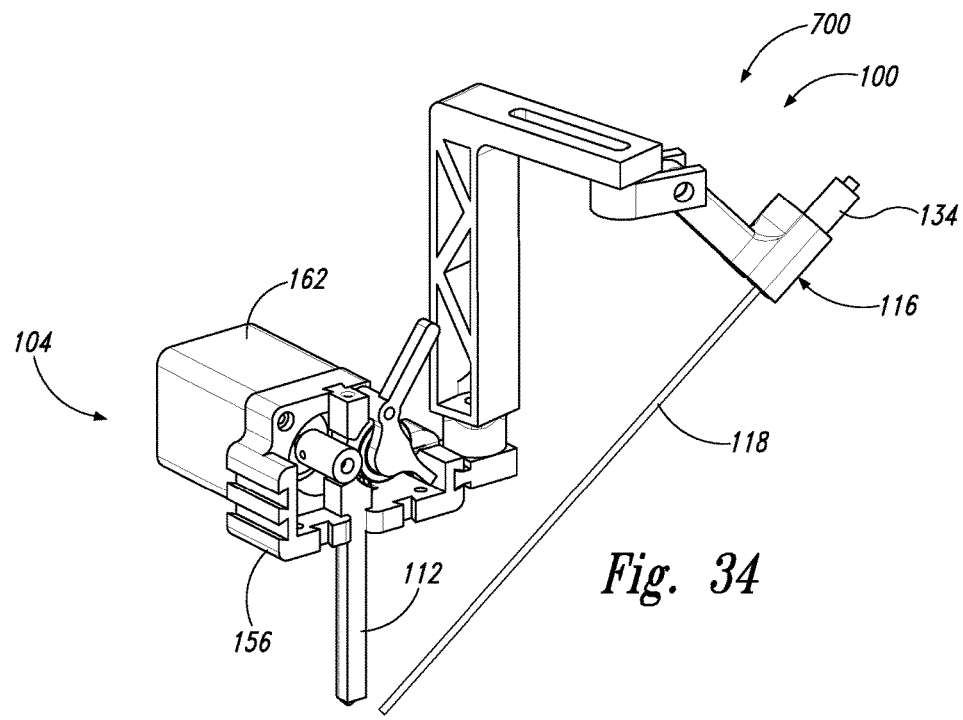
Figure 35:
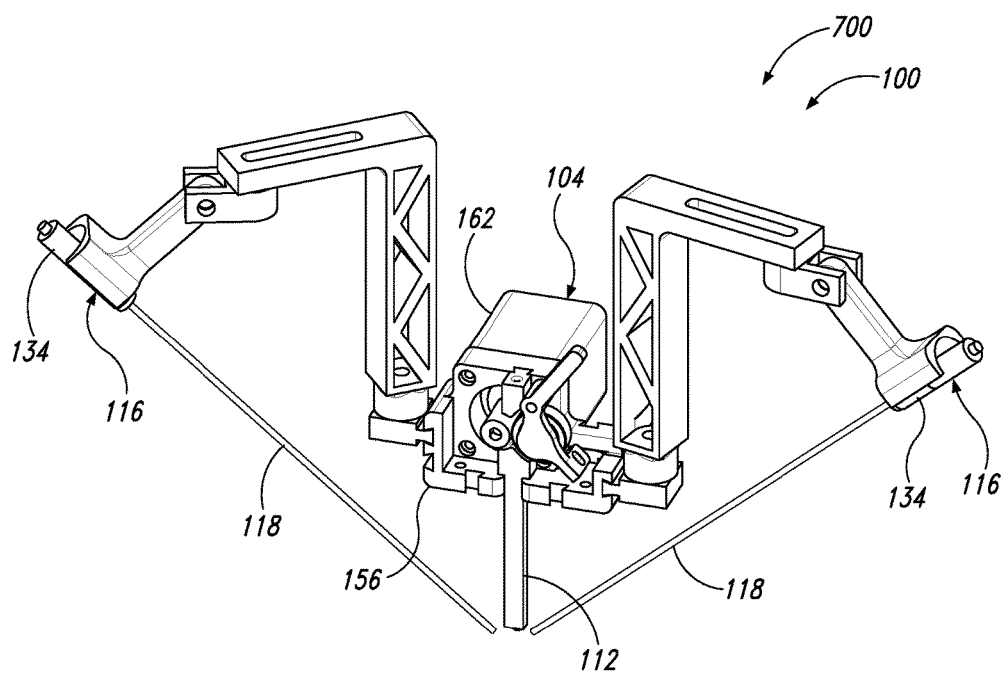
Figure 36:
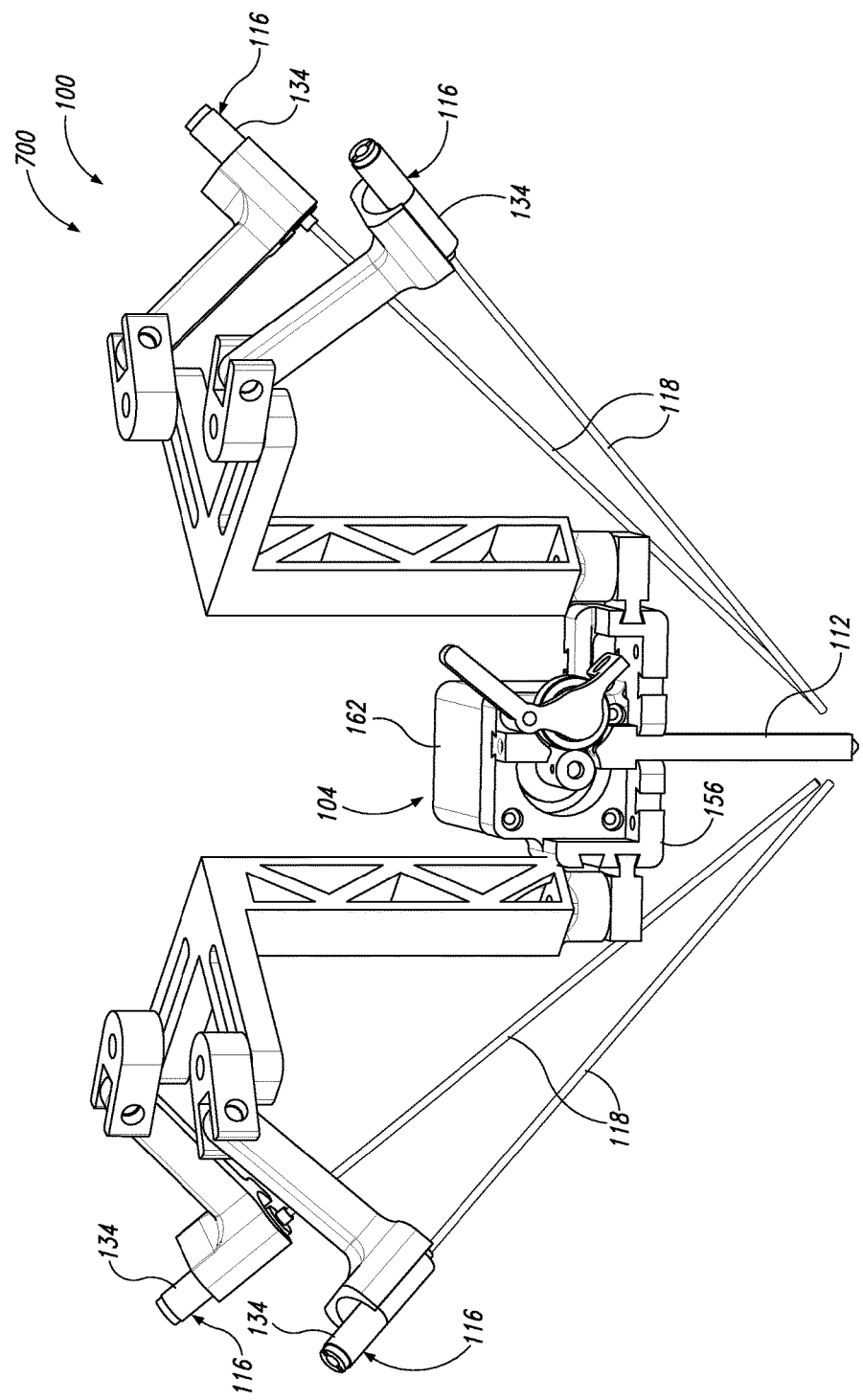
Figure 37:
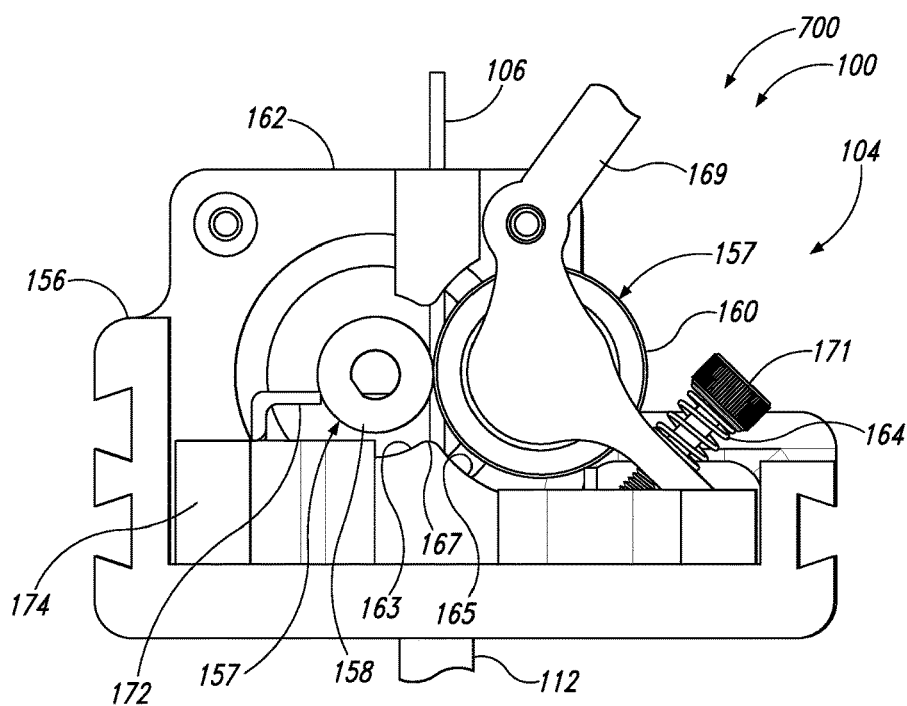
Figure 38:
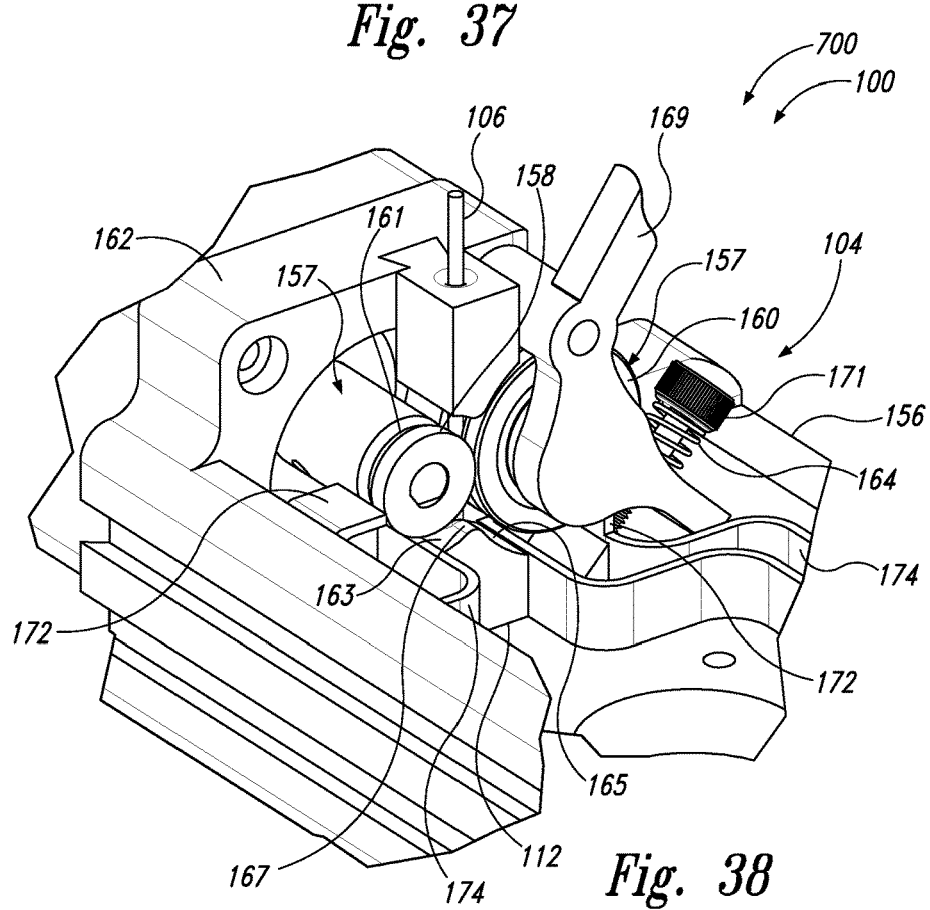
Figure 39:
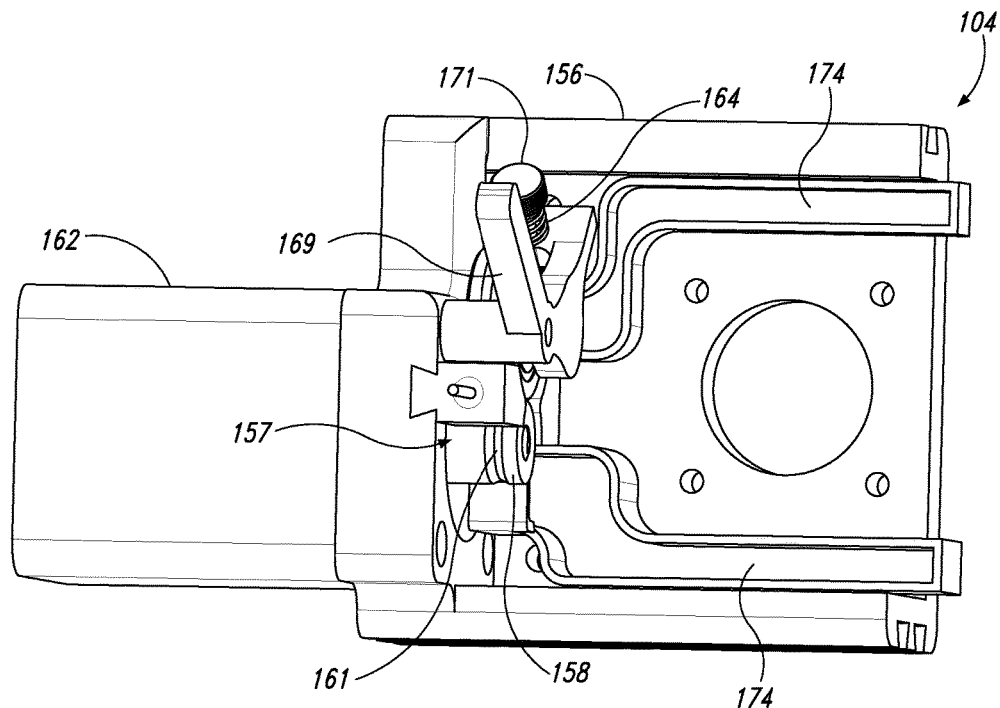
Figure 40:
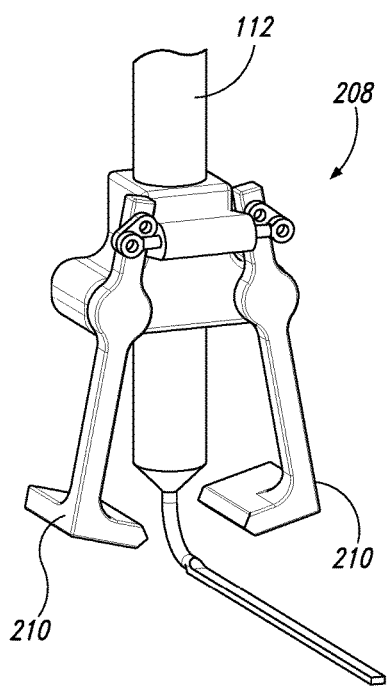
Figure 41:
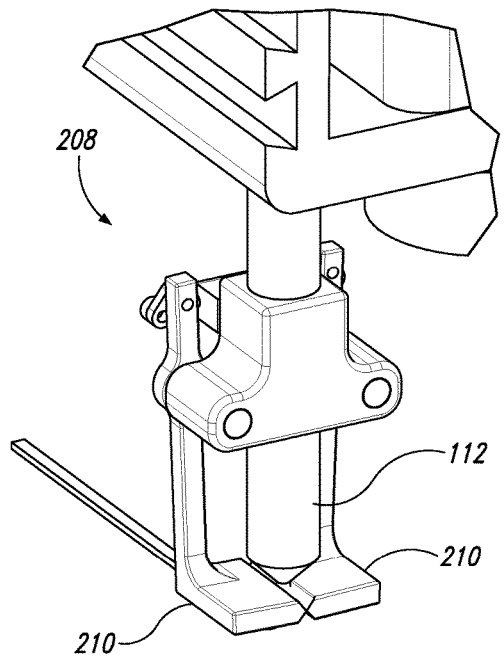
Figure 42:
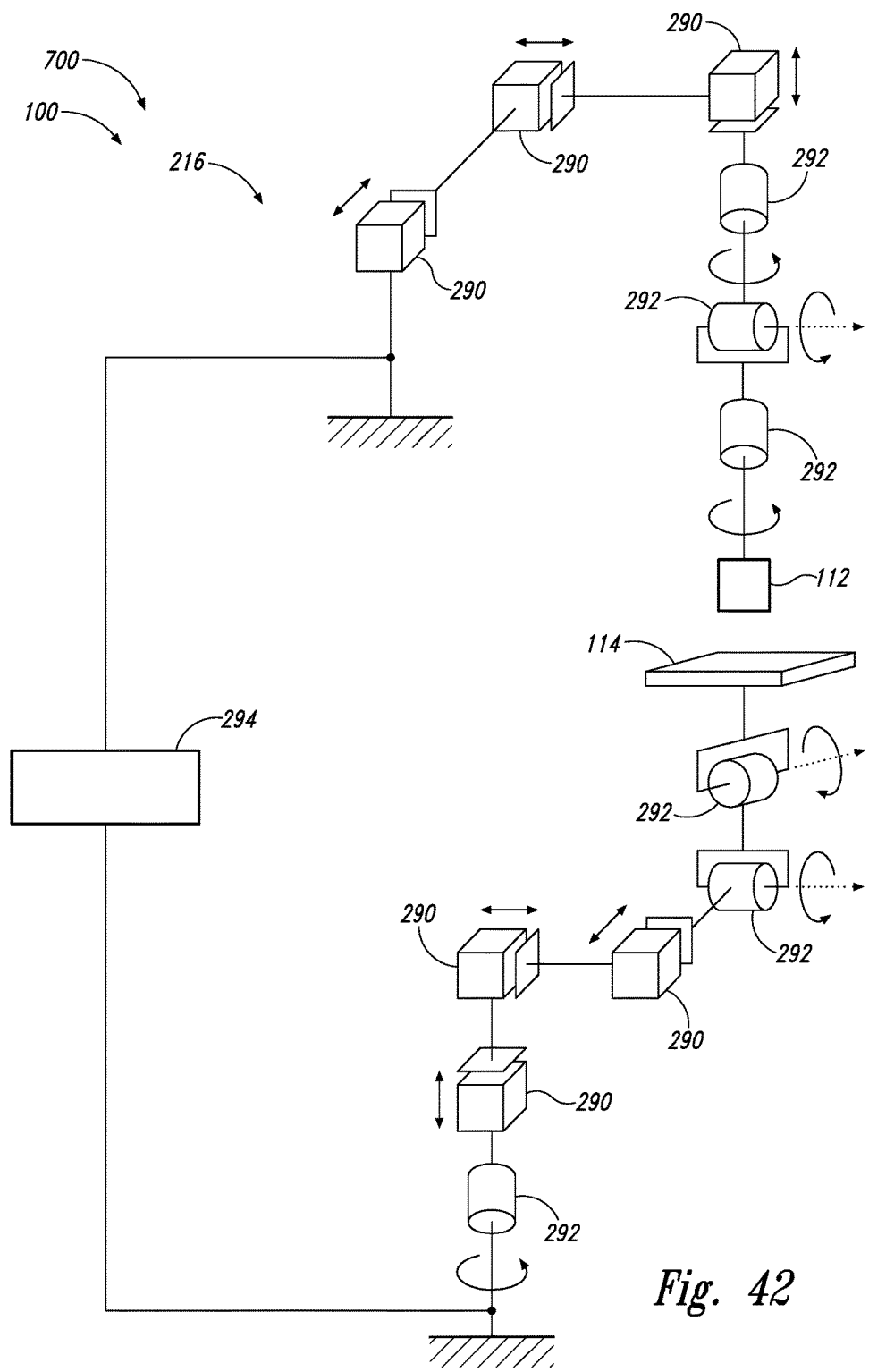
Figure 43A:
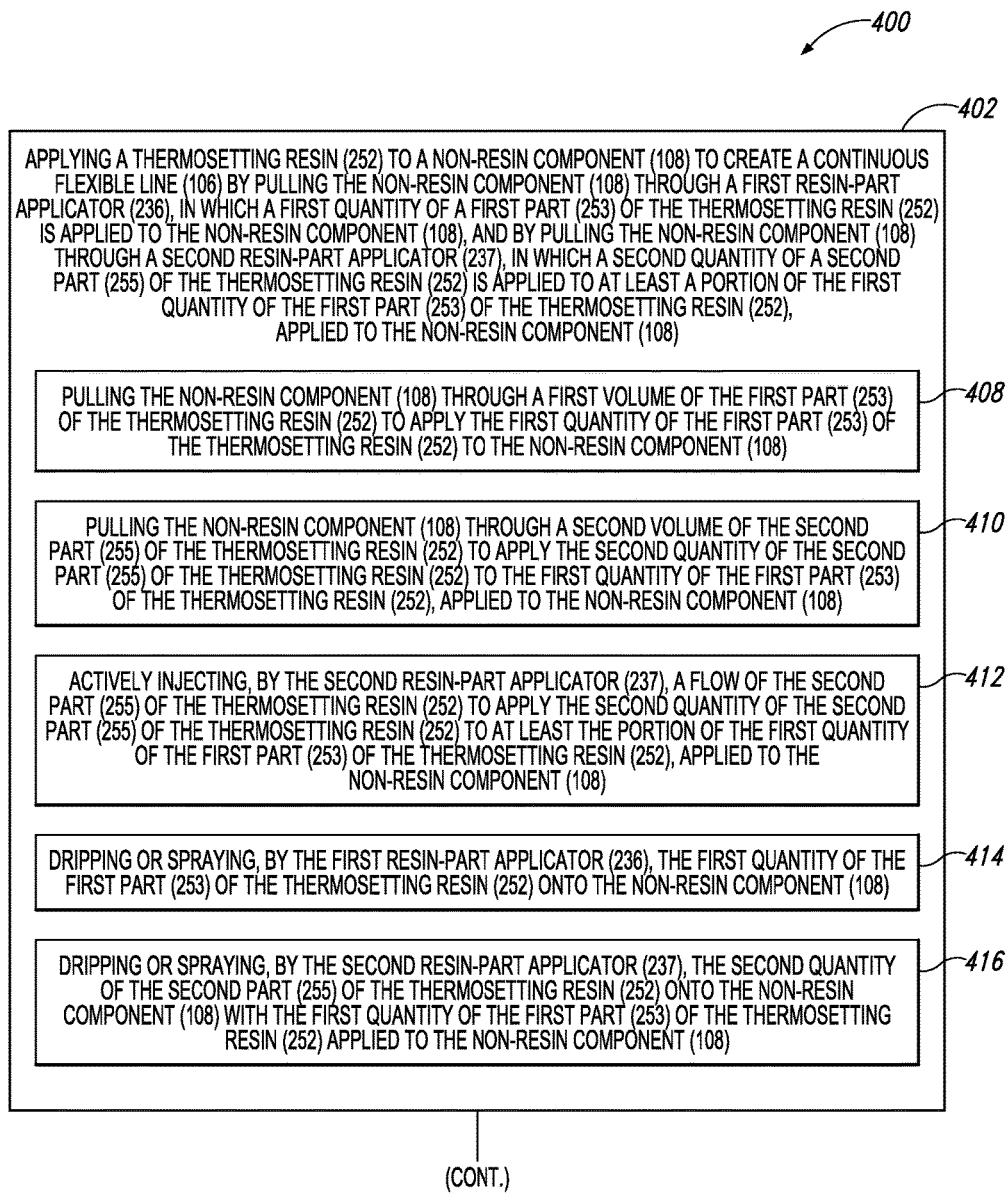
Figure 43B:
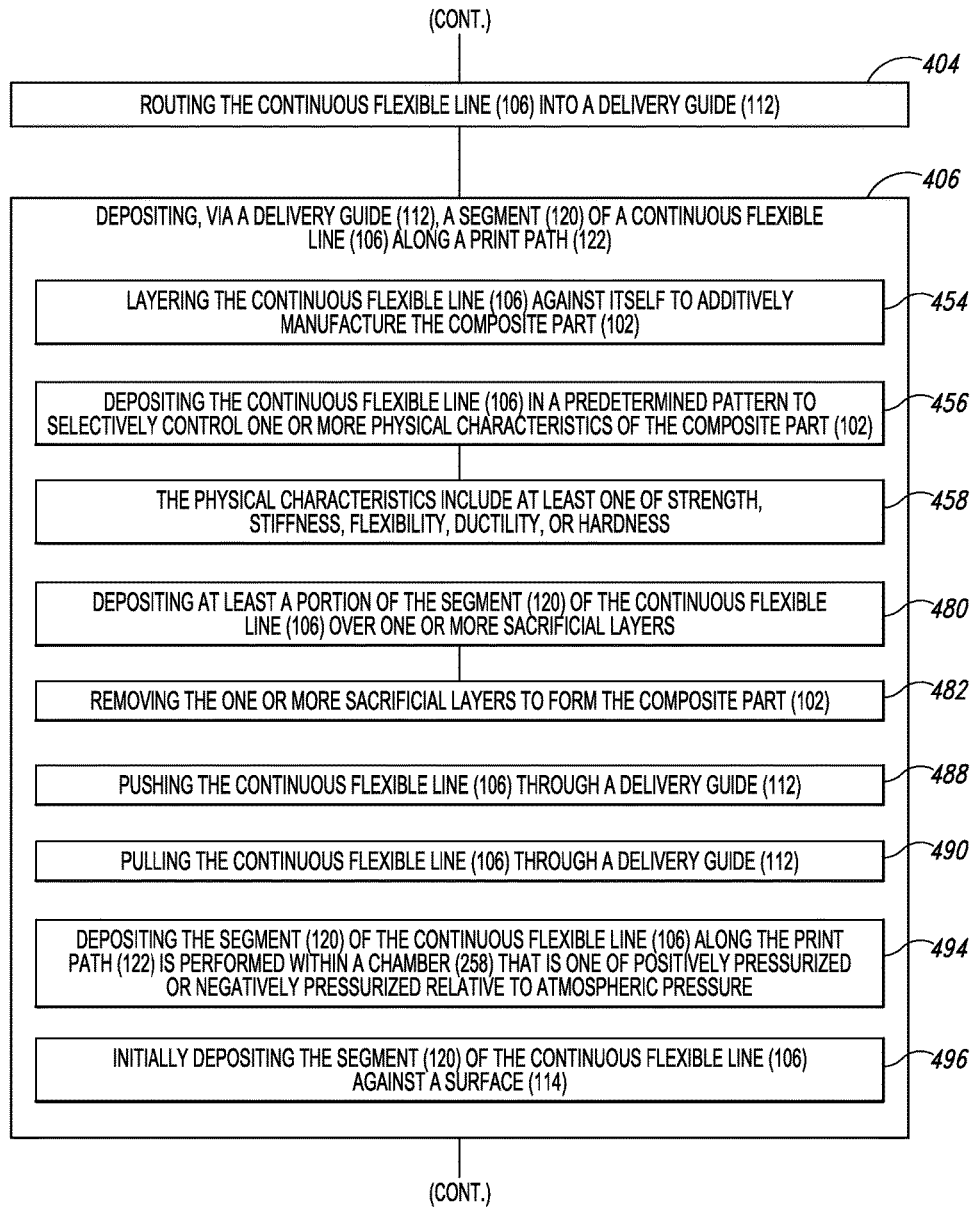
Figure 43D:
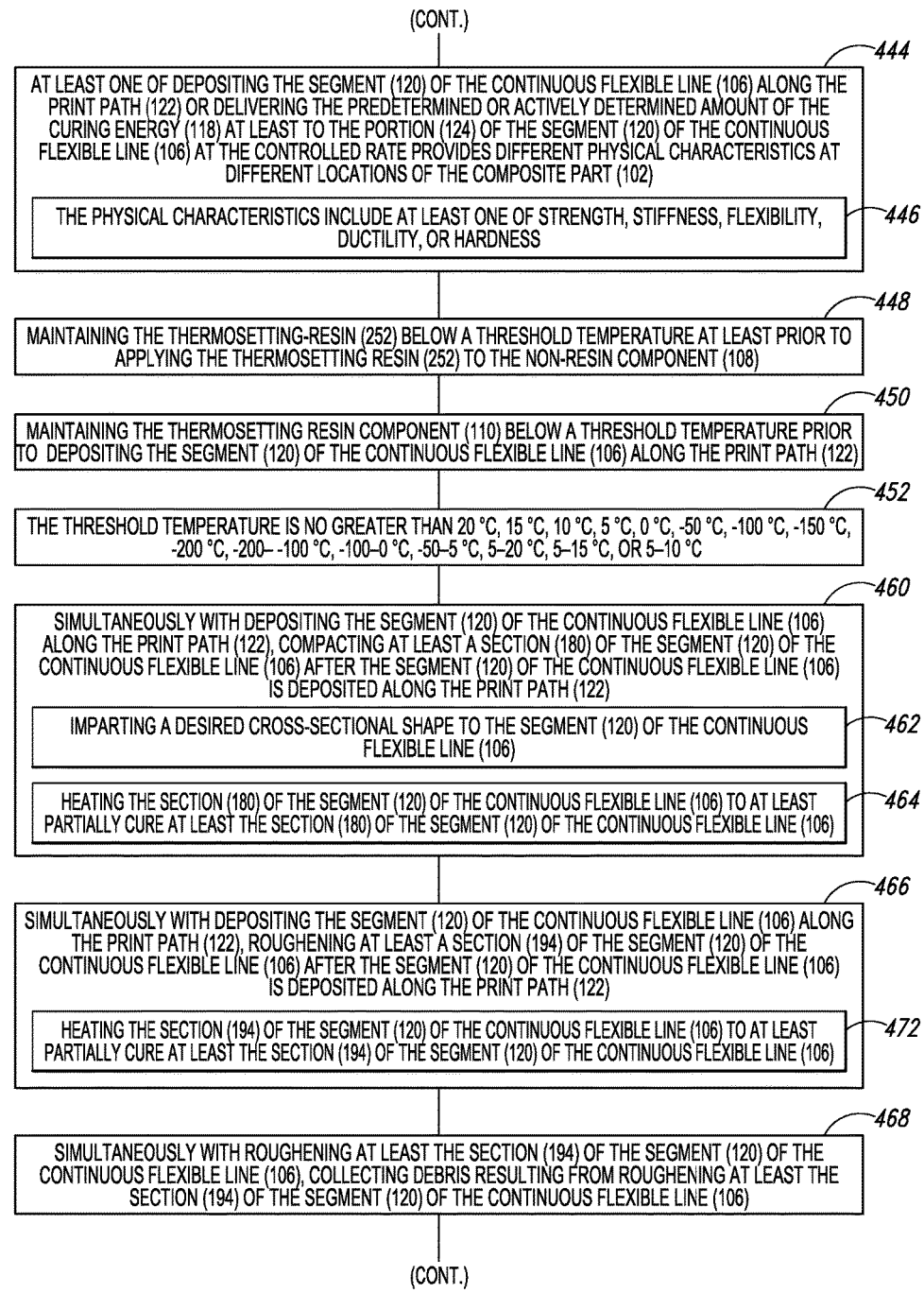
Figure 43E:
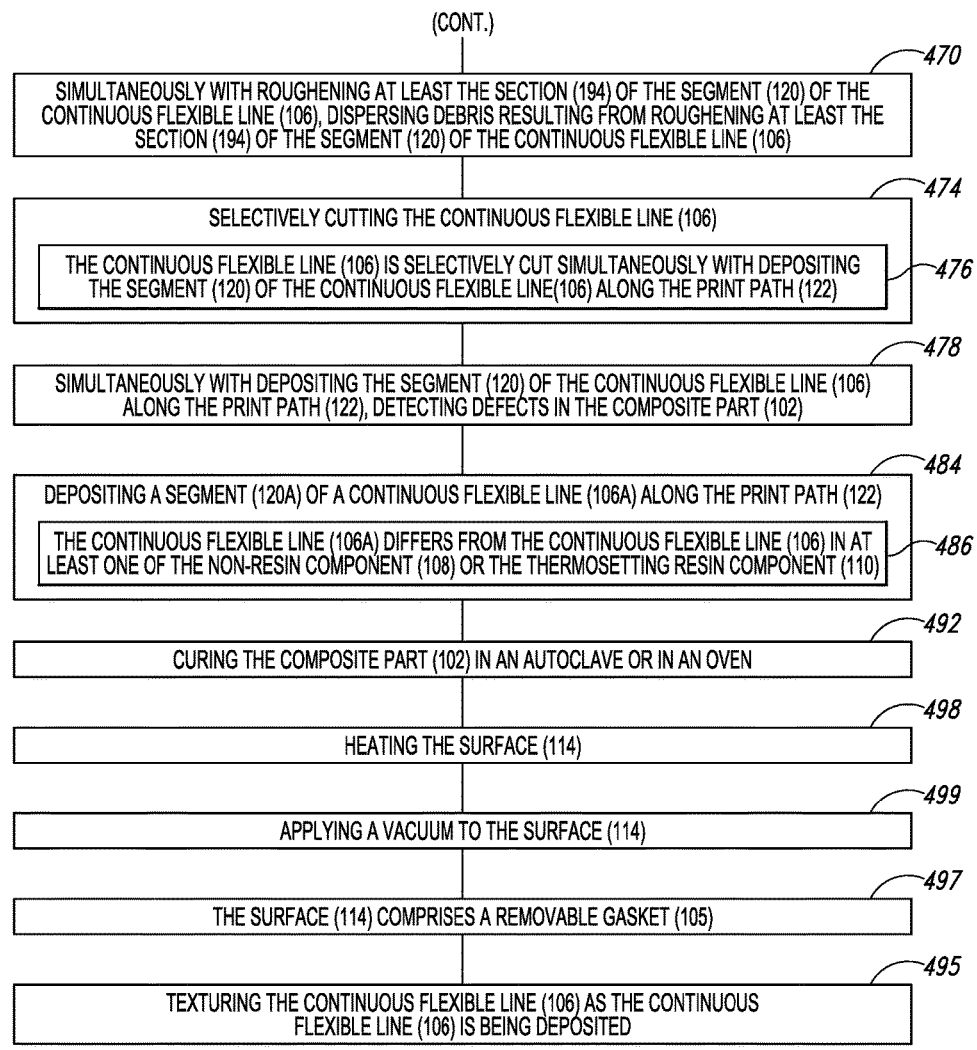
Figure 44A:
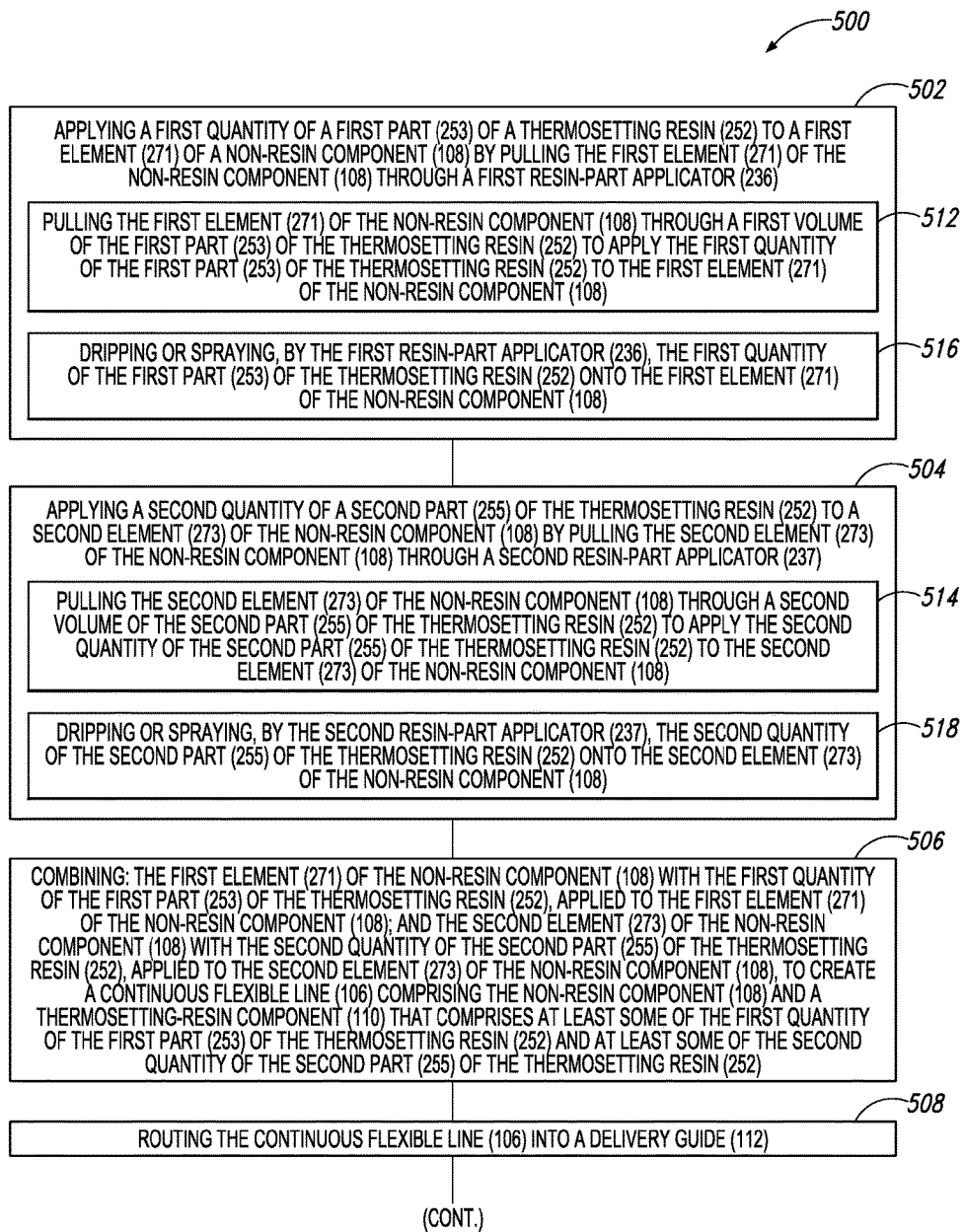
Figure 44B:
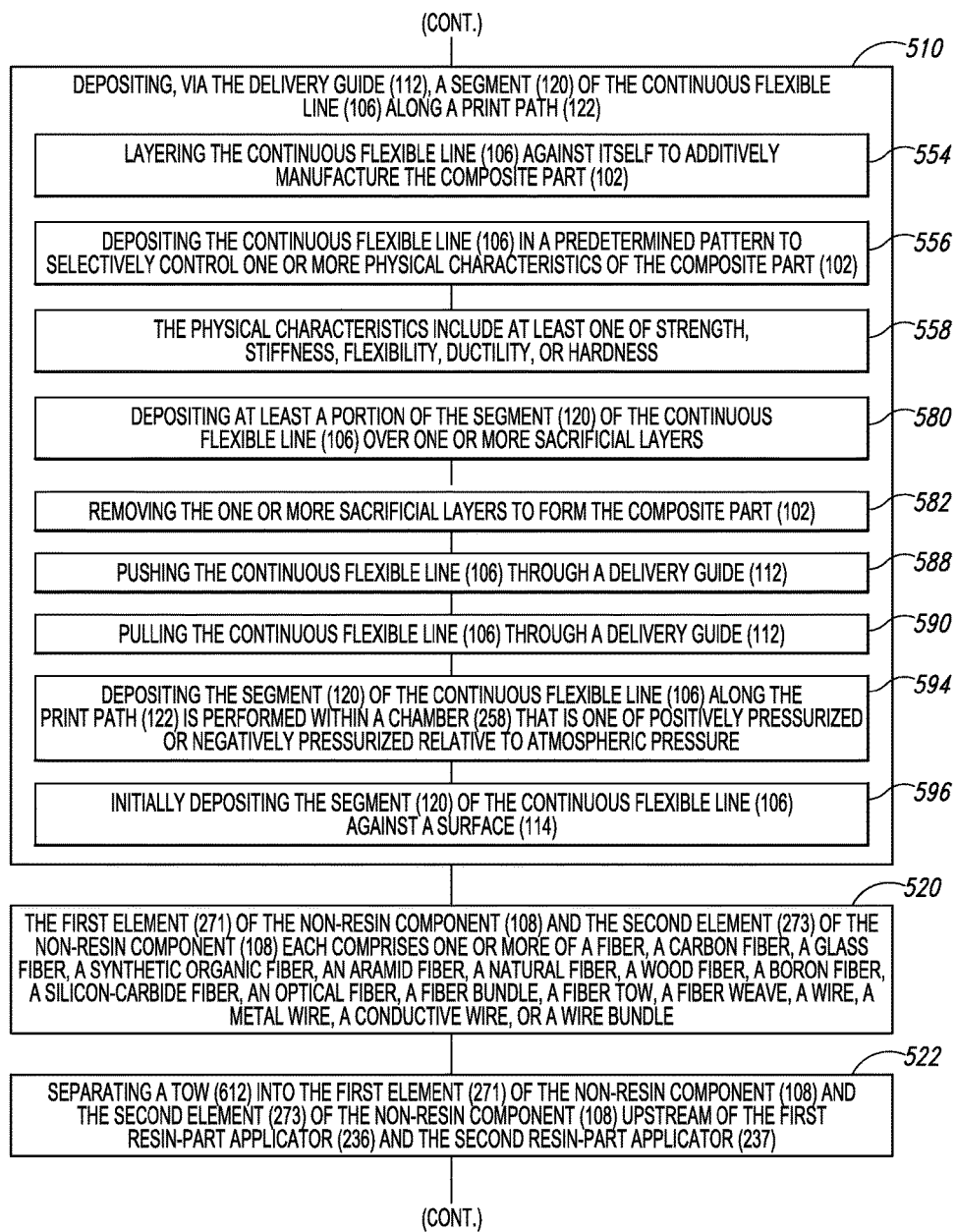
Figure 44D:
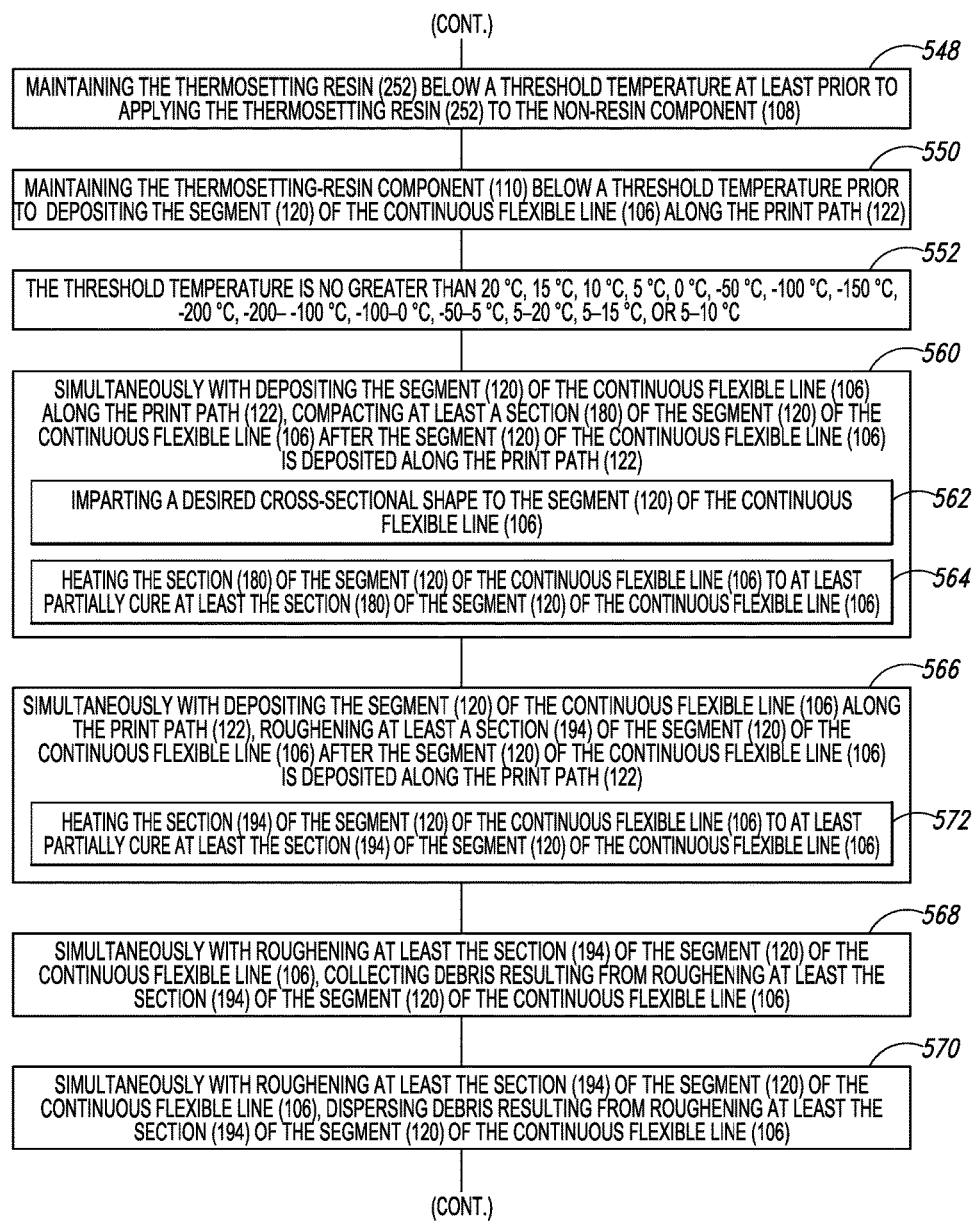
Figure 44E:
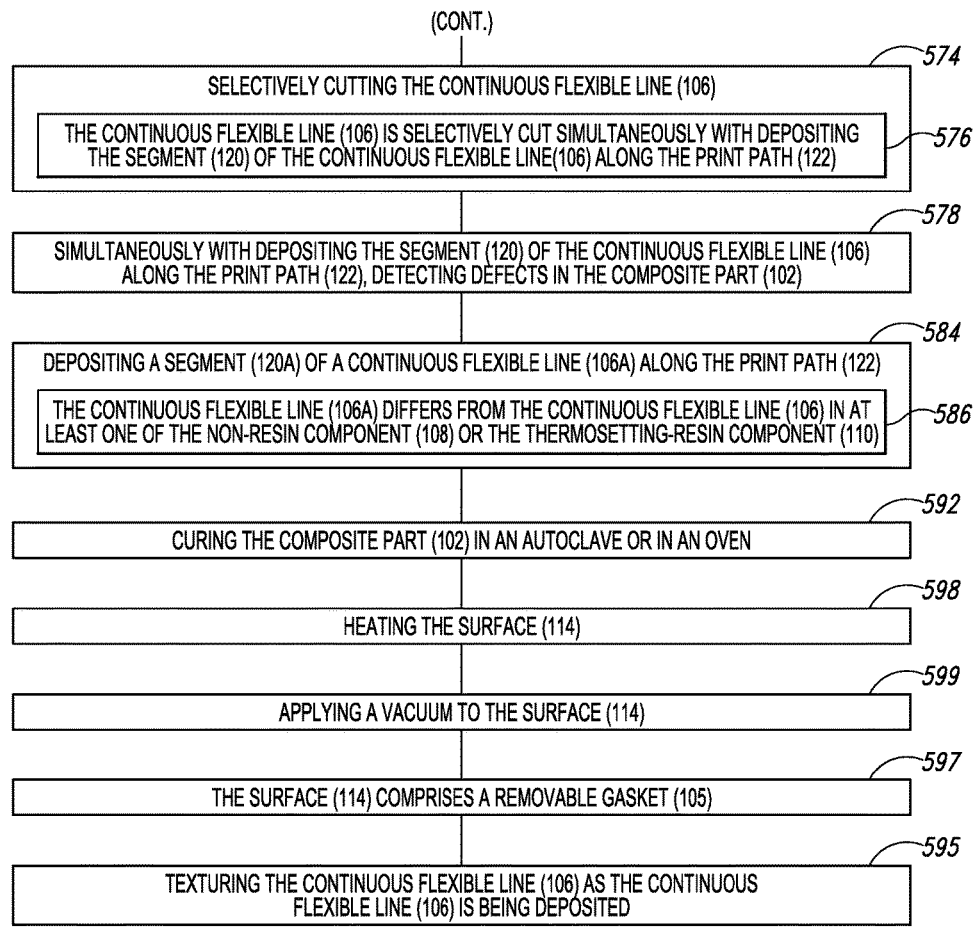
Figure 45:
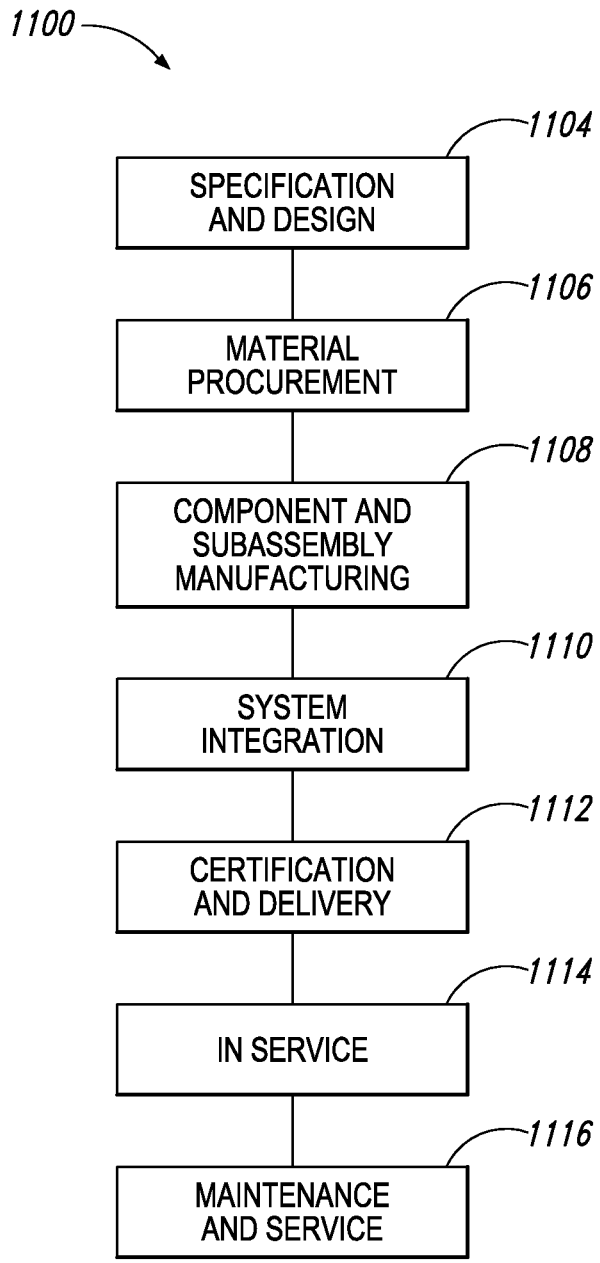
Figure 46:
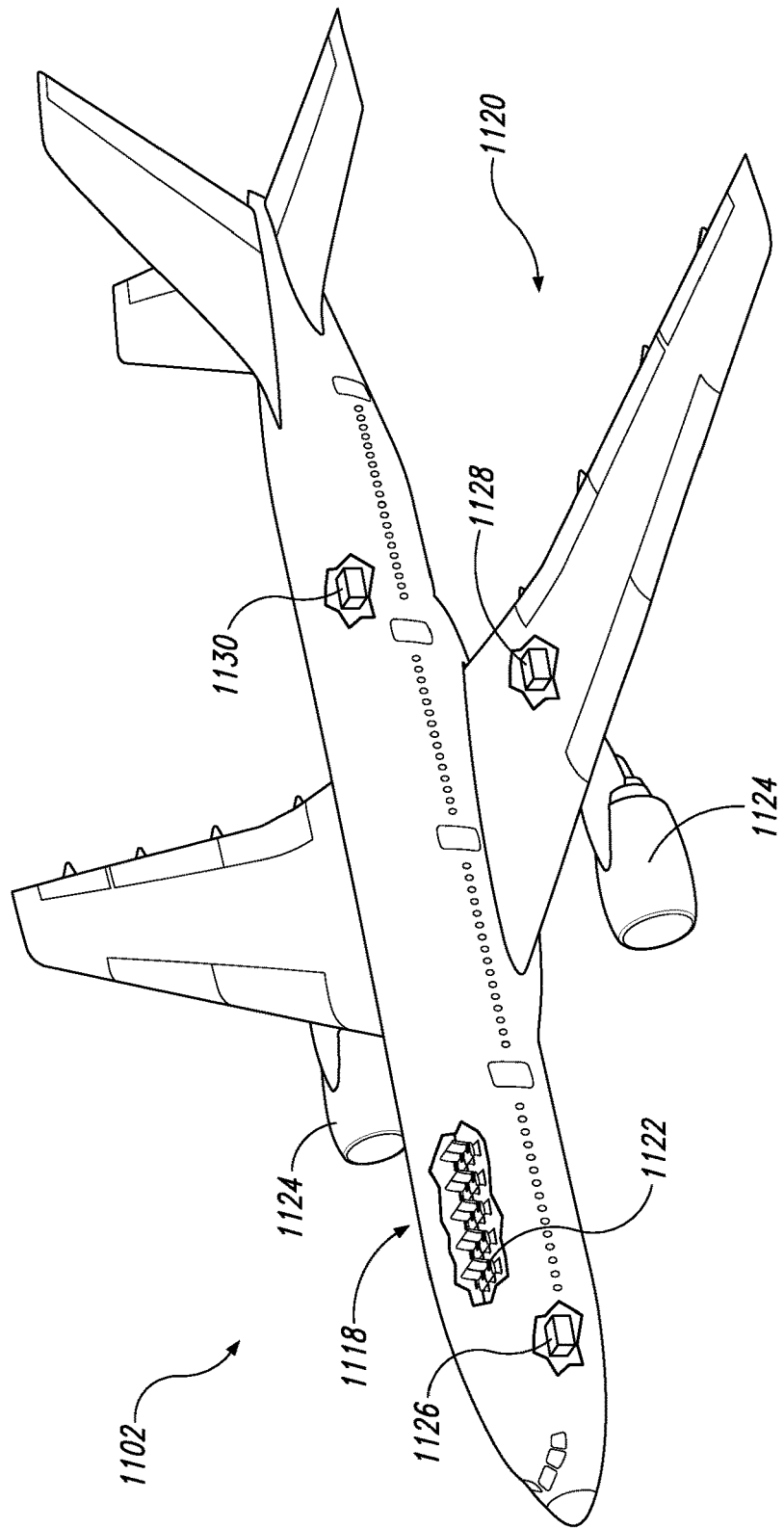

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a schematic diagram of a system for additively manufacturing a composite part, according to one or more examples of the present disclosure;

FIG. 2 is a schematic diagram of another system for additively manufacturing a composite part, according to one or more examples of the present disclosure;

FIG. 3 is a schematic cross-sectional view of a first resin-part applicator of the system of FIG. 1, according to one or more examples of the present disclosure;

FIG. 4 is a schematic cross-sectional view of a second resin-part applicator of the system of FIG. 1, according to one or more examples of the present disclosure;

FIG. 5 is a cross-sectional view of a first resin-part applicator of the system of FIG. 2, according to one or more examples of the present disclosure;

FIG. 6 is a cross-sectional view of a second resin-part applicator of the system of FIG. 2, according to one or more examples of the present disclosure;

FIG. 7 is a schematic cross-sectional view of a continuous flexible line deposited by the system of FIG. 1, according to one or more examples of the present disclosure;

FIG. 8 is a schematic cross-sectional view of a continuous flexible line deposited by the systems of FIG. 1 or 2, according to one or more examples of the present disclosure;

FIG. 9 is a schematic cross-sectional view of a continuous flexible line deposited by the systems of FIG. 1 or 2, according to one or more examples of the present disclosure;

FIG. 10 is a schematic cross-sectional view of a continuous flexible line deposited by the systems of FIG. 1 or 2, according to one or more examples of the present disclosure;

FIG. 11 is a schematic cross-sectional view of a continuous flexible line deposited by the systems of FIG. 1 or 2, according to one or more examples of the present disclosure;

FIG. 12 is a schematic cross-sectional view of a continuous flexible line deposited by the systems of FIG. 1 or 2, according to one or more examples of the present disclosure;

FIG. 13 is a schematic view of a portion of the systems of FIG. 1 or 2, illustrating two layers of continuous flexible line being cured simultaneously, according to one or more examples of the present disclosure;

FIG. 14 is a schematic illustration of a portion of the systems of FIG. 1 or 2, in which a delivery guide comprises a curing-energy passage, according to one or more examples of the present disclosure;

FIG. 15 is a schematic illustration of a portion of the systems of FIG. 1 or 2, in which a delivery guide comprises a curing-energy passage and curing energy is delivered in the form of a ring, according to one or more examples of the present disclosure;

FIG. 16 is a schematic illustration of a portion of the systems of FIG. 1 or 2, in which curing energy is delivered in the form of a ring, according to one or more examples of the present disclosure;

FIG. 17 is a schematic illustration of a delivery guide and a compactor, comprising a compaction roller of the systems of FIG. 1 or 2, according to one or more examples of the present disclosure;

FIG. 18 is a schematic illustration of a portion of the systems of FIG. 1 or 2 with a compactor comprising a compaction roller, according to one or more examples of the present disclosure;

FIG. 19 is a schematic illustration of a portion of the systems of FIG. 1 or 2 with a compactor comprising a compaction roller, according to one or more examples of the present disclosure;

FIG. 20 is a schematic illustration of a portion of the systems of FIG. 1 or 2 with a compactor comprising a compaction wiper, according to one or more examples of the present disclosure;

FIG. 21 is a schematic illustration of a portion of the systems of FIG. 1 or 2 with a compactor comprising a skirt, according to one or more examples of the present disclosure;

FIG. 22 is a schematic illustration of a cutter comprising an iris-diaphragm of the systems of FIG. 1 or 2, according to one or more examples of the present disclosure;

FIG. 23 is a schematic illustration of a portion of the systems of FIG. 1 or 2 with a cutter comprising two blades movable relative to a delivery guide, according to one or more examples of the present disclosure;

FIG. 24 is a schematic illustration of a portion of the systems of FIG. 1 or 2 with a cutter comprising at least one blade positioned within a delivery guide, according to one or more examples of the present disclosure;

FIG. 25 is a schematic illustration of the systems of FIG. 1 or 2 with a cutter comprising a cutting laser, according to one or more examples of the present disclosure;

FIG. 26 is a schematic illustration of the systems of FIG. 1 or 2 with a source of curing energy comprising one or more curing lasers, according to one or more examples of the present disclosure;

FIG. 27 is a schematic illustration of a feed assembly and a delivery guide of the systems of FIG. 1 or 2, according to one or more examples of the present disclosure;

FIG. 28 is a schematic diagram of a roller and a scraper of a feed mechanism of the systems of FIG. 1 or 2, according to one or more examples of the present disclosure;

FIG. 29 is a view of the system of FIG. 1 comprising a frame and a drive assembly, according to one or more examples of the present disclosure;

FIG. 30 is a view of the system of FIG. 2 comprising a frame and a drive assembly, according to one or more examples of the present disclosure;

FIG. 31 is a view of a portion of the systems of FIG. 1 or 2 with a cutter, a compactor, a surface roughener, and a curing source comprising a curing laser, according to one or more examples of the present disclosure;

FIG. 32 is a view of a portion of the systems of FIG. 1 or 2 with a curing source comprising a curing laser, according to one or more examples of the present disclosure;

FIG. 33 is a view of a portion of the systems of FIG. 1 or 2 with a compactor and a curing source comprising a curing laser, according to one or more examples of the present disclosure;

FIG. 34 is a view of a portion of the systems of FIG. 1 or 2 with a curing source comprising a curing laser, according to one or more examples of the present disclosure;

FIG. 35 is a view of a portion of the systems of FIG. 1 or 2 with a curing source comprising two curing lasers, according to one or more examples of the present disclosure;

FIG. 36 is a view of a portion of the systems of FIG. 1 or 2 with a curing source comprising four curing lasers, according to one or more examples of the present disclosure;

FIG. 37 is a view of a portion of the systems of FIG. 1 or 2 illustrating a feed mechanism, according to one or more examples of the present disclosure;

FIG. 38 is another view of the portion of FIG. 37;

FIG. 39 is another view of the portion of FIG. 37;

FIG. 40 is a view of a portion of the systems of FIG. 1 or 2 with a cutter comprising two blades movable relative to a delivery guide, according to one or more examples of the present disclosure;

FIG. 41 is another view of the portion of FIG. 40;

FIG. 42 is a schematic illustration of the systems of FIG. 1 or 2, in which twelve degrees of freedom are provided between a delivery guide and a surface, according to one or more examples of the present disclosure;

FIGS. 43A, 43B, 43C, 43D, and 43E collectively are a block diagram of a method for additively manufacturing composite parts, according to one or more examples of the present disclosure;

FIGS. 44A, 44B, 44C, 44D, and 44E collectively are a block diagram of a method for additively manufacturing composite parts, according to one or more examples of the present disclosure;

FIG. 45 is a block diagram representing aircraft production and service methodologies; and FIG. 46 is a schematic illustration of an aircraft.

DETAILED DESCRIPTION

In FIGS. 1 and 2, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the schematic diagram also may exist. Dashed lines, if any, connecting blocks designating the various elements and/or components represent couplings similar in function and purpose to those represented by solid lines; however, couplings represented by the dashed lines either may be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual imaginary elements also may be shown for clarity. Those skilled in the art will appreciate that some of the features illustrated in FIGS. 1 and 2 may be combined in various ways without the need to include other features described in FIGS. 1 and 2, other drawing figures, and/or the accompanying disclosure, even though such combination or combinations are not explicitly illustrated herein. Similarly, additional features not limited to the examples presented, may be combined with some or all of the features shown and described herein.

In FIGS. 43-45, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 43-45 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, or component "configured to" perform a specified function is indeed capable of performing the specified function without any alteration, rather than merely having potential to perform the specified function after further modification. In other words, the system, apparatus, structure, article, element, or component is specifically selected, created, implemented, utilized, programmed, and/or designed for the purpose of performing the specified function. As used herein, "configured to" denotes existing characteristics of a system, apparatus, structure, article, element, or component which enable the system, apparatus, structure, article, element, or component to actually perform the specified function. For purposes of this disclosure, a system, apparatus, structure, article, element, or component described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring, e.g., to FIG. 1, system 100 for additively manufacturing composite part 102 is disclosed. System 100 comprises delivery guide 112, movable relative to surface 114. Delivery guide 112 is configured to deposit at least segment 120 of continuous flexible line 106 along print path 122. Continuous flexible line 106 comprises non-resin component 108 and thermosetting-resin component 110. Thermosetting-resin component 110 comprises first part 253 of thermosetting resin 252 and second part 255 of thermosetting resin 252. Print path 122 is stationary relative to surface 114. System 100 further comprises first resin-part applicator 236, configured to apply a first quantity of first part 253 of thermosetting resin 252 to non-resin component 108. System 100 further comprises second resin-part applicator 237, configured to apply a second quantity of second part 255 of thermosetting resin 252 to at least a portion of the first quantity of first part 253 of thermosetting resin 252, applied to non-resin component 108. System 100 also comprises feed mechanism 104, configured to pull non-resin component 108 through first resin-part applicator 236 and through second resin-part applicator 237, and to push continuous flexible line 106 out of delivery guide 112. The preceding subject matter of this paragraph characterizes example 1 of the present disclosure.

System 100 therefore may be used to manufacture composite parts 102 from at least a composite material that is created from thermosetting resin 252 and non-resin component 108 while composite part 102 is being manufactured. In addition, system 100 may be used to manufacture composite parts 102 with continuous flexible line 106 being oriented in desired and/or predetermined orientations throughout composite part 102, such as to define desired properties of composite part 102.

Because continuous flexible line 106 is created by system 100 during manufacturing of composite part 102, system 100 has the flexibility of permitting selection of different non-resin components 108 and/or different thermosetting resins 252, including different first parts 253 and/or different second parts 255, to customize or otherwise create a desired composite part 102, including optionally a desired composite part 102 with different characteristics at different locations within composite part 102.

Some examples of system 100 additionally or alternatively may be described as 3-D printers.

As mentioned, feed mechanism 104 is configured to push continuous flexible line 106 out of delivery guide 112. That is, feed mechanism 104 is configured to at least initially push continuous flexible line 106 out of delivery guide 112. In other words, delivery guide 112, which deposits continuous flexible line 106 along print path 122, is positioned downstream of feed mechanism 104 with respect to a direction of movement of continuous flexible line 106 when composite part 102 is being manufactured by system 100. In some applications, feed mechanism 104 may only initially push continuous flexible line 106 out of delivery guide 112, and subsequent to continuous flexible line 106 being secured relative to surface 114, the movement of delivery guide 112 relative to surface 114 may operate to pull continuous flexible line 106 out of delivery guide 112 without feed mechanism 104 needing to continuously and operatively push continuous flexible line 106 out of delivery guide 112. In other applications, feed mechanism 104 may continuously and operatively push continuous flexible line 106 out of delivery guide 112 during an entirety of manufacturing of composite part 102. In yet other applications, feed mechanism 104 may intermittently push continuous flexible line 106 out of delivery guide 112 during manufacturing of composite part 102, while at other times continuous flexible line 106 is pulled out of delivery guide 112 simply due to continuous flexible line 106 being secured relative to surface 114 and the movement of delivery guide 112 relative to surface 114.

As used herein, the terms "upstream" and "downstream" relate to the intended direction of travel of continuous flexible line 106, non-resin component 108, thermosetting-resin component 110, and/or thermosetting resin 252 generally through system 100, or portion thereof, including, for example, first resin-part applicator 236, second resin-part applicator 237, feed mechanism 104, and/or delivery guide 112.

As used herein, a "continuous flexible line" is an elongate structure having a length significantly longer than a dimension (e.g., diameter or width) that is transverse, or perpendicular, to its length. As an illustrative, non-exclusive example, continuous flexible line 106 may have a length that is at least 100, at least 1000, at least 10000, at least 100000, or at least 1000000 times greater than its diameter or width.

As used herein, a "thermosetting resin" is a resin material that is configured to be cured, or hardened, by selective application of heat and/or radiation, and/or by time above a threshold curing temperature. Moreover, thermosetting resin 252 is comprised of first part 253 and second part 255. In some examples, thermosetting resin 252 may be an epoxy resin. In some examples, first part 253 and second part 255 may be described as co-reactants. In some examples, such co-reactants may be hardeners or curatives.

As mentioned, delivery guide 112 is movable relative to surface 114. This means that in some examples, system 100 may include delivery guide 112 configured to be selectively moved relative to surface 114, which surface 114 may be a part of system 100 or a part of a structure, such as an airplane wing or a fuselage, etc. Additionally, in examples where system 100 includes surface 114, surface 114 may be selectively moved relative to delivery guide 112. Also, in some examples, system 100 may include delivery guide 112 and surface 114, and both may be selectively moved relative to each other.

Referring generally to FIG. 1 and particularly to, e.g., FIGS. 3, 4, and 29, first resin-part applicator 236 is configured to receive non-resin component 108 and to discharge non-resin component 108 with the first quantity of first part 253 of thermosetting resin 252 applied to non-resin component 108. Second resin-part applicator 237 is configured to receive non-resin component 108 with the first quantity of first part 253 of thermosetting resin 252 applied to non-resin component 108 and to discharge continuous flexible line 106. The preceding subject matter of this paragraph characterizes example 2 of the present disclosure, wherein example 2 also includes the subject matter according to example 1, above.

Accordingly, continuous flexible line 106 is created by pulling non-resin component 108 through first resin-part applicator 236, in which first part 253 of thermosetting resin 252 is applied to non-resin component 108, and subsequently through second resin-part applicator 236, in which second part 255 of thermosetting resin 252 is applied to non-resin component 108 already having first part 253 applied to non-resin component 108. That is, thermosetting-resin component 110 is created by the sequential application of first part 253 and second part 255 to non-resin component 108.

Referring generally to FIG. 1 and particularly to, e.g., FIGS. 3 and 29, first resin-part applicator 236 comprises first vessel 606, configured to hold a first volume of first part 253 of thermosetting resin 252. Feed mechanism 104 is configured to pull non-resin component through the first volume of first part 253 of thermosetting resin 252 held in first vessel 606. The preceding subject matter of this paragraph characterizes example 3 of the present disclosure, wherein example 3 also includes the subject matter according to any one of examples 1 or 2, above.

When first resin-part applicator 236 comprises first vessel 606, a volume of first part 253 may be held therein. Accordingly, by simply pulling non-resin component 108 through the volume of first part 253, first part 253 may be applied to non-resin component 108.

Referring generally to FIG. 1, first vessel 606 comprises first vessel low-level sensor 246, positioned to detect when a level of first part 253 of thermosetting resin 252 in first vessel 606 is at or below a first vessel lower-threshold level. The preceding subject matter of this paragraph characterizes example 4 of the present disclosure, wherein example 4 also includes the subject matter according to example 3, above.

Inclusion of first vessel low-level sensor 246 may be used to alert an operator that the level of first part 253 in first vessel 606 is low and needs replenishing. Additionally or alternatively, first vessel low-level sensor 246 may be used to facilitate an automatic replenishment of first part 253 in first vessel 606.

Referring generally to FIG. 1, system 100 further comprises first supply 262 of first part 253 of thermosetting resin 252. First supply 262 is configured to selectively deliver first part 253 of thermosetting resin 252 to first vessel 606 when the level of first part 253 of thermosetting resin 252 is at or below the first vessel lower-threshold level. The preceding subject matter of this paragraph characterizes example 5 of the present disclosure, wherein example 5 also includes the subject matter according to example 4, above.

By having first supply 262 automatically deliver first part 253 to first vessel 606 responsive to a low level, a desirable amount of first part 253 may be maintained in first vessel 606 without an operator needing to manually replenish it.

Referring generally to FIG. 1, first vessel 606 further comprises first vessel high-level sensor 248, positioned to detect when the level of first part 253 of thermosetting resin 252 in first vessel 606 is at or above a first vessel upper-threshold level. The preceding subject matter of this paragraph characterizes example 6 of the present disclosure, wherein example 6 also includes the subject matter according to any one of examples 4 or 5, above.

Inclusion of first vessel high-level sensor 248 may be used to prevent overfilling of first vessel 606 with first part 253.

Referring generally to FIG. 1, system 100 further comprises first supply 262 of first part 253 of thermosetting resin 252. First supply 262 is configured to selectively deliver first part 253 of thermosetting resin 252 to first vessel 606 when the level of first part 253 of thermosetting resin 252 is at or below the lower-threshold level and to selectively cease delivering first part 253 of thermosetting resin 252 to first vessel 606 when the level of first part 253 of thermosetting resin 252 is at or above the first vessel upper-threshold level. The preceding subject matter of this paragraph characterizes example 7 of the present disclosure, wherein example 7 also includes the subject matter according to example 6, above.

By having first supply 262 automatically deliver first part 253 to first vessel 606 responsive to a low level and automatically cease delivery of first part 253 to first vessel 606 responsive to a high level, a desirable amount of first part 253 may be maintained in first vessel 606 without an operator needing to manually replenish it.

Referring generally to FIG. 1 and particularly to, e.g., FIGS. 4 and 29, second resin-part applicator 237 comprises second vessel 608, configured to hold a second volume of second part 255 of thermosetting resin 252. Feed mechanism 104 is configured to pull non-resin component 108 through the second volume of second part 255 of thermosetting resin 252 held in second vessel 608. The preceding subject matter of this paragraph characterizes example 8 of the present disclosure, wherein example 8 also includes the subject matter according to any one of examples 1-7, above.

When second resin-part applicator 237 comprises second vessel 608, a volume of second part 255 may be held therein. Accordingly, by simply pulling non-resin component 108 through the volume of second part 255, second part 255 may be applied to non-resin component 108 already having first part 253 applied thereto, and resulting in the creation of continuous flexible line 106.

Referring generally to FIG. 1, second vessel 237 comprises second vessel low-level sensor 259, positioned to detect when a level of second part 255 of thermosetting resin 252 in second vessel 608 is at or below a second vessel lower-threshold level. The preceding subject matter of this paragraph characterizes example 9 of the present disclosure, wherein example 9 also includes the subject matter according to example 8, above.

Inclusion of second vessel low-level sensor 259 may be used to alert an operator that the level of second part 255 in second vessel 608 is low and needs replenishing. Additionally or alternatively, second vessel low-level sensor 259 may be used to facilitate an automatic replenishment of second part 255 in second vessel 608.

Referring generally to FIG. 1, system 100 further comprises second supply 263 of second part 255 of thermosetting resin 252. Second supply 263 is configured to selectively deliver second part 255 of thermosetting resin 252 to second vessel 237 when the level of second part 255 of thermosetting resin 252 is at or below the second vessel lower-threshold level. The preceding subject matter of this paragraph characterizes example 10 of the present disclosure, wherein example 10 also includes the subject matter according to example 9, above.

By having second supply 263 automatically deliver second part 255 to second vessel 608 responsive to a low level, a desirable amount of second part 255 may be maintained in second vessel 608 without an operator needing to manually replenish it.

Referring generally to FIG. 1, second vessel 608 further comprises second vessel high-level sensor 269, positioned to detect when the level of second part 255 of thermosetting resin 252 in second vessel 608 is at or above a second vessel upper-threshold level. The preceding subject matter of this paragraph characterizes example 11 of the present disclosure, wherein example 11 also includes the subject matter according to any one of examples 9 or 10, above.

Inclusion of second vessel high-level sensor 269 may be used to prevent overfilling of second vessel 608 with second part 255.

Referring generally to FIG. 1, system 100 further comprises second supply 263 of second part 255 of thermosetting resin 252. Second supply 263 is configured to selectively deliver second part 255 of thermosetting resin 252 to second vessel 608 when the level of second part 255 of thermosetting resin 252 is at or below the lower-threshold level and to selectively cease delivering second part 255 of thermosetting resin 252 to second vessel 608 when the level of second part 255 of thermosetting resin 252 is at or above the second vessel upper-threshold level. The preceding subject matter of this paragraph characterizes example 12 of the present disclosure, wherein example 12 also includes the subject matter according to example 11, above.

By having second supply 263 automatically deliver second part 255 to second vessel 608 responsive to a low level and automatically cease delivery of second part 255 to second vessel 608 responsive to a high level, a desirable amount of second part 255 may be maintained in second vessel 608 without an operator needing to manually replenish it.

Referring generally to FIG. 1, system 100 further comprises second supply 263 of second part 255 of thermosetting resin 252. First resin-part applicator 236 comprises first vessel 606, configured to hold a first volume of first part 253 of thermosetting resin 252. Feed mechanism 104 is configured to pull non-resin component through the first volume of first part 253 of thermosetting resin 252 held in first vessel 606. Second supply 263 is configured to selectively deliver second part 255 of thermosetting resin 252 to second vessel 608 to actively inject a flow of second part 255 of thermosetting resin 252 into second vessel 608 for application to non-resin component 108 with the first quantity of first part 253 of thermosetting resin 252 applied to non-resin component 108. The preceding subject matter of this paragraph characterizes example 13 of the present disclosure, wherein example 13 also includes the subject matter according to any one of examples 8-12, above.

By having a flow of second part 255 actively injected into second vessel 608, for example, as opposed to having a volume of second part 255 held in second vessel 608, a desired amount of second part 255 may be applied to non-resin component 108 and first part 253 applied thereto without first part 253 contaminating a volume of second part 255 held in second vessel 608. Moreover, active injection of second part 255 provides for the optional starting and stopping of the application of second part 255, and thus the starting and stopping of the creation of thermosetting-resin component 110 along non-resin component 108, such as to create desired lengths of non-resin component 108 without a counterpart thermosetting-resin component 110 thereon.

Referring generally to FIG. 1, first resin-part applicator 236 comprises first vessel 606, configured to hold a first volume of first part 253 of thermosetting resin 252. Feed mechanism 104 is configured to pull non-resin component 108 through the first volume of first part 253 of thermosetting resin 252 held in first vessel 606. First vessel 606 has a first vessel capacity for holding the first volume of first part 253 of thermosetting resin 252. Second vessel 608 has a second vessel capacity for holding the second volume of second part 255 of thermosetting resin 252. The first vessel capacity is greater than the second vessel capacity. The preceding subject matter of this paragraph characterizes example 14 of the present disclosure, wherein example 14 also includes the subject matter according to any one of examples 8-13, above.

By having the second vessel capacity less than the first vessel capacity, the replenishment of second vessel 608 with second part 255 may provide for less contamination of the second volume of second part 255 held in second vessel 608, and thus may restrict undesirable and premature curing of thermosetting resin 252 within second vessel 608.

Referring generally to FIG. 1, the first vessel capacity is at least ten times the second vessel capacity. The preceding subject matter of this paragraph characterizes example 15 of the present disclosure, wherein example 15 also includes the subject matter according to example 14, above.

Again, by having the second vessel capacity less than the first vessel capacity, the replenishment of second vessel 608 with second part 255 may provide for less contamination of the second volume of second part 255 held in second vessel 608, and thus may restrict undesirable and premature curing of thermosetting resin 252 within second vessel 608.

Referring generally to FIG. 1, first resin-part applicator 236 is configured to drip or spray the first quantity of first part 253 of thermosetting resin 252 onto non-resin component 108 as feed mechanism 104 pulls non-resin component 108 through first resin-part applicator 236. The preceding subject matter of this paragraph characterizes example 16 of the present disclosure, wherein example 16 also includes the subject matter according to any one of examples 1, 2, or 8-13, above.

By having first resin-part applicator 236 drip or spray first part 253 onto non-resin component 108, a desired first quantity of first part 253 may be controlled. Moreover, a more uniform application of first part 253 to non-resin component 108 may result, as opposed to, for example, pulling non-resin component 108 through a volume of first part 253.

Referring generally to FIG. 1, second resin-part applicator 237 is configured to drip or spray the second quantity of second part 255 of thermosetting resin 252 onto non-resin component 108 with the first quantity of first part 253 of thermosetting resin 252 applied to non-resin component 108. The preceding subject matter of this paragraph characterizes example 17 of the present disclosure, wherein example 17 also includes the subject matter according to any one of examples 1-7 or 16, above.

By having second resin-part applicator 237 drip or spray second part 255 onto non-resin component 108 with first part 253 applied thereto, a desired second quantity of second part 255 may be controlled. Moreover, a more uniform application of second part 255 may result, as opposed to, for example, pulling non-resin component 108 through a volume of second part 253. Also, by dripping or spraying second part 255, a volume of second part 255 is not necessarily contaminated with first part 253, as non-resin component 108 with first part 253 applied thereto is pulled through second resin-part applicator 237.

Referring generally to FIG. 1 and particularly to, e.g., FIG. 3, first resin-part applicator 236 comprises first applicator inlet 238, through which non-resin component 108 is received into first resin-part applicator 236, and first applicator outlet 240, through which non-resin component 108 with the first quantity of first part 253 of thermosetting resin 252, applied to non-resin component 108, is discharged from first resin-part applicator 236. The preceding subject matter of this paragraph characterizes example 18 of the present disclosure, wherein example 18 also includes the subject matter according to any one of examples 1-17, above.

First resin-part applicator 236 comprising first applicator inlet 238 and first applicator outlet 240 provides a discrete path through first resin-part applicator 236 for non-resin component 108 to enter and exit.

Referring generally to FIG. 1 and particularly to, e.g., FIG. 3, first applicator outlet 240 comprises first applicator convergent passage 242, shaped to limit an amount of first part 253 of thermosetting resin 252 exiting first resin-part applicator 236. The preceding subject matter of this paragraph characterizes example 19 of the present disclosure, wherein example 19 also includes the subject matter according to example 18, above.

In this example, first applicator convergent passage 242 therefore ensures that a desired amount of first part 253 is applied to non-resin component 108. Moreover, first applicator convergent passage 242 may facilitate adequate penetration of first part 253 into non-resin component 108 depending on the configuration of non-resin component 108.

Referring generally to FIG. 1 and particularly to, e.g., FIG. 3, first applicator convergent passage 242 is shaped to facilitate uniform application of first part 253 of thermosetting resin 252 to non-resin component 108. The preceding subject matter of this paragraph characterizes example 20 of the present disclosure, wherein example 20 also includes the subject matter according to example 19, above.

In this example, first applicator convergent passage 242 therefore ensures that a uniform application of first part 253 to non-resin component 108 is accomplished as non-resin component 108 is pulled through first resin-part applicator 236. Such a uniform application of first part 253 may be desirable to create a uniform application of thermosetting-resin component 110 on non-resin component 108, as well as to prevent undesirable voids being formed in composite part 102.

Referring generally to FIG. 1 and particularly to, e.g., FIG. 3, first resin-part applicator 236 further comprises first applicator guide 244, positioned to route non-resin component 108 through first resin-part applicator 236 along a predetermined path. The preceding subject matter of this paragraph characterizes example 21 of the present disclosure, wherein example 21 also includes the subject matter according to any one of examples 18-20, above.

First applicator guide 244 may comprise any suitable structure and be provided to ensure non-resin component 108 comes into contact with a sufficient volume of first part 253 as non-resin component 108 is routed through first resin-part applicator 236.

Referring generally to FIG. 1 and particularly to, e.g., FIG. 3, first applicator guide 244 is positioned to impart no bend less than 60 degrees between any two sequential segments of non-resin component 108 as non-resin component 108 travels through first resin-part applicator 236. The preceding subject matter of this paragraph characterizes example 22 of the present disclosure, wherein example 22 also includes the subject matter according to example 21, above.

Limiting bending of non-resin component 108 may prevent damage to non-resin component 108.

Referring generally to FIG. 1 and particularly to, e.g., FIG. 3, first applicator guide 244 comprises two or more first applicator guide structures 245. The preceding subject matter of this paragraph characterizes example 23 of the present disclosure, wherein example 23 also includes the subject matter according to any one of examples 21 or 22, above.

Inclusion of two or more first applicator guide structures 245 may facilitate a desired amount of first part 253 coming into contact with non-resin component 108 as it is routed through first resin-part applicator 236.

Referring generally to FIG. 1 and particularly to, e.g., FIG. 3, first applicator guide 244 comprises one or more first applicator rollers 247. The preceding subject matter of this paragraph characterizes example 24 of the present disclosure, wherein example 24 also includes the subject matter according to any one of examples 21-23, above.

First applicator rollers 247 may facilitate the pulling of non-resin component 108 through first resin-part applicator 236, thereby reducing friction between non-resin component 108 and first applicator guide 244 and preventing damage to non-resin component 108.

Referring generally to FIG. 1, at least one of first applicator rollers 247 comprises first applicator motorized roller 249, configured to facilitate movement of non-resin component 108 through first resin-part applicator 236. The preceding subject matter of this paragraph characterizes example 25 of the present disclosure, wherein example 25 also includes the subject matter according to example 24, above.

By including first applicator motorized roller 249, movement of non-resin component 108 is facilitated though first resin-part applicator 236.

In FIG. 1, first applicator motorized roller 249 is schematically and optionally illustrated opposite another first applicator roller 247, which optionally may be motorized or not motorized and with non-resin component 108 in engagement between the two first applicator rollers 247 to facilitate movement of non-resin component 108 through first resin-part applicator 236.

Referring generally to FIG. 1, feed mechanism 104 comprises driven roller 158, which is configured to engage continuous flexible line 106 and selectively rotate to push continuous flexible line 106 through delivery guide 112. Driven roller 158 is communicatively coupled to first applicator motorized roller 249 for coordinated movement of non-resin component 108 and continuous flexible line 106. The preceding subject matter of this paragraph characterizes example 26 of the present disclosure, wherein example 26 also includes the subject matter according to example 25, above.

Feed mechanism 104 comprising driven roller 158 and driven roller 158 being communicatively coupled to first applicator motorized roller 249 facilitates coordinated movement of non-resin component 108 and continuous flexible line 106 through system 100.

Referring generally to FIG. 1 and particularly to, e.g., FIG. 4, second resin-part applicator 237 comprises second applicator inlet 239 through which non-resin component 108 with the first quantity of first part 253 of thermosetting resin 252, applied to non-resin component 108, is received into second resin-part applicator 237. Second resin-part applicator 237 also comprises second applicator outlet 241, through which continuous flexible line 106 is discharged from second resin-part applicator 237. The preceding subject matter of this paragraph characterizes example 27 of the present disclosure, wherein example 27 also includes the subject matter according to any one of examples 1-26, above.

Second resin-part applicator 237 comprising second applicator inlet 239 and second applicator outlet 241 provides a discrete path through second resin-part applicator 237 for non-resin component 108 to enter with first 253 applied thereto and exit with both first part 253 and second part 255 applied thereto to create continuous flexible line 106.

Referring generally to FIG. 1 and particularly to, e.g., FIG. 4, second applicator outlet 241 comprises second applicator convergent passage 243, shaped to limit an amount of second part 255 of thermosetting resin 252 exiting second resin-part applicator 237. The preceding subject matter of this paragraph characterizes example 28 of the present disclosure, wherein example 28 also includes the subject matter according to example 27, above.

In this example, second applicator convergent passage 243 therefore ensures that a desired amount of second part 255 is applied to non-resin component 108 and first part 253 applied thereon. Moreover, second applicator convergent passage 243 may facilitate adequate penetration of second part 255 into first part 253 and/or non-resin component 108, as well as the intermixing of first part 253 and second part 255 on non-resin component 108 to create thermosetting-resin component 110.

Referring generally to FIG. 1 and particularly to, e.g., FIG. 4, second applicator convergent passage 243 is shaped to facilitate uniform application of second part 255 of thermosetting resin 252 to non-resin component 108 with first part 253 of thermosetting resin 252 applied to non-resin component 108. The preceding subject matter of this paragraph characterizes example 29 of the present disclosure, wherein example 29 also includes the subject matter according to example 28 above.

In this example, second applicator convergent passage 243 therefore ensures that a uniform application of second part 255 to non-resin component 108 with first part 253 thereon is accomplished as non-resin component 108 is pulled through second resin-part applicator 237. Such a uniform application of second part 255 may be desirable to create a uniform application of thermosetting-resin component 110 on non-resin component 108, as well as to prevent undesirable voids being formed in composite part 102.

Referring generally to FIG. 1 and particularly to, e.g., FIG. 4, second resin-part applicator 237 further comprises second applicator guide 251, positioned to route non-resin component 108 with the first quantity of first part 253 of thermosetting resin 252, applied to non-resin component 108 through second resin-part applicator 237 along a predetermined path. The preceding subject matter of this paragraph characterizes example 30 of the present disclosure, wherein example 30 also includes the subject matter according to any one of examples 27-29, above.

Second applicator guide 251 may comprise any suitable structure and be provided to ensure non-resin component 108 with first part 253 thereon comes into contact with a sufficient volume of second part 255 as non-resin component 108 is routed through second resin-part applicator 237.

Referring generally to FIG. 1 and particularly to, e.g., FIG. 4, second applicator guide 251 is positioned to impart no bend less than 60-degrees between any two sequential segments of non-resin component 108 as non-resin component 108 travels through second resin-part applicator 237. The preceding subject matter of this paragraph characterizes example 31 of the present disclosure, wherein example 31 also includes the subject matter according to example 30, above.

Limiting bending of non-resin component 108 may prevent damage to non-resin component 108.

Referring generally to FIG. 1 and particularly to, e.g., FIG. 4, second applicator guide 251 comprises two or more second applicator guide structures 254. The preceding subject matter of this paragraph characterizes example 32 of the present disclosure, wherein example 32 also includes the subject matter according to any one of examples 30 or 31, above.

Inclusion of two or more second applicator guide structures 254 may facilitate a desired amount of second part 255 coming into contact with the first quantity of first part 253 on non-resin component 108 as it is routed through second resin-part applicator 237.

Referring generally to FIG. 1 and particularly to, e.g., FIG. 4, second applicator guide 251 comprises one or more second applicator rollers 256. The preceding subject matter of this paragraph characterizes example 33 of the present disclosure, wherein example 33 also includes the subject matter according to any one of examples 30-32, above.

Second applicator rollers 256 may facilitate the pulling of non-resin component 108 through second resin-part applicator 237, thereby reducing friction between non-resin component 108 and second applicator guide 251 and preventing damage to non-resin component 108.

Referring generally to FIG. 1, at least one second applicator rollers 256 comprises second applicator motorized roller 257, configured to facilitate movement of non-resin component 108 through second resin-part applicator 237. The preceding subject matter of this paragraph characterizes example 34 of the present disclosure, wherein example 34 also includes the subject matter according to example 33, above.

By including second applicator motorized roller 257, movement of non-resin component 108 is facilitated though second resin-part applicator 237.

In FIG. 1, second applicator motorized roller 257 is schematically and optionally illustrated opposite another second applicator roller 256, which optionally may be motorized or not motorized and with non-resin component 108 with at least first part 253 thereon in engagement between the two second applicator rollers 256 to facilitate movement of non-resin component 108 through second resin-part applicator 237.

Referring generally to FIG. 1, feed mechanism 104 comprises driven roller 158, which is configured to engage continuous flexible line 106 and selectively rotate to push continuous flexible line 106 through delivery guide 112. Driven roller 158 is communicatively coupled to second applicator motorized roller 257 for coordinated movement of non-resin component 108 and continuous flexible line 106. The preceding subject matter of this paragraph characterizes example 35 of the present disclosure, wherein example 35 also includes the subject matter according to example 34, above.

Feed mechanism 104 comprising driven roller 158 and driven roller 158 being communicatively coupled to second applicator motorized roller 257 facilitates coordinated movement of non-resin component 108 and continuous flexible line 106 through system 100.

Referring generally to FIG. 1 and particularly to, e.g., FIGS. 7 and 8, non-resin component 108 comprises one or more of a fiber, a carbon fiber, a glass fiber, a synthetic organic fiber, an aramid fiber, a natural fiber, a wood fiber, a boron fiber, a silicon-carbide fiber, an optical fiber, a fiber bundle, a fiber tow, a fiber weave, a wire, a metal wire, a conductive wire, or a wire bundle. The preceding subject matter of this paragraph characterizes example 36 of the present disclosure, wherein example 36 also includes the subject matter according to any one of examples 1-35, above.

Inclusion of a fiber or fibers in continuous flexible line 106 permits for selecting desired properties of composite part 102. Moreover, selection of specific materials of fibers and/or selection of specific configurations of fibers (e.g., a bundle, a tow, and/or a weave) may permit for precise selection of desired properties of composite part 102. Example properties of composite parts 102 include strength, stiffness, flexibility, ductility, hardness, electrical conductivity, thermal conductivity, etc. Non-resin component 108 is not limited to the identified examples, and other types of non-resin component 108 may be used.

Referring generally to FIG. 1, system 100 further comprises origin 126 of non-resin component 108. The preceding subject matter of this paragraph characterizes example 37 of the present disclosure, wherein example 37 also includes the subject matter according to any one of examples 1-36, above.

System 100, with origin 126, includes the material itself that defines non-resin component 108. When provided, origin 126 may provide one or more non-resin components 108, such as including a first non-resin component 108 with first desired properties and a second non-resin component 108 with second desired properties that are different from the first desired properties. For example, when more than one non-resin component 108 is provided, one or more may be selected for desired properties of composite part 102.

Referring generally to FIG. 1 and particularly to, e.g., FIG. 29, origin 126 of non-resin component 108 comprises spool 128 of non-resin component 108. The preceding subject matter of this paragraph characterizes example 38 of the present disclosure, wherein example 38 also includes the subject matter according to example 37, above.

Origin 126 in the form of spool 128 may provide a significant length of non-resin component 108 in a compact volume that is readily replenished or replaced during a manufacturing operation. Other forms for origin 126 also are within the scope of the present disclosure and are not limited to spool 128.

Referring, e.g., to FIG. 2, system 700 for additively manufacturing composite part 102 is disclosed. System 700 comprises delivery guide 112, movable relative to surface 114. Delivery guide 112 is configured to deposit at least segment 120 of continuous flexible line 106 along print path 122. Continuous flexible line 106 comprises non-resin component 108 and thermosetting-resin component 110. Thermosetting-resin component 110 comprises first part 253 of thermosetting resin 252 and second part 255 of thermosetting resin 252. Print path 122 is stationary relative to surface 114. Non-resin component 108 comprises at least first element 271 and second element 273. System 700 further comprises first resin-part applicator 236, configured to apply a first quantity of first part 253 of thermosetting resin 252 to first element 271 of non-resin component 108. System 700 also comprises second resin-part applicator 237, configured to apply a second quantity of second part 255 of thermosetting resin 252 to second element 273 of non-resin component 108. System 700 additionally comprises feed mechanism 104, configured to pull first element 271 of non-resin component 108 through first resin-part applicator 236, to pull second element 273 of non-resin component 108 through second resin-part applicator 237, and to push continuous flexible line 106 out of delivery guide 112. The preceding subject matter of this paragraph characterizes example 39 of the present disclosure.

System 700 therefore may be used to manufacture composite parts 102 from at least a composite material that is created from thermosetting resin 252 and non-resin component 108 while composite part 102 is being manufactured. In addition, system 700 may be used to manufacture composite parts 102 with continuous flexible line 106 being oriented in desired and/or predetermined orientations throughout composite part 102, such as to define desired properties of composite part 102.

Because continuous flexible line 106 is created by system 700 during manufacturing of composite part 102, system 100 has the flexibility of permitting selection of different non-resin components 108, including different first elements 271 and/or different second elements 273, and/or different thermosetting resins 252, including different first parts 252 and/or different second parts 255, to customize or otherwise create a desired composite part 102, including optionally a desired composite part 102 with different characteristics at different locations within composite part 102.

Some examples of system 700 additionally or alternatively may be described as 3-D printers.

As mentioned, feed mechanism 104 is configured to push continuous flexible line 106 out of delivery guide 112. That is, feed mechanism 104 is configured to at least initially push continuous flexible line 106 out of delivery guide 112. In other words, delivery guide 112, which deposits continuous flexible line 106 along print path 122, is positioned downstream of feed mechanism 104 with respect to a direction of movement of continuous flexible line 106 when composite part 102 is being manufactured by system 700. In some applications, feed mechanism 104 may only initially push continuous flexible line 106 out of delivery guide 112, and subsequent to continuous flexible line being secured relative to surface 114, the movement of delivery guide 112 relative to surface 114 may operate to pull continuous flexible line 106 out of delivery guide 112 without feed mechanism 104 needing to continuously and operatively push continuous flexible line 106 out of delivery guide 112. In other applications, feed mechanism 104 may continuously and operatively push continuous flexible line 106 out of delivery guide 112 during an entirety of manufacturing of composite part 102. In yet other applications, feed mechanism 104 may intermittently push continuous flexible line 106 out of delivery guide 112 during manufacturing of composite part 102, while at other times continuous flexible line 106 is pulled out of delivery guide 112 simply due to continuous flexible line 106 being secured relative to surface 114 and the movement of delivery guide 112 relative to surface 114.

As used herein, the terms "upstream" and "downstream" relate to the intended direction of travel of continuous flexible line 106, non-resin component 108, first element 271, second element 273, thermosetting-resin component 110, and/or thermosetting resin 252 generally through system 700, or portion thereof, including, for example, first resin-part applicator 236, second resin-part applicator 237, feed mechanism 104, and/or delivery guide 112.

As mentioned, delivery guide 112 is movable relative to surface 114. This means that in some examples, system 700 may include delivery guide 112 configured to be selectively moved relative to surface 114, which surface 114 may be a part of system 700 or a part of a structure, such as an airplane wing or a fuselage, etc. Additionally, in examples where system 700 includes surface 114, surface 114 may be selectively moved relative to delivery guide 112. Also, in some examples, system 700 may include delivery guide 112 and surface 114, and both may be selectively moved relative to each other.

System 700 differs from system 100 in that in system 700, non-resin component 108 is created from at least two component parts, i.e., first element 271 and second element 283. Moreover, in system 700, first part 253 of thermosetting resin 252 is applied to first element 271 while second part 255 of thermosetting resin 252 is applied to second element 273 prior to first element 271 and second element 273 being combined to create all of non-resin component 108, thermosetting-resin component 110, and continuous flexible line 106.

Referring generally to FIG. 2 and particularly to, e.g., FIGS. 5, 6, and 30, first resin-part applicator 236 is configured to receive first element 271 of non-resin component 108 and to discharge first element 271 of non-resin component 108 with the first quantity of first part 253 of thermosetting resin 252, applied to first element 271 of non-resin component 108. Second resin-part applicator 237 is configured to receive second element 273 of non-resin component 108 and to discharge second element 273 of non-resin component 108 with the second quantity of second part 255 of thermosetting resin 252, applied to second element 273 of non-resin component 108. The preceding subject matter of this paragraph characterizes example 40 of the present disclosure, wherein example 40 also includes the subject matter according to example 39, above.

Accordingly, continuous flexible line 106 is created by pulling first element 271 through first resin-part applicator 236, in which first part 253 of thermosetting resin 252 is applied to first element 271, simultaneously pulling second element 273 through second resin-part applicator 237, in which second part 255 of thermosetting resin 252 is applied to second element 273, and subsequently bringing together first element 271 with first part 253 and second element 273 with second part 255.

Referring generally to FIG. 2 and particularly to, e.g., FIGS. 5 and 30, first resin-part applicator 236 comprises first vessel 606, configured to hold a first volume of first part 253 of thermosetting resin 252. Feed mechanism 104 is configured to pull first element 271 of non-resin component through the first volume of first part 253 of thermosetting resin 252 held in first vessel 606. The preceding subject matter of this paragraph characterizes example 41 of the present disclosure, wherein example 41 also includes the subject matter according to any one of examples 39 or 40, above.

When first resin-part applicator 236 comprises first vessel 606, a volume of first part 253 may be held therein. Accordingly, by simply pulling first element 271 through the volume of first part 253, first part 253 may be applied to first element 271.

Referring generally to FIG. 2, first vessel 606 comprises first vessel low-level sensor 246, positioned to detect when a level of first part 253 of thermosetting resin 252 in first vessel 606 is at or below a first vessel low-threshold level. The preceding subject matter of this paragraph characterizes example 42 of the present disclosure, wherein example 42 also includes the subject matter according to example 41, above.

Inclusion of first vessel low-level sensor 246 may be used to alert an operator that the level of first part 253 in first vessel 606 is low and needs replenishing. Additionally or alternatively, first vessel low-level sensor 246 may be used to facilitate an automatic replenishment of first part 253 in first vessel 606.

Referring generally to FIG. 2, system 700 further comprises first supply 262 of first part 253 of thermosetting resin 252. First supply 262 is configured to selectively deliver first part 253 of thermosetting resin 252 to first vessel 606 when the level of first part 253 of thermosetting resin 252 is at or below the first vessel lower-threshold level. The preceding subject matter of this paragraph characterizes example 43 of the present disclosure, wherein example 43 also includes the subject matter according to example 42, above.

By having first supply 262 automatically deliver first part 253 to first vessel 606 responsive to a low level, a desirable amount of first part 253 may be maintained in first vessel 606 without an operator needing to manually replenish it.

Referring generally to FIG. 2, first vessel 606 further comprises first vessel high-level sensor 248, positioned to detect when the level of first part 253 of thermosetting resin 252 in first vessel 606 is at or above a first vessel upper-threshold level. The preceding subject matter of this paragraph characterizes example 44 of the present disclosure, wherein example 44 also includes the subject matter according to any one of examples 42 or 43, above.

Inclusion of first vessel high-level sensor 248 may be used to prevent overfilling of first vessel 606 with first part 253.

Referring generally to FIG. 2, system 700 further comprises first supply 262 of first part 253 of thermosetting resin 252. First supply 262 is configured to selectively deliver first part 253 of thermosetting resin 252 to first vessel 606 when the level of first part 253 of thermosetting resin 252 is at or below the lower-threshold level and to selectively cease delivering first part 253 of thermosetting resin 252 to first vessel 606 when the level of first part 253 of thermosetting resin 252 is at or above the first vessel upper-threshold level. The preceding subject matter of this paragraph characterizes example 45 of the present disclosure, wherein example 45 also includes the subject matter according to example 44, above.

By having first supply 262 automatically deliver first part 253 to first vessel 606 responsive to a low level and automatically cease delivery of first part 253 to first vessel 606 responsive to a high level, a desirable amount of first part 253 may be maintained in first vessel 606 without an operator needing to manually replenish it.

Referring generally to FIG. 2 and particularly to, e.g., FIGS. 6 and 30, second resin-part applicator 237 comprises second vessel 608, configured to hold a second volume of second part 255 of thermosetting resin 252. Feed mechanism 104 is configured to pull second element 273 of non-resin component 108 through the second volume of second part 255 of thermosetting resin 252 held in second vessel 608. The preceding subject matter of this paragraph characterizes example 46 of the present disclosure, wherein example 46 also includes the subject matter according to any one of examples 39-45, above.

When second resin-part applicator 237 comprises second vessel 608, a volume of second part 255 may be held therein. Accordingly, by simply pulling second element 273 through the volume of second part 255, second part 255 may be applied to second element 273.

Referring generally to FIG. 2, second vessel 608 comprises second vessel low-level sensor 259, positioned to detect when a level of second part 255 of thermosetting resin 252 in second vessel 608 is at or below a second vessel lower-threshold level. The preceding subject matter of this paragraph characterizes example 47 of the present disclosure, wherein example 47 also includes the subject matter according to example 46, above.

Inclusion of second vessel low-level sensor 259 may be used to alert an operator that the level of second part 255 in second vessel 608 is low and needs replenishing. Additionally or alternatively, second vessel low-level sensor 259 may be used to facilitate an automatic replenishment of second part 255 in second vessel 608.

Referring generally to FIG. 2, system 700 further comprises second supply 263 of second part 255 of thermosetting resin 252. Second supply 263 is configured to selectively deliver second part 255 of thermosetting resin 252 to second vessel 608 when the level of second part 255 of thermosetting resin 252 is at or below the second vessel lower-threshold level. The preceding subject matter of this paragraph characterizes example 48 of the present disclosure, wherein example 48 also includes the subject matter according to example 47, above.

By having second supply 263 automatically deliver second part 255 to second vessel 608 responsive to a low level, a desirable amount of second part 255 may be maintained in second vessel 608 without an operator needing to manually replenish it.

Referring generally to FIG. 2, second vessel 608 further comprises second vessel high-level sensor 269, positioned to detect when the level of second part 255 of thermosetting resin 252 in second vessel 608 is at or above a second vessel upper-threshold level. The preceding subject matter of this paragraph characterizes example 49 of the present disclosure, wherein example 49 also includes the subject matter according to any one of examples 47 or 48, above.

Inclusion of second vessel high-level sensor 269 may be used to prevent overfilling of second vessel 608 with second part 255.

Referring generally to FIG. 2, system 700 further comprises second supply 263 of second part 255 of thermosetting resin 252. Second supply 263 is configured to selectively deliver second part 255 of thermosetting resin 252 to second vessel 608 when the level of second part 255 of thermosetting resin 252 is at or below the lower-threshold level and to selectively cease delivering second part 255 of thermosetting resin 252 to second vessel 608 when the level of second part 255 of thermosetting resin 252 is at or above the second vessel upper-threshold level. The preceding subject matter of this paragraph characterizes example 50 of the present disclosure, wherein example 50 also includes the subject matter according to example 49, above.

By having second supply 263 automatically deliver second part 255 to second vessel 608 responsive to a low level and automatically cease delivery of second part 255 to second vessel 608 responsive to a high level, a desirable amount of second part 255 may be maintained in second vessel 608 without an operator needing to manually replenish it.

Referring generally to FIG. 2, first resin-part applicator 236 is configured to drip or spray the first quantity of first part 253 of thermosetting resin 252 onto first element 271 of non-resin component 108 as feed mechanism 104 pulls first element 271 of non-resin component 108 through first resin-part applicator 236. The preceding subject matter of this paragraph characterizes example 51 of the present disclosure, wherein example 51 also includes the subject matter according to any one of examples 39 or 40, above.

By having first resin-part applicator 236 drip or spray first part 253 onto first element 271, a desired first quantity of first part 253 may be controlled. Moreover, a more uniform application of first part 253 to first element 271 may result, as opposed to, for example, pulling first element 271 through a volume of first part 253.

Referring generally to FIG. 2, second resin-part applicator 237 is configured to drip or spray the second quantity of second part 255 of thermosetting resin 252 onto second element 273 of non-resin component 108 as feed mechanism 104 pulls second element 273 of non-resin component 108 through second resin-part applicator 237. The preceding subject matter of this paragraph characterizes example 52 of the present disclosure, wherein example 52 also includes the subject matter according to any one of examples 39, 40, or 51, above.

By having second resin-part applicator 237 drip or spray second part 255 onto second element 273, a desired second quantity of second part 255 may be controlled. Moreover, a more uniform application of second part 255 may result, as opposed to, for example, pulling second element 273 through a volume of second part 255.

Referring generally to FIG. 2 and particularly to, e.g., FIG. 5, first resin-part applicator 236 comprises first applicator inlet 238, through which first element 271 of non-resin component 108 is received into first resin-part applicator 236. First resin-part applicator 236 also comprises first applicator outlet 240, through which first element 271 of non-resin component 108, with the first quantity of first part 253 of thermosetting resin 252 applied to first element 271 of non-resin component 108, is discharged from first resin-part applicator 236. The preceding subject matter of this paragraph characterizes example 53 of the present disclosure, wherein example 53 also includes the subject matter according to any one of examples 39-52, above.

First resin-part applicator 236 comprising first applicator inlet 238 and first applicator outlet 240 provides a discrete path through first resin-part applicator 236 for first element 271 to enter and exit.

Referring generally to FIG. 2 and particularly to, e.g., FIG. 5, first applicator outlet 240 comprises first applicator convergent passage 242, shaped to limit an amount of first part 253 of thermosetting resin 252, exiting first resin-part applicator 236. The preceding subject matter of this paragraph characterizes example 54 of the present disclosure, wherein example 54 also includes the subject matter according to example 53, above.

In this example, first applicator convergent passage 242 therefore ensures that a desired amount of first part 253 is applied to first element 271. Moreover, first applicator convergent passage 242 may facilitate adequate penetration of first part 253 into first element 271 depending on the configuration of first element 271.

Referring generally to FIG. 2 and particularly to, e.g., FIG. 5, first applicator convergent passage 242 is shaped to facilitate uniform application of first part 253 of thermosetting resin 252 to first element 271 of non-resin component 108. The preceding subject matter of this paragraph characterizes example 55 of the present disclosure, wherein example 55 also includes the subject matter according to example 54, above.

In this example, first applicator convergent passage 242 therefore ensures that a uniform application of first part 253 to first element 271 is accomplished as first element 271 is pulled through first resin-part applicator 236. Such a uniform application of first part 253 may be desirable to intermix with second part 255 applied to second element 273, as well as to prevent undesirable voids being formed in composite part 102.

Referring generally to FIG. 2 and particularly to, e.g., FIG. 5, first resin-part applicator 236 further comprises first applicator guide 244, positioned to route first element 271 of non-resin component 108 through first resin-part applicator 236 along a predetermined path. The preceding subject matter of this paragraph characterizes example 56 of the present disclosure, wherein example 56 also includes the subject matter according to any one of examples 53-55, above.

First applicator guide 244 may comprise any suitable structure and be provided to ensure first element 271 comes into contact with a sufficient volume of first part 253 as first element 271 is routed through first resin-part applicator 236.

Referring generally to FIG. 2 and particularly to, e.g., FIG. 5, first applicator guide 244 is positioned to impart no bend less than 60-degrees between any two sequential segments of first element 271 of non-resin component 108 as first element 271 of non-resin component 108 travels through first resin-part applicator 236. The preceding subject matter of this paragraph characterizes example 57 of the present disclosure, wherein example 57 also includes the subject matter according to example 56, above.

Limiting bending of first element 271 may prevent damage to first element 271.

Referring generally to FIG. 2 and particularly to, e.g., FIG. 5, first applicator guide 244 comprises two or more first applicator guide structures 245. The preceding subject matter of this paragraph characterizes example 58 of the present disclosure, wherein example 58 also includes the subject matter according to any one of examples 56 or 57, above.

Inclusion of two or more first applicator guide structures 244 may facilitate a desired amount of first part 253 coming into contact with first element 271 as it is routed through first resin-part applicator 236.

Referring generally to FIG. 2 and particularly to, e.g., FIG. 5, first applicator guide 244 comprises one or more first applicator rollers 247. The preceding subject matter of this paragraph characterizes example 59 of the present disclosure, wherein example 59 also includes the subject matter according to any one of examples 56-58, above.

First applicator rollers 247 may facilitate the pulling of first element 271 through first resin-part applicator 236, thereby reducing friction between first element 271 and first applicator guide 244 and preventing damage to first element 271.

Referring generally to FIG. 2, at least one of first applicator rollers 247 comprises first applicator motorized roller 249, configured to facilitate movement of first element 271 of non-resin component 108 through first resin-part applicator 236. The preceding subject matter of this paragraph characterizes example 60 of the present disclosure, wherein example 60 also includes the subject matter according to example 59, above.

By including first applicator motorized roller 249, movement of first element 271 is facilitated though first resin-part applicator 236.

In FIG. 2, first applicator motorized roller 249 is schematically and optionally illustrated opposite another first applicator roller 247, which optionally may be motorized or not motorized and with first element 271 in engagement between the two first applicator rollers 247 to facilitate movement of first element 271 through first resin-part applicator 236.

Referring generally to FIG. 2, feed mechanism 104 comprises driven roller 158, which is configured to engage continuous flexible line 106 and selectively rotate to push continuous flexible line 106 through delivery guide 112. Driven roller 158 is communicatively coupled to first applicator motorized roller 249 for coordinated movement of first element 271 of non-resin component 108 and continuous flexible line 106. The preceding subject matter of this paragraph characterizes example 61 of the present disclosure, wherein example 61 also includes the subject matter according to example 60, above.

Feed mechanism 104 comprising driven roller 158 and driven roller 158 being communicatively coupled to first applicator motorized roller 249 facilitates coordinated movement of first element 271 and continuous flexible line 106 through system 700.

Referring generally to FIG. 2 and particularly to, e.g., FIG. 6, second resin-part applicator 237 comprises second applicator inlet 239, through which second element 273 of non-resin component 108 is received into second resin-part applicator 237. Second resin-part applicator 237 also comprises second applicator outlet 241, through which second element 273 of non-resin component 108, with the second quantity of second part 255 of thermosetting resin 252 applied to second element 273 of non-resin component 108, is discharged from second resin-part applicator 237. The preceding subject matter of this paragraph characterizes example 62 of the present disclosure, wherein example 62 also includes the subject matter according to any one of examples 39-61, above.

Second resin-part applicator 237 comprising second applicator inlet 239 and second applicator outlet 241 provides a discrete path through second resin-part applicator 237 for second element 273 to enter and exit.

Referring generally to FIG. 2 and particularly to, e.g., FIG. 6, second applicator outlet 241 comprises second applicator convergent passage 243, shaped to limit an amount of second part 255 of thermosetting resin 252 exiting second resin-part applicator 237. The preceding subject matter of this paragraph characterizes example 63 of the present disclosure, wherein example 63 also includes the subject matter according to example 62, above.

In this example, second applicator convergent passage 243 therefore ensures that a desired amount of second part 255 is applied to second element 273. Moreover, second applicator convergent passage 243 may facilitate adequate penetration of second part 255 into second element 273 depending on the configuration of second element 273.

Referring generally to FIG. 2 and particularly to, e.g., FIG. 6, second applicator convergent passage 243 is shaped to facilitate uniform application of second part 255 of thermosetting resin 252 to second element 273 of non-resin component 108, exiting second resin-part applicator 237. The preceding subject matter of this paragraph characterizes example 64 of the present disclosure, wherein example 64 also includes the subject matter according to example 63, above.

In this example, second applicator convergent passage 243 therefore ensures that a uniform application of second part 255 to second element 273 is accomplished as second element 273 is pulled through second resin-part applicator 237. Such a uniform application of second part 255 may be desirable to intermix with first part 253 applied to first element 271, as well as to prevent undesirable voids being formed in composite part 102.

Referring generally to FIG. 2 and particularly to, e.g., FIG. 6, second resin-part applicator 237 further comprises second applicator guide 251, positioned to route second element 273 of non-resin component 108 through second resin-part applicator 237 along a predetermined path. The preceding subject matter of this paragraph characterizes example 65 of the present disclosure, wherein example 65 also includes the subject matter according to any one of examples 62-64, above.

Second applicator guide 251 may comprise any suitable structure and be provided to ensure second element 273 comes into contact with a sufficient volume of second part 255 as second element 273 is routed through second resin-part applicator 237.

Referring generally to FIG. 2 and particularly to, e.g., FIG. 6, second applicator guide 251 is positioned to impart no bend less than 60-degrees between any two sequential segments of second element 273 of non-resin component 108 as second element 273 of non-resin component 108 travels through second resin-part applicator 237. The preceding subject matter of this paragraph characterizes example 66 of the present disclosure, wherein example 66 also includes the subject matter according to example 65, above.

Limiting bending of second element 273 may prevent damage to second element 273.

Referring generally to FIG. 2 and particularly to, e.g., FIG. 6, second applicator guide 251 comprises two or more second applicator guide structures 254. The preceding subject matter of this paragraph characterizes example 67 of the present disclosure, wherein example 67 also includes the subject matter according to any one of examples 65 or 66, above.

Inclusion of two or more second applicator guide structures 254 may facilitate a desired amount of second part 255 coming into contact with second element 273 as it is routed through second resin-part applicator 237.

Referring generally to FIG. 2 and particularly to, e.g., FIG. 6, second applicator guide 251 comprises one or more second applicator rollers 256. The preceding subject matter of this paragraph characterizes example 68 of the present disclosure, wherein example 68 also includes the subject matter according to any one of examples 65-67, above.

Second applicator rollers 256 may facilitate the pulling of second element 273 through second resin-part applicator 237, thereby reducing friction between second element 273 and second applicator guide 251 and preventing damage to second element 273.

Referring generally to FIG. 2, at least one of second applicator rollers 256 comprises second applicator motorized roller 257, configured to facilitate movement of second element 273 of non-resin component 108 through second resin-part applicator 237. The preceding subject matter of this paragraph characterizes example 69 of the present disclosure, wherein example 69 also includes the subject matter according to example 68, above.

By including second applicator motorized roller 257, movement of second element 273 is facilitated though second resin-part applicator 237.

In FIG. 2, second applicator motorized roller 257 is schematically and optionally illustrated opposite another second applicator roller 256, which optionally may be motorized or not motorized and with second element 273 in engagement between the two second applicator rollers 256 to facilitate movement of second element 273 through second resin-part applicator 237.

Referring generally to FIG. 2, feed mechanism 104 comprises driven roller 158, which is configured to engage continuous flexible line 106 and selectively rotate to push continuous flexible line 106 through delivery guide 112. Driven roller 158 is communicatively coupled to second applicator motorized roller 257 for coordinated movement of second element 273 of non-resin component 108 and continuous flexible line 106. The preceding subject matter of this paragraph characterizes example 70 of the present disclosure, wherein example 70 also includes the subject matter according to example 69, above.

Feed mechanism 104 comprising driven roller 158 and driven roller 158 being communicatively coupled to second applicator motorized roller 257 facilitates coordinated movement of second element 273 and continuous flexible line 106 through system 700.

Referring generally to FIG. 2, delivery guide 112 is configured to intermix at least a portion of the first quantity of first part 253 of thermosetting resin 252, applied to first element 271 of non-resin component 108, and at least a portion of the second quantity of second part 255 of thermosetting resin 252, applied to second element 273 of non-resin component 108, on non-resin component 108. The preceding subject matter of this paragraph characterizes example 71 of the present disclosure, wherein example 71 also includes the subject matter according to any one of examples 39-70, above.

By having delivery guide 112 intermix first part 253 and second part 255, a uniform application of thermosetting-resin component 110 onto non-resin component 108 may be achieved. Moreover, desired properties for continuous flexible line 106 may be achieved, such as by avoiding voids or portions of thermosetting-resin component 110 not curing as desired, such as due to undesirable ratios of first part 253 to second part 255 on non-resin component 108.

Referring generally to FIG. 2 and particularly to, e.g., FIG. 30, system 700 further comprises element combiner 275, configured to combine first element 271 of non-resin component 108 with first quantity of first part 253 of thermosetting resin 252, applied to first element 271 of non-resin component 108, and second element 273 of non-resin component 108 with the second quantity of second part 255 of thermosetting resin 252, applied to second element 273 of non-resin component 108, to create non-resin component 108 and continuous flexible line 106 downstream of first resin-part applicator 236 and second resin-part applicator 237. The preceding subject matter of this paragraph characterizes example 72 of the present disclosure, wherein example 72 also includes the subject matter according to any one of examples 39-71, above.

Element combiner 275 brings together first element 271 with first part 253 applied thereto and second element 273 with second part 255 applied thereto, resulting in the creation of all of non-resin component 108, thermosetting-resin component 110, and continuous flexible line 106 within element combiner 275.

Referring generally to FIG. 2, element combiner 275 is configured to intermix at least a portion of the first quantity of first part 253 of thermosetting resin 252, applied to first element 271 of non-resin component 108, and at least a portion of the second quantity of second part 255 of thermosetting resin 252, applied to second element 273 of non-resin component 108, on non-resin component 108. The preceding subject matter of this paragraph characterizes example 73 of the present disclosure, wherein example 73 also includes the subject matter according to example 72, above.

By having element combiner 275 intermix first part 253 and second part 255, a uniform application of thermosetting-resin component 110 onto non-resin component 108 may be achieved. Moreover, desired properties for continuous flexible line 106 may be achieved, such as by avoiding voids or portions of thermosetting-resin component 110 not curing as desired, such as due to undesirable ratios of first part 253 to second part 255 on non-resin component 108.

Referring generally to FIG. 2 and particularly to, e.g., FIGS. 9-12, first element 271 of non-resin component 108 and second element 273 of non-resin component 108 each comprises one or more of a fiber, a carbon fiber, a glass fiber, a synthetic organic fiber, an aramid fiber, a natural fiber, a wood fiber, a boron fiber, a silicon-carbide fiber, an optical fiber, a fiber bundle, a fiber tow, a fiber weave, a wire, a metal wire, a conductive wire, or a wire bundle. The preceding subject matter of this paragraph characterizes example 74 of the present disclosure, wherein example 74 also includes the subject matter according to any one of examples 39-73, above.

Inclusion of a fiber or fibers in continuous flexible line 106, including as first element 271 and/or second element 273, permits for selecting desired properties of composite part 102. Moreover, selection of specific materials of fibers and/or selection of specific configurations of fibers (e.g., a bundle, a tow, and/or a weave) may permit for precise selection of desired properties of composite part 102. Example properties of composite parts 102 include strength, stiffness, flexibility, ductility, hardness, electrical conductivity, thermal conductivity, etc. First element 271 and second element 273 are not limited to the identified examples, and other types of first elements 271 and second elements 273 may be used.

Referring generally to FIG. 2, system 700 further comprises first origin 125 of first element 271 of non-resin component 108 and second origin 127 of second element 273 of non-resin component 108. The preceding subject matter of this paragraph characterizes example 75 of the present disclosure, wherein example 75 also includes the subject matter according to any one of examples 39-74, above.

System 700, with first origin 125 and with second origin 127, includes the materials themselves that define first element 271 and second element 273. When provided, first origin 125 and second origin 127 may provide one or more first elements 271 and second elements 273, such as including a first element 271 and a second first element 271 with properties that are different from properties of the first element 271, and/or a first second element 273 and a second element 273 with properties that are different from properties of the first second element 273. For example, first elements 271 and second elements 273 may be selected for desired properties of composite part 102.

Referring generally to FIG. 2 and particularly to, e.g., FIG. 30, first origin 125 of first element 271 of non-resin component 108 comprises first spool 131 of first element 271 of non-resin component 108. The preceding subject matter of this paragraph characterizes example 76 of the present disclosure, wherein example 76 also includes the subject matter according to example 75, above.

First origin 125 in the form of first spool 131 may provide a significant length of first element 271 in a compact volume that is readily replenished or replaced during a manufacturing operation. Other forms for first origin 125 also are within the scope of the present disclosure and are not limited to first spool 131.

Referring generally to FIG. 2 and particularly to, e.g., FIG. 30, second origin 127 of second element 273 of non-resin component 108 comprises second spool 129 of second element 273 of non-resin component 108. The preceding subject matter of this paragraph characterizes example 77 of the present disclosure, wherein example 77 also includes the subject matter according to any one of examples 75 or 76, above.

Second origin 127 in the form of second spool 129 may provide a significant length of second element 273 in a compact volume that is readily replenished or replaced during a manufacturing operation. Other forms for second origin 127 also are within the scope of the present disclosure and are not limited to second spool 129.

Referring generally to FIG. 2, system 700 further comprises tow-separation device 610, configured to separate tow 612 into first element 271 of non-resin component 108 and second element 273 of non-resin component 108 upstream of first resin-part applicator 236 and second resin-part applicator 237. The preceding subject matter of this paragraph characterizes example 78 of the present disclosure, wherein example 78 also includes the subject matter according to any one of examples 39-74, above.

Inclusion of tow-separation device 610 permits for the creation of first element 271 and second element 273 from tow 612. In some applications, it may be less expensive to source a tow of fibers that may be split into first element 271 and second element 273 than to source two separate origins of fibers, such as in the form of first element 271 and second element 273.

Referring generally to FIG. 2, system 700 further comprises origin 614 of tow 612. The preceding subject matter of this paragraph characterizes example 79 of the present disclosure, wherein example 79 also includes the subject matter according to example 78, above.

System 700, with origin 614, includes the material itself that defines tow 612 and thus first element 271 and second element 273. When provided, origin 614 may provide one or more non-resin components 108, such as including a first non-resin component 108 with first desired properties and a second non-resin component 108 with second desired properties that are different from the first desired properties. For example, when more than one non-resin component 108 is provided, one or more may be selected for desired properties of composite part 102.

Referring generally to FIG. 2 and particularly to, e.g., FIG. 30, origin 614 of tow 612 comprises spool 616 of tow 612. The preceding subject matter of this paragraph characterizes example 80 of the present disclosure, wherein example 80 also includes the subject matter according to example 79, above.

Origin 614 in the form of spool 616 may provide a significant length of tow 612 in a compact volume that is readily replenished or replaced during a manufacturing operation. Other forms for origin 614 also are within the scope of the present disclosure and are not limited to spool 616.

Referring generally to FIGS. 1 and 2, delivery guide 112 is configured to be selectively replaced. The preceding subject matter of this paragraph characterizes example 81 of the present disclosure, wherein example 81 also includes the subject matter according to any one of examples 1-80, above.

Accordingly, if and when thermosetting resin 252 cures or otherwise hardens within delivery guide 112, it may be replaced with a new delivery guide 112.

Referring generally to FIGS. 1 and 2, delivery guide 112 comprises guide line passage 154, through which continuous flexible line 106 is delivered to print path 122. Delivery guide 112 is configured to provide selective access to guide line passage 154 for removing cured thermosetting resin 252 from delivery guide 112. The preceding subject matter of this paragraph characterizes example 82 of the present disclosure, wherein example 82 also includes the subject matter according to any one of examples 1-81, above.

Depending on a selected thermosetting resin 252, over time, thermosetting resin 252 may harden, or otherwise clog, delivery guide 112, as a result of becoming cured, or partially cured. Accordingly, by being configured to provide selective access to delivery guide 112, any cured thermosetting resin 252 may be able to be removed for subsequent use of delivery guide 112 and systems 100 or 700.

Referring generally to FIGS. 1 and 2, delivery guide 112 further comprises first portion 266 and second portion 268, configured to be selectively spaced away from first portion 266. The preceding subject matter of this paragraph characterizes example 83 of the present disclosure, wherein example 83 also includes the subject matter according to example 82, above.

By having two portions that may be selectively separated, at least partially, access to the internal volume of delivery guide 112 may be permitted, such as to remove cured thermosetting resin 252.

Referring generally to FIGS. 1 and 2, first portion 266 is hinged to second portion 268. The preceding subject matter of this paragraph characterizes example 84 of the present disclosure, wherein example 84 also includes the subject matter according to example 83, above.

A hinged connection between first portion 266 and second portion 268 may facilitate and/or ease selective opening and closing of delivery guide 112, such as for removing cured thermosetting resin 252 and/or for initially feeding continuous flexible line 106 through delivery guide 112.

Referring generally to FIGS. 1 and 2 and particularly to, e.g., FIGS. 13-15, 19, 26, and 31-36. system 100, 700 further comprises source 116 of curing energy 118. Source 116 is configured to deliver curing energy 118 at least to portion 124 of segment 120 of continuous flexible line 106 after segment 120 of continuous flexible line 106 exits delivery guide 112. The preceding subject matter of this paragraph characterizes example 85 of the present disclosure, wherein example 85 also includes the subject matter according to any one of examples 1-84, above.

Inclusion of source 116 provides a mechanism for thermosetting-resin component 110 to be at least partially cured, and optionally fully cured, as continuous flexible line 106 is being deposited relative to surface 114 via delivery guide 112. That is, composite part 102 is at least partially cured, and in some examples fully cured, as it is being manufactured, or in situ.

As illustrative, non-exclusive examples, thermosetting resin 252, and thus thermosetting-resin component 110 may be configured to be at least partially cured, or hardened, when curing energy 118 in the form of heat is delivered via radiation, convention, and/or conduction.

Referring generally to FIGS. 1 and 2 and particularly to, e.g., FIGS. 13-15, 19, 26, and 31-36, source 116 of curing energy 118 is configured to deliver curing energy 118 at least to portion 124 of segment 120 of continuous flexible line 106 as feed mechanism 104 pushes continuous flexible line 106 out of delivery guide 112 toward print path 122 and after segment 120 of continuous flexible line 106 is deposited along print path 122. The preceding subject matter of this paragraph characterizes example 86 of the present disclosure, wherein example 86 also includes the subject matter according to example 85, above.

By delivering curing energy 118 to portion 124 of segment 120 of continuous flexible line 106 after segment 120 is deposited by delivery guide 112, thermosetting-resin component 110 within portion 124 is at least further cured, so that portion 124 is effectively fixed in a desired place relative to the remainder of segment 120 having been already deposited by delivery guide 112. In other words, source 116 provides for in situ curing of composite part 102 as it is being manufactured using system 100 or system 700.

Referring generally to FIGS. 1 and 2 and particularly to, e.g., FIGS. 13-15, 19, 26, and 31-36, source 116 of curing energy 118 is configured to deliver a predetermined or actively determined amount of curing energy 118 at a controlled rate at least to portion 124 of segment 120 of continuous flexible line 106. The preceding subject matter of this paragraph characterizes example 87 of the present disclosure, wherein example 87 also includes the subject matter according to any one of examples 85 or 86, above.

As a result of delivering a predetermined or actively determined amount of curing energy 118 at a controlled rate, a desired level, or degree, of cure may be established with respect to portion 124 of segment 120 at any given time during manufacture of composite part 102. For example, it may be desirable to cure one portion 124 greater than or less than another portion 124 during manufacture of composite part 102. A predetermined amount of curing energy 118 may be based, e.g., on thermosetting resin 252 used for thermosetting-resin component 110. An actively determined amount of curing energy 118 may be based, e.g., on real-time data sensed from continuous flexible line 106 as it is being deposited, including (but not limited to) hardness, color, temperature, glow, etc.

Referring generally to FIGS. 1 and 2 and particularly to, e.g., FIGS. 26 and 31-36, source 116 of curing energy 118 comprises one or more curing lasers 134. The preceding subject matter of this paragraph characterizes example 88 of the present disclosure, wherein example 88 also includes the subject matter according to any one of examples 85-87, above.

Inclusion of one or more curing lasers 134 facilitates a concentrated and directed stream of curing energy 118, such that curing energy 118 may be selectively and precisely directed at portion 124 of segment 120 during manufacture of composite part 102.

Referring generally to FIGS. 1 and 2 and particularly to, e.g., FIGS. 13-15, 19, 26, and 31-36, source 116 of curing energy 118 comprises one or more ultraviolet-light sources, infrared-light sources, x-ray sources, microwave light sources, visible light sources, or electron beam sources. The preceding subject matter of this paragraph characterizes example 89 of the present disclosure, wherein example 89 also includes the subject matter according to any one of examples 85-88, above.

Inclusion of one or more ultraviolet-light sources, infrared-light sources, x-ray sources, microwave light sources, visible light sources, or electron beam sources permits for use of thermosetting resins 252 for thermosetting-resin component 110 that are configured to be cured via radiation from ultraviolet light, infrared light, x-rays, microwaves, visible light, or electron beams.

Referring generally to FIGS. 1 and 2, source 116 of curing energy 118 comprises heat source 136. The preceding subject matter of this paragraph characterizes example 90 of the present disclosure, wherein example 90 also includes the subject matter according to any one of examples 85-89, above.

Inclusion of heat source 136 permits for use of thermosetting resins 252 for thermosetting-resin component 110 that are configured to be cured via heat delivered by heat source 136.

Referring generally to FIGS. 1 and 2, heat source 136 comprises convective heat source 902. The preceding subject matter of this paragraph characterizes example 91 of the present disclosure, wherein example 91 also includes the subject matter according to example 90, above.

Inclusion of convective heat source 902 permits for use of thermosetting resins 252 for thermosetting-resin component 110 that are configured to be cured via heat delivered by convection.

Referring generally to FIGS. 1 and 2, curing energy 118 comprises a hot gas stream. The preceding subject matter of this paragraph characterizes example 92 of the present disclosure, wherein example 92 also includes the subject matter according to example 91, above.

A hot gas stream may be an effective way to cure thermosetting-resin component 110, depending on the specific configuration of thermosetting-resin component 110. Moreover, production of a hot gas stream may be less expensive to implement than, for example, curing laser 134 as part of system 100 or system 700.

Referring generally to FIGS. 1 and 2, heat source 136 comprises radiative heat source 904. The preceding subject matter of this paragraph characterizes example 93 of the present disclosure, wherein example 93 also includes the subject matter according to any one of examples 90-92, above.

Inclusion of radiative heat source 904 permits for use of thermosetting resins 252 for thermosetting-resin component 110 that are configured to be cured via heat delivered by radiation.

Referring generally to FIGS. 1 and 2 and particularly to, e.g., FIGS. 29 and 30, system 100, 700 further comprises chamber 258. Delivery guide 112 and feed mechanism 104 are positioned within chamber 258. Delivery guide 112 is configured to deposit segment 120 of continuous flexible line 106 along print path 122 within chamber 258. Heat source 136 is configured to heat chamber 258. The preceding subject matter of this paragraph characterizes example 94 of the present disclosure, wherein example 94 also includes the subject matter according to any one of examples 90-93, above.

Providing chamber 258, within which continuous flexible line 106 is deposited via delivery guide 112, and heating chamber 258 to cure thermosetting-resin component 110 may provide an efficient way to cure thermosetting-resin component 110 via heat without expensive and complicated mechanisms that require concentrated and directed heat at segment 120.

Referring generally to FIGS. 1 and 2 and particularly to, e.g., FIGS. 29 and 30, chamber 258 is one of positively pressurized or negatively pressurized relative to atmospheric pressure. The preceding subject matter of this paragraph characterizes example 95 of the present disclosure, wherein example 95 also includes the subject matter according to example 94, above.

Depending on the configuration of composite part 102 being manufactured, it may be desirable to increase and/or decrease the pressure within chamber 258 during curing to obtain desirable properties of composite part 102.

Chamber 258 may be described as, or as comprising or as being comprised by, an autoclave.

Referring generally to FIGS. 1 and 2 and particularly to, e.g., FIGS. 17-21, 31, and 33, heat source 136 comprises conductive heat source 908. The preceding subject matter of this paragraph characterizes example 96 of the present disclosure, wherein example 96 also includes the subject matter according to any one of examples 90-95, above.

Inclusion of conductive heat source 908 permits for use of thermosetting resins 252 for thermosetting-resin component 110 that are configured to be cured via heat delivered by conduction, such as by conductive heat source 908 being placed in direct contact with portion 124 of segment 120 of continuous flexible line 106 after segment 120 of continuous flexible line 106 exits delivery guide 112.

Referring generally to FIGS. 1 and 2 and particularly to, e.g., FIGS. 17-21, 31, and 33, conductive heat source 908 comprises resistive heater 906. The preceding subject matter of this paragraph characterizes example 97 of the present disclosure, wherein example 97 also includes the subject matter according to example 96, above.

Inclusion of resistive heater 906 may be an efficient and inexpensive option for generating heat for curing thermosetting-resin component 110 during manufacture of composite part 102 by system 100 or system 700.

Referring generally to FIGS. 1 and 2 and particularly to, e.g., FIGS. 17-21, 31, and 33, system 100, 700 further comprises compactor 138, operatively coupled to delivery guide 112. Compactor 138 is configured to impart a compaction force at least to section 180 of segment 120 of continuous flexible line 106 after segment 120 of continuous flexible line 106 exits delivery guide 112. Compactor 138 comprises conductive heat source 908. The preceding subject matter of this paragraph characterizes example 98 of the present disclosure, wherein example 98 also includes the subject matter according to any one of examples 96 or 97, above.

Compactor 138 compacts adjacent layers of continuous flexible line 106 that have been deposited by delivery guide 112 along print path 122. Moreover, compactor 138 is in direct contact with segment 120 to impart the compaction force thereto, and therefore may deliver heat via conduction directly to segment 120.

Referring generally to FIGS. 1 and 2 and particularly to, e.g., FIGS. 17-19, 31, and 33, compactor 138 comprises compaction roller 182, having compaction-roller surface 184 that is configured to roll over at least section 180 of segment 120 of continuous flexible line 106 after segment 120 of continuous flexible line 106 exits delivery guide 112. Compaction-roller surface 184 is heated by conductive heat source 908. The preceding subject matter of this paragraph characterizes example 99 of the present disclosure, wherein example 99 also includes the subject matter according to example 98, above.

Compaction roller 182, compared to alternative examples of compactor 138, may reduce the axial movement of thermosetting-resin component 110 along segment 120 during compaction. Additionally, compared to alternative examples of compactor 138, compaction roller 182 may provide a more desirable normal, or perpendicular, component of the compaction force.

Referring generally to FIGS. 1 and 2 and particularly to, e.g., FIG. 17, compaction-roller surface 184 is textured. The preceding subject matter of this paragraph characterizes example 100 of the present disclosure, wherein example 100 also includes the subject matter according to example 99, above.

When compaction-roller surface 184 is textured, compaction-roller surface 184 imparts a texture to segment 120 or abrades segment 120, providing it with an increased surface area for better adhesion of a subsequent layer of continuous flexible line 106 deposited against it.

Referring generally to FIGS. 1 and 2 and particularly to, e.g., FIG. 18, compaction-roller surface 184 is shaped to impart a predetermined cross-sectional shape at least to section 180 of segment 120 of continuous flexible line 106 after segment 120 of continuous flexible line 106 exits delivery guide 112. The preceding subject matter of this paragraph characterizes example 101 of the present disclosure, wherein example 101 also includes the subject matter according to any one of examples 99 or 100, above.

It may be desirable, in some applications, to impart a predetermined cross-sectional shape to continuous flexible line 106 as it is being deposited by delivery guide 112.

Referring generally to FIGS. 1 and 2 and particularly to, e.g., FIG. 20, compactor 138 comprises compaction wiper 185, having wiper drag surface 186 that is configured to drag against at least section 180 of segment 120 of continuous flexible line 106 after segment 120 of continuous flexible line 106 exits delivery guide 112. Wiper drag surface 186 is heated by conductive heat source 908. The preceding subject matter of this paragraph characterizes example 102 of the present disclosure, wherein example 102 also includes the subject matter according to example 101, above.

Compaction wiper 185, compared to alternative examples of compactor 138, may increase the axial movement of thermosetting-resin component 110 along segment 120 during compaction.

Referring generally to FIGS. 1 and 2, wiper drag surface 186 is textured. The preceding subject matter of this paragraph characterizes example 103 of the present disclosure, wherein example 103 also includes the subject matter according to example 102, above.

When wiper drag surface 186 is textured, wiper drag surface 186 imparts a texture to segment 120 or abrades segment 120, providing it with an increased surface area for better adhesion of a subsequent layer of continuous flexible line 106 deposited against it.

Referring generally to FIGS. 1 and 2, wiper drag surface 186 is shaped to impart a predetermined cross-sectional shape to segment 120 of continuous flexible line 106 after segment 120 of continuous flexible line 106 exits delivery guide 112. The preceding subject matter of this paragraph characterizes example 104 of the present disclosure, wherein example 104 also includes the subject matter according to any one of examples 102 or 103, above.

As mentioned, it may be desirable, in some applications, to impart a predetermined cross-sectional shape to continuous flexible line 106 as it is being deposited by delivery guide 112.

Referring generally to FIGS. 1 and 2 and particularly to, e.g., FIGS. 19, 31, and 33, compactor 138 is biased toward section 180 of segment 120 of continuous flexible line 106. The preceding subject matter of this paragraph characterizes example 105 of the present disclosure, wherein example 105 also includes the subject matter according to any one of examples 98-104, above.

By being biased toward section 180, compactor 138 imparts a desired compaction force against section 180.

Referring generally to FIGS. 1 and 2 and particularly to, e.g., FIGS. 19, 31, and 33, compactor 138 is rotatable relative to delivery guide 112. The preceding subject matter of this paragraph characterizes example 106 of the present disclosure, wherein example 106 also includes the subject matter according to any one of examples 98-105, above.

By being rotatable relative to delivery guide 112, compactor 138 may be selectively positioned to impart its compaction force against section 180 of segment 120 as delivery guide 112 moves, including as it changes directions, relative to surface 114 and/or vice versa.

Referring generally to FIGS. 1 and 2 and particularly to, e.g., FIGS. 19, 31, and 33, compactor 138 is configured to trail delivery guide 112 when delivery guide 112 moves relative to surface 114. The preceding subject matter of this paragraph characterizes example 107 of the present disclosure, wherein example 107 also includes the subject matter according to any one of examples 98-106, above.

By trailing delivery guide 112, compactor 138 is selectively positioned to impart its compaction force against section 180 of segment 120 directly following section 180 exiting delivery guide 112.

Referring generally to FIGS. 1 and 2 and particularly to, e.g., FIGS. 31 and 33, system 100, 700 further comprises pivoting arm 152, coupled relative to delivery guide 112 such that pivoting arm 152 trails delivery guide 112 as delivery guide 112 moves relative to surface 114. Compactor 138 is coupled to pivoting arm 152. The preceding subject matter of this paragraph characterizes example 108 of the present disclosure, wherein example 108 also includes the subject matter according to any one of examples 98-107, above.

Pivoting arm 152 provides for selective pivoting of compactor 138 relative to delivery guide 112. Accordingly, compactor 138 may be selectively positioned to impart its compaction force against section 180 of segment 120 as delivery guide 112 moves, including as it changes directions, relative to surface 114 and/or vice versa.

Referring generally to FIGS. 1 and 2 and particularly to, e.g., FIGS. 31 and 33, system 100, 700 further comprises pivoting-arm actuator 188, operatively coupled to pivoting arm 152 and configured to actively control a rotational position of pivoting arm 152 relative to delivery guide 112 as delivery guide 112 moves relative to surface 114. The preceding subject matter of this paragraph characterizes example 109 of the present disclosure, wherein example 109 also includes the subject matter according to example 108, above.

Pivoting-arm actuator 188 provides for selective pivoting of pivoting arm 152 and thus of compactor 138 relative to delivery guide 112. Accordingly, compactor 138 may be selectively positioned to impart its compaction force against section 180 of segment 120 as delivery guide 112 moves, including as it changes directions, relative to surface 114 and/or vice versa.

Referring generally to FIGS. 1 and 2 and particularly to, e.g., FIGS. 31 and 33, pivoting-arm actuator 188 is configured to actively coordinate the rotational position of pivoting arm 152 with movement of delivery guide 112 relative to surface 114. The preceding subject matter of this paragraph characterizes example 110 of the present disclosure, wherein example 110 also includes the subject matter according to example 109, above.

Accordingly, compactor 138 may be selectively and actively positioned to impart its compaction force against section 180 of segment 120 as delivery guide 112 moves, including as it changes directions, relative to surface 114 and/or vice versa.

Referring to FIG. 21, compactor 138 comprises skirt 190, coupled to delivery guide 112. Skirt 190 comprises skirt drag surface 192 that is positioned to drag against at least section 180 of segment 120 of continuous flexible line 106 after segment 120 of continuous flexible line 106 exits delivery guide 112. Skirt drag surface 192 is heated by conductive heat source 908. The preceding subject matter of this paragraph characterizes example 111 of the present disclosure, wherein example 111 also includes the subject matter according to example 98, above.

Skirt 190 extends from delivery guide 112 and circumferentially around guide outlet 206. Accordingly, regardless of a direction of movement of delivery guide 112 relative to surface 114, and/or vice versa, skirt 190 is positioned to compact section 180 of segment 120 of continuous flexible line 106 as it is being deposited.

Referring generally to FIGS. 1 and 2 and particularly to, e.g., FIG. 31, system 100, 700 further comprises surface roughener 144, operatively coupled to delivery guide 112. Surface roughener 144 is configured to abrade at least section 194 of segment 120 of continuous flexible line 106 after segment 120 of continuous flexible line 106 exits delivery guide 112. Surface roughener 144 comprises conductive heat source 908. The preceding subject matter of this paragraph characterizes example 112 of the present disclosure, wherein example 112 also includes the subject matter according to any one of examples 96-111, above.

Surface roughener 144 abrades section 194, providing it with an increased surface area for better adhesion of a subsequent layer deposited against it. Moreover, surface roughener 144 is in direct contact with segment 120 to abrade section 194, and therefore may deliver heat via conduction directly to segment 120.

Referring generally to FIGS. 1 and 2, surface roughener 144 comprises roughening roller 196, having roughening-roller surface 198 that is configured to rotationally abrade at least section 194 of segment 120 of continuous flexible line 106 after segment 120 of continuous flexible line 106 exits delivery guide 112. Roughening-roller surface 198 is heated by conductive heat source 908. The preceding subject matter of this paragraph characterizes example 113 of the present disclosure, wherein example 113 also includes the subject matter according to example 112, above.

Roughening roller 196, compared to alternative examples of surface roughener 144, may reduce the axial movement of thermosetting-resin component 110 along segment 120 during abrasion thereof. Moreover, roughening-roller surface 198, by being heated by conductive heat source 908 and rolling against segment 120, may provide for efficient heat transfer, and thus curing, of section 194.

Referring generally to FIGS. 1 and 2, roughening-roller surface 198 is shaped to impart a predetermined cross-sectional shape to segment 120 of continuous flexible line 106 after segment 120 of continuous flexible line 106 exits delivery guide 112. The preceding subject matter of this paragraph characterizes example 114 of the present disclosure, wherein example 114 also includes the subject matter according to example 113, above.

It may be desirable, in some applications, to impart a predetermined cross-sectional shape to continuous flexible line 106 as it is being deposited by delivery guide 112.

Referring generally to FIGS. 1 and 2 and particularly to, e.g., FIG. 31, surface roughener 144 comprises roughening drag surface 200 that is configured to translationally abrade at least section 194 of segment 120 of continuous flexible line 106 after segment 120 of continuous flexible line 106 exits delivery guide 112. Roughening drag surface 200 is heated by conductive heat source 908. The preceding subject matter of this paragraph characterizes example 115 of the present disclosure, wherein example 115 also includes the subject matter according to example 112, above.

Roughening drag surface 200, compared to alternative examples of surface roughener 144, may increase the axial movement of thermosetting-resin component 110 along segment 120 during abrasion thereof. Moreover, roughening drag surface 200, by being heated by conductive heat source 908 and dragging against segment 120, may provide for efficient heat transfer, and thus curing, of section 194.

Referring generally to FIGS. 1 and 2 and particularly to, e.g., FIG. 31, surface roughener 144 is biased toward section 194 of segment 120 of continuous flexible line 106 after segment 120 of continuous flexible line 106 exits delivery guide 112. The preceding subject matter of this paragraph characterizes example 116 of the present disclosure, wherein example 116 also includes the subject matter according to any one of examples 112-115, above.

By being biased toward section 194, surface roughener 144 imparts a desired abrasion force against section 194.

Referring generally to FIGS. 1 and 2 and particularly to, e.g., FIG. 31, surface roughener 144 is rotatable relative to delivery guide 112. The preceding subject matter of this paragraph characterizes example 117 of the present disclosure, wherein example 117 also includes the subject matter according to any one of examples 112-116, above.

By being rotatable relative to delivery guide 112, surface roughener 144 may be selectively positioned to abrade section 194 as delivery guide 112 moves, including as it changes directions, relative to surface 114 and/or vice versa.

Referring generally to FIGS. 1 and 2 and particularly to, e.g., FIG. 31, surface roughener 144 is configured to trail delivery guide 112 when delivery guide 112 moves relative to surface 114. The preceding subject matter of this paragraph characterizes example 118 of the present disclosure, wherein example 118 also includes the subject matter according to any one of examples 112-117, above.

By trailing delivery guide 112, surface roughener 144 is selectively positioned to abrade section 194 directly following segment 120 exiting delivery guide 112.

Referring generally to FIGS. 1 and 2 and particularly to, e.g., FIG. 31, system 100, 700 further comprises pivoting arm 152, configured such that pivoting arm 152 trails delivery guide 112 as delivery guide 112 moves relative to surface 114. Surface roughener 144 is coupled to pivoting arm 152. The preceding subject matter of this paragraph characterizes example 119 of the present disclosure, wherein example 119 also includes the subject matter according to any one of examples 112-118, above.

Pivoting arm 152 provides for selective pivoting of surface roughener 144 relative to delivery guide 112. Accordingly, surface roughener 144 may be selectively positioned to abrade section 194 as delivery guide 112 moves, including as it changes directions, relative to surface 114 and/or vice versa.

Referring generally to FIGS. 1 and 2 and particularly to, e.g., FIG. 31, system 100, 700 further comprises pivoting-arm actuator 188, operatively coupled to pivoting arm 152 and configured to actively control a rotational position of pivoting arm 152 relative to delivery guide 112 as delivery guide 112 moves relative to surface 114. The preceding subject matter of this paragraph characterizes example 120 of the present disclosure, wherein example 120 also includes the subject matter according to example 119, above.

Pivoting-arm actuator 188 provides for selective pivoting of pivoting arm 152 and thus of surface roughener 144 relative to delivery guide 112. Accordingly, surface roughener 144 may be selectively positioned to abrade section 194 as delivery guide 112 moves, including as it changes directions, relative to surface 114 and/or vice versa.

Referring generally to FIGS. 1 and 2 and particularly to, e.g., FIG. 31, pivoting-arm actuator 188 is configured to actively coordinate the rotational position of pivoting arm 152 with movement of delivery guide 112 relative to surface 114. The preceding subject matter of this paragraph characterizes example 121 of the present disclosure, wherein example 121 also includes the subject matter according to example 120, above.

Accordingly, surface roughener 144 may be selectively and actively positioned to abrade section 194 as delivery guide 112 moves, including as it changes directions, relative to surface 114 and/or vice versa.

Referring generally to FIGS. 1 and 2 and particularly to, e.g., FIG. 31, system 100, 700 further comprises compactor 138. Surface roughener 144 is positioned to abrade at least section 194 of segment 120 of continuous flexible line 106 following compaction of at least section 194 by compactor 138. The preceding subject matter of this paragraph characterizes example 122 of the present disclosure, wherein example 122 also includes the subject matter according to any one of examples 112-121, above.

System 100, 700 according to example 122 includes both compactor 138 and surface roughener 144. By having surface roughener 144 positioned to abrade section 194 following compaction by compactor 138, the abrasion of section 194 is not hindered, or dulled, by a subsequent compaction thereof. Accordingly, abrasion of section 194 has an increased surface area for better adhesion of a subsequent layer deposited against it.

Referring generally to FIGS. 1 and 2 and particularly to, e.g., FIG. 31, system 100, 700 further comprises debris inlet 202, configured to collect debris resulting from abrading at least section 194 of segment 120 of continuous flexible line 106 with surface roughener 144. The preceding subject matter of this paragraph characterizes example 123 of the present disclosure, wherein example 123 also includes the subject matter according to any one of examples 112-122, above.

Collection by debris inlet 202 of debris that results from abrasion of section 194 by surface roughener 144, avoids unwanted, loose particles of thermosetting-resin component 110 becoming trapped between adjacent deposited layers of continuous flexible line 106 that may otherwise result in unwanted properties of composite part 102.

Referring generally to FIGS. 1 and 2 and particularly to, e.g., FIG. 31, system 100, 700 further comprises vacuum source 203 selectively communicatively coupled with debris inlet 202. The preceding subject matter of this paragraph characterizes example 124 of the present disclosure, wherein example 124 also includes the subject matter according to example 123, above.

Vacuum source 203 draws air and debris from adjacent section 194 through debris inlet 202.

Referring generally to FIGS. 1 and 2 and particularly to, e.g., FIG. 31, system 100, 700 further comprises pivoting arm 152, coupled relative to delivery guide 112 such that pivoting arm 152 trails delivery guide 112 as delivery guide 112 moves relative to surface 114. Debris inlet 202 is operatively coupled to pivoting arm 152. The preceding subject matter of this paragraph characterizes example 125 of the present disclosure, wherein example 125 also includes the subject matter according to any one of examples 123 or 124, above.

By being coupled to pivoting arm 152, debris inlet 202 is selectively positioned to collect debris directly from adjacent section 194 as delivery guide 112 moves relative to surface 114 and/or vice versa.

Referring generally to FIGS. 1 and 2 and particularly to, e.g., FIG. 31, system 100, 700 further comprises pivoting-arm actuator 188, operatively coupled to pivoting arm 152 and configured to actively control a rotational position of pivoting arm 152 relative to delivery guide 112 as delivery guide 112 moves relative to surface 114. The preceding subject matter of this paragraph characterizes example 126 of the present disclosure, wherein example 126 also includes the subject matter according to example 125, above.

Pivoting-arm actuator 188, by actively controlling a rotational position of pivoting arm 152 relative to delivery guide 112, ensures that debris inlet 202 trails delivery guide 112 so that debris inlet 202 is selectively positioned to collect debris directly adjacent to section 194 as delivery guide 112 moves relative to surface 114 and/or vice versa.

Referring generally to FIGS. 1 and 2 and particularly to, e.g., FIG. 31, pivoting-arm actuator 188 is configured to actively coordinate the rotational position of pivoting arm 152 with movement of delivery guide 112 relative to surface 114. The preceding subject matter of this paragraph characterizes example 127 of the present disclosure, wherein example 127 also includes the subject matter according to example 126, above.

Pivoting-arm actuator 188, by actively coordinating a rotational position of pivoting arm 152 relative to delivery guide 112, ensures that debris inlet 202 trails delivery guide 112 so that debris inlet 202 is selectively positioned to collect debris directly adjacent to section 194 as delivery guide 112 moves relative to surface 114 and/or vice versa.

Referring generally to FIGS. 1 and 2 and particularly to, e.g., FIG. 31, system 100, 700 further comprises pressurized-gas outlet 204, configured to disperse debris, resulting from roughening of segment 120 of continuous flexible line 106 by surface roughener 144, with a pressurized gas. The preceding subject matter of this paragraph characterizes example 128 of the present disclosure, wherein example 128 also includes the subject matter according to any one of examples 112-127, above.

Dispersal by pressurized-gas outlet 204 of debris that results from abrasion of section 194 by surface roughener 144, avoids unwanted, loose particles of thermosetting-resin component 110 becoming trapped between adjacent deposited layers of continuous flexible line 106 that may otherwise result in unwanted properties of composite part 102.

Referring generally to FIGS. 1 and 2 and particularly to, e.g., FIG. 31, system 100, 700 further comprises pressurized-gas source 205, selectively communicatively coupled with pressurized-gas outlet 204. The preceding subject matter of this paragraph characterizes example 129 of the present disclosure, wherein example 129 also includes the subject matter according to example 128, above.

Pressurized-gas source 205 provides a source of the pressurized gas to be delivered to section 194 via pressurized-gas outlet 204.

Referring generally to FIGS. 1 and 2 and particularly to, e.g., FIG. 31, system 100, 700 further comprises pivoting arm 152, configured such that pivoting arm 152 trails delivery guide 112 as delivery guide 112 moves relative to surface 114. Pressurized-gas outlet 204 is operatively coupled to pivoting arm 152. The preceding subject matter of this paragraph characterizes example 130 of the present disclosure, wherein example 130 also includes the subject matter according to any one of examples 128 or 129, above.

By being coupled to pivoting arm 152, pressurized-gas outlet 204 is selectively positioned to disperse debris directly from adjacent section 194 as delivery guide 112 moves relative to surface 114 and/or vice versa.

Referring generally to FIGS. 1 and 2 and particularly to, e.g., FIG. 31, system 100, 700 further comprises pivoting-arm actuator 188, operatively coupled to pivoting arm 152 and configured to actively control a rotational position of pivoting arm 152 relative to delivery guide 112 as delivery guide 112 moves relative to surface 114. The preceding subject matter of this paragraph characterizes example 131 of the present disclosure, wherein example 131 also includes the subject matter according to example 130, above.

Pivoting-arm actuator 188, by actively controlling a rotational position of pivoting arm 152 relative to delivery guide 112, ensures that pressurized-gas outlet 204 trails delivery guide 112 so that pressurized-gas outlet 204 is selectively positioned to disperse debris directly adjacent to section 194 as delivery guide 112 moves relative to surface 114 and/or vice versa.

Referring generally to FIGS. 1 and 2 and particularly to, e.g., FIG. 31, pivoting-arm actuator 188 is configured to actively coordinate the rotational position of pivoting arm 152 with movement delivery guide 112 relative to surface 114. The preceding subject matter of this paragraph characterizes example 132 of the present disclosure, wherein example 132 also includes the subject matter according to example 131, above.

Pivoting-arm actuator 188, by actively coordinating a rotational position of pivoting arm 152 relative to delivery guide 112, ensures that pressurized-gas outlet 204 trails delivery guide 112 so that pressurized-gas outlet 204 is selectively positioned to disperse debris directly adjacent to section 194 as delivery guide 112 moves relative to surface 114 and/or vice versa.

Referring generally to FIGS. 1 and 2 and particularly to, e.g., FIGS. 31-33, system 100, 700 further comprises pivoting arm 152, coupled relative to delivery guide 112 such that pivoting arm 152 trails delivery guide 112 as delivery guide 112 moves relative to surface 114. Source 116 of curing energy 118 is coupled to pivoting arm 152. The preceding subject matter of this paragraph characterizes example 133 of the present disclosure, wherein example 133 also includes the subject matter according to any one of examples 112-132, above.

Pivoting arm 152 provides for selective pivoting of source 116 relative to delivery guide 112. Accordingly, source 116 may be selectively positioned to deliver curing energy 118 to portion 124 of segment 120 as delivery guide 112 moves, including as it changes directions, relative to surface 114 and/or vice versa.

Referring generally to FIGS. 1 and 2 and particularly to, e.g., FIGS. 31-33, system 100, 700 further comprises pivoting-arm actuator 188, operatively coupled to pivoting arm 152 and configured to actively control a rotational position of pivoting arm 152 relative to delivery guide 112 as delivery guide 112 moves relative to surface 114. The preceding subject matter of this paragraph characterizes example 134 of the present disclosure, wherein example 134 also includes the subject matter according to example 133, above.

Pivoting-arm actuator 188 provides for selective pivoting of pivoting arm 152 and thus of source 116 relative to delivery guide 112. Accordingly, source 116 may be selectively positioned to deliver curing energy 118 to portion 124 of segment 120 as delivery guide 112 moves, including as it changes directions, relative to surface 114 and/or vice versa.

Referring generally to FIGS. 1 and 2 and particularly to, e.g., FIGS. 31-33, pivoting-arm actuator 188 is configured to actively coordinate the rotational position of pivoting arm 152 with movement of delivery guide 112 relative to surface 114. The preceding subject matter of this paragraph characterizes example 135 of the present disclosure, wherein example 135 also includes the subject matter according to example 134, above.

Accordingly, source 116 may be selectively and actively positioned to deliver curing energy 118 to portion 124 of segment 120 as delivery guide 112 moves, including as it changes directions, relative to surface 114 and/or vice versa.

Referring generally to FIGS. 1 and 2 and particularly to, e.g., FIGS. 19 and 31-36, source 116 of curing energy 118 is configured to trail delivery guide 112 when delivery guide 112 moves relative to surface 114. The preceding subject matter of this paragraph characterizes example 136 of the present disclosure, wherein example 136 also includes the subject matter according to any one of examples 85-135, above.

By trailing delivery guide 112, source 116 is selectively positioned to deliver curing energy 118 to portion 124 of segment 120 directly following portion 124 exiting delivery guide 112.

Referring generally to FIGS. 1 and 2 and particularly to, e.g., FIGS. 15, 16, and 26, source 116 of curing energy 118 is configured to deliver ring 148 of curing energy 118, intersecting segment 120 of continuous flexible line 106. The preceding subject matter of this paragraph characterizes example 137 of the present disclosure, wherein example 137 also includes the subject matter according to any one of examples 85-136, above.

When ring 148 of curing energy 118 intersects segment 120, ring 148 ensures that curing energy 118 is delivered to portion 124 regardless of a direction that segment 120 is exiting delivery guide 112 as delivery guide 112 moves relative to surface 114 and/or vice versa.

Ring 148 of curing energy 118 may be defined by any suitable process and/or structure. For example, with reference to FIG. 15, and as discussed herein, delivery guide 112 may comprise curing-energy passage 146, and source 116 of curing energy 118 may be configured to deliver curing energy 118 through curing-energy passage 146 such that curing energy 118 defines ring 148. Additionally or alternatively, with reference to FIG. 26, as also discussed herein, energy source 116 may comprise at least one mirror-positioning system 150 that is configured to deliver ring 148 of curing energy 118 to portion 124 of segment 120.

Referring generally to FIGS. 1 and 2 and particularly to, e.g., FIGS. 14-16, delivery guide 112 further comprises curing-energy passage 146 and guide line passage 154, through which continuous flexible line 106 is delivered to print path 122. Source 116 of curing energy 118 is configured to deliver curing energy 118 through curing-energy passage 146 at least to portion 124 of segment 120 of continuous flexible line 106. Curing-energy passage 146 is optically isolated from guide line passage 154. The preceding subject matter of this paragraph characterizes example 138 of the present disclosure, wherein example 138 also includes the subject matter according to any one of examples 85-137, above.

System 100, 700 according to example 138 provides for precise direction of curing energy 118 to portion 124 as continuous flexible line 106 is exiting delivery guide 112. Moreover, by being optically isolated from guide line passage 154, curing-energy passage 146 restricts curing energy 118, when in the form of light, from contacting continuous flexible line 106 before continuous flexible line 106 exits delivery guide 112.

According to example 138 (referring, e.g., to FIG. 15), curing-energy passage 146 may encircle guide line passage 154 and may have a circular outlet around guide outlet 206 of guide line passage 154, such that the exit of curing energy 118 from curing-energy passage 146 results in ring 148 of curing energy 118, such as according to example 137 herein.

Referring generally to FIGS. 1 and 2 and particularly to, e.g., FIG. 26, source 116 of curing energy 118 is not configured to move with delivery guide 112. The preceding subject matter of this paragraph characterizes example 139 of the present disclosure, wherein example 139 also includes the subject matter according to any one of examples 85-97 or 137, above.

Such an example of system 100 or system 700 may provide for a less cumbersome assembly associated with delivery guide 112, permitting delivery guide 112 to more easily make micro-movements and turns, or angle changes, relative to surface 114 and/or vice versa, such as based on the configuration of composite part 102, and desired properties thereof, being manufactured.

FIG. 26 provides an example of system 100 or system 700, with energy source 116 comprising two mirror-positioning systems 150 that are static relative to delivery guide 112 as delivery guide 112 moves relative to surface 114, but with mirror-positioning systems 150 configured to deliver curing energy 118 to portion 124 of segment 120 of continuous flexible line 106 as it exits delivery guide 112. Non-exclusive examples of mirror-positioning systems 150 include (but are not limited to) galvanometer mirror-positioning systems and solid-state piezoelectric mirror-positioning systems.

Referring generally to FIGS. 1 and 2 and particularly to, e.g., FIG. 26, source 116 of curing energy 118 comprises at least one mirror-positioning system 150, configured to deliver curing energy 118 at least to portion 124 of segment 120 of continuous flexible line 106 responsive to movement of delivery guide 112 relative to surface 114. The preceding subject matter of this paragraph characterizes example 140 of the present disclosure, wherein example 140 also includes the subject matter according to any one of examples 85-97, 137, or 139, above.

In other words, one or more mirror-positioning systems 150 may actively direct curing energy 118 at portion 124 of segment 120 as continuous flexible line 106 exits delivery guide 112.

Referring generally to FIGS. 1 and 2 and particularly to, e.g., FIG. 13, source 116 of curing energy 118 is configured to partially cure first layer 140 of segment 120 of continuous flexible line 106 as at least a portion of first layer 140 is being deposited by delivery guide 112 against surface 114 and to further cure first layer 140 and to partially cure second layer 142 as second layer 142 is being deposited by delivery guide 112 against first layer 140. The preceding subject matter of this paragraph characterizes example 141 of the present disclosure, wherein example 141 also includes the subject matter according to any one of examples 85-140, above.

By only partially curing first layer 140 as first layer 140 is being deposited, first layer 140 may remain tacky, or sticky, thereby facilitating adhesion of second layer 142 against first layer 140 as second layer 142 is deposited against first layer 140. Then, first layer 140 is further cured as second layer 142 is being partially cured for deposition of a subsequent layer against second layer 142, and so forth.

By further curing first layer 140, it is meant that first layer 140 may be fully cured or less than fully cured. For example, in some applications, a less than full cure of composite part 102 may be desirable during manufacture by system 100 or system 700 to permit subsequent work on composite part 102 before an entirety of composite part 102 is fully cured, such as with a process separate from system 100 or system 700. For example, composite part 102 may be baked, heated, and/or placed in an autoclave for final curing.

Referring generally to FIGS. 1 and 2 and particularly to, e.g., FIGS. 17-21, 31, and 33, system 100, 700 further comprises compactor 138, operatively coupled to delivery guide 112. Compactor 138 is configured to impart a compaction force at least to section 180 of segment 120 of continuous flexible line 106 after segment 120 of continuous flexible line 106 exits delivery guide 112. The preceding subject matter of this paragraph characterizes example 142 of the present disclosure, wherein example 142 also includes the subject matter according to any one of examples 1-97 or 112-141, above.

Compactor 138 compacts adjacent layers of continuous flexible line 106 that have been deposited by delivery guide 112 along print path 122.

Referring generally to FIGS. 1 and 2 and particularly to, e.g., FIGS. 17-19, 31, and 33, compactor 138 comprises compaction roller 182, having compaction-roller surface 184 that is configured to roll over at least section 180 of segment 120 of continuous flexible line 106 after segment 120 of continuous flexible line 106 exits delivery guide 112. The preceding subject matter of this paragraph characterizes example 143 of the present disclosure, wherein example 143 also includes the subject matter according to example 142, above.

Compaction roller 182, compared to alternative examples of compactor 138, may reduce the axial movement of thermosetting-resin component 110 along segment 120 during compaction. Additionally, compared to alternative examples of compactor 138, compaction roller 182 may provide a more desirable normal, or perpendicular, component of the compaction force.

Referring generally to FIGS. 1 and 2 and particularly to, e.g., FIG. 17, compaction-roller surface 184 is textured. The preceding subject matter of this paragraph characterizes example 144 of the present disclosure, wherein example 144 also includes the subject matter according to example 143, above.

When compaction-roller surface 184 is textured, compaction-roller surface 184 imparts a texture to segment 120 or abrades segment 120, providing it with an increased surface area for better adhesion of a subsequent layer of continuous flexible line 106 deposited against it.

Referring generally to FIGS. 1 and 2 and particularly to, e.g., FIG. 18, compaction-roller surface 184 is shaped to impart a predetermined cross-sectional shape at least to section 180 of segment 120 of continuous flexible line 106 after segment 120 of continuous flexible line 106 exits delivery guide 112. The preceding subject matter of this paragraph characterizes example 145 of the present disclosure, wherein example 145 also includes the subject matter according to any one of examples 143 or 144, above.

It may be desirable, in some applications, to impart a predetermined cross-sectional shape to continuous flexible line 106 as it is being deposited by delivery guide 112.

Referring generally to FIGS. 1 and 2 and particularly to, e.g., FIG. 20, compactor 138 comprises compaction wiper 185, having wiper drag surface 186 that is configured to drag against at least section 180 of segment 120 of continuous flexible line 106 after segment 120 of continuous flexible line 106 exits delivery guide 112. The preceding subject matter of this paragraph characterizes example 146 of the present disclosure, wherein example 146 also includes the subject matter according to example 142, above.

Compaction wiper 185, compared to alternative examples of compactor 138, may increase the axial movement of thermosetting-resin component 110 along segment 120 during compaction.

Referring generally to FIGS. 1 and 2, wiper drag surface 186 is textured. The preceding subject matter of this paragraph characterizes example 147 of the present disclosure, wherein example 147 also includes the subject matter according to example 146, above.

When wiper drag surface 186 is textured, wiper drag surface 186 imparts a texture to segment 120 or abrades segment 120, providing it with an increased surface area for better adhesion of a subsequent layer of continuous flexible line 106 deposited against it.

Referring generally to FIGS. 1 and 2, wiper drag surface 186 is shaped to impart a predetermined cross-sectional shape to segment 120 of continuous flexible line 106 after segment 120 of continuous flexible line 106 exits delivery guide 112. The preceding subject matter of this paragraph characterizes example 148 of the present disclosure, wherein example 148 also includes the subject matter according to any one of examples 146 or 147, above.

As mentioned, it may be desirable, in some applications, to impart a predetermined cross-sectional shape to continuous flexible line 106 as it is being deposited by delivery guide 112.

Referring generally to FIGS. 1 and 2 and particularly to, e.g., FIGS. 19, 31, and 33, compactor 138 is biased toward section 180 of segment 120 of continuous flexible line 106. The preceding subject matter of this paragraph characterizes example 149 of the present disclosure, wherein example 149 also includes the subject matter according to any one of examples 142-148, above.

By being biased toward section 180, compactor 138 imparts a desired compaction force against section 180.

Compactor 138 may be biased toward section 180, such as by spring 181 (as illustrated in FIGS. 1 and 2) or another biasing member.

Referring generally to FIGS. 1 and 2 and particularly to, e.g., FIGS. 19, 31, and 33, compactor 138 is rotatable relative to delivery guide 112. The preceding subject matter of this paragraph characterizes example 150 of the present disclosure, wherein example 150 also includes the subject matter according to any one of examples 142-149, above.

By being rotatable relative to delivery guide 112, compactor 138 may be selectively positioned to impart its compaction force against section 180 of segment 120 as delivery guide 112 moves, including as it changes directions, relative to surface 114 and/or vice versa.

Referring generally to FIGS. 1 and 2 and particularly to, e.g., FIGS. 19, 31, and 33, compactor 138 is configured to trail delivery guide 112 when delivery guide 112 moves relative to surface 114. The preceding subject matter of this paragraph characterizes example 151 of the present disclosure, wherein example 151 also includes the subject matter according to any one of examples 142-150, above.

By trailing delivery guide 112, compactor 138 is selectively positioned to impart its compaction force against section 180 of segment 120 directly following section 180 exiting delivery guide 112.

Referring generally to FIGS. 1 and 2 and particularly to, e.g., FIGS. 31 and 33, system 100, 700 further comprises pivoting arm 152, coupled relative to delivery guide 112 such that pivoting arm 152 trails delivery guide 112 as delivery guide 112 moves relative to surface 114. Compactor 138 is coupled to pivoting arm 152. The preceding subject matter of this paragraph characterizes example 152 of the present disclosure, wherein example 152 also includes the subject matter according to any one of examples 142-151, above.

Pivoting arm 152 provides for selective pivoting of compactor 138 relative to delivery guide 112. Accordingly, compactor 138 may be selectively positioned to impart its compaction force against section 180 of segment 120 as delivery guide 112 moves, including as it changes directions, relative to surface 114 and/or vice versa.

Referring generally to FIGS. 1 and 2 and particularly to, e.g., FIGS. 31 and 33, system 100, 700 further comprises pivoting-arm actuator 188, operatively coupled to pivoting arm 152 and configured to actively control a rotational position of pivoting arm 152 relative to delivery guide 112 as delivery guide 112 moves relative to surface 114. The preceding subject matter of this paragraph characterizes example 153 of the present disclosure, wherein example 153 also includes the subject matter according to example 152, above.

Pivoting-arm actuator 188 provides for selective pivoting of pivoting arm 152 and thus of compactor 138 relative to delivery guide 112. Accordingly, compactor 138 may be selectively positioned to impart its compaction force against section 180 of segment 120 as delivery guide 112 moves, including as it changes directions, relative to surface 114 and/or vice versa.

Referring generally to FIGS. 1 and 2 and particularly to, e.g., FIGS. 31 and 33, pivoting-arm actuator 188 is configured to actively coordinate the rotational position of pivoting arm 152 with movement of delivery guide 112 relative to surface 114. The preceding subject matter of this paragraph characterizes example 154 of the present disclosure, wherein example 154 also includes the subject matter according to example 153, above.

Accordingly, compactor 138 may be selectively and actively positioned to impart its compaction force against section 180 of segment 120 as delivery guide 112 moves, including as it changes directions, relative to surface 114 and/or vice versa.

Referring generally to FIGS. 1 and 2 and particularly to, e.g., FIG. 21, compactor 138 comprises skirt 190, coupled to delivery guide 112. Skirt 190 comprises skirt drag surface 192 that is positioned to drag against at least section 180 of segment 120 of continuous flexible line 106 after segment 120 of continuous flexible line 106 exits delivery guide 112. The preceding subject matter of this paragraph characterizes example 155 of the present disclosure, wherein example 155 also includes the subject matter according to example 142, above.

Skirt 190 extends from delivery guide 112 and circumferentially around guide outlet 206. Accordingly, regardless of a direction of movement of delivery guide 112 relative to surface 114, and/or vice versa, skirt 190 is positioned to compact section 180 of segment 120 of continuous flexible line 106 as it is being deposited.

Referring generally to FIGS. 1 and 2 and particularly to, e.g., FIG. 31, system 100, 700 further comprises surface roughener 144, operatively coupled to delivery guide 112. Surface roughener 144 is configured to abrade at least section 194 of segment 120 of continuous flexible line 106 after segment 120 of continuous flexible line 106 exits delivery guide 112. The preceding subject matter of this paragraph characterizes example 156 of the present disclosure, wherein example 156 also includes the subject matter according to any one of examples 1-111 or 136-155, above.

Surface roughener 144 abrades section 194, providing it with an increased surface area for better adhesion of a subsequent layer deposited against it.

Referring generally to FIGS. 1 and 2, surface roughener 144 comprises roughening roller 196, having roughening-roller surface 198 that is configured to rotationally abrade at least section 194 of segment 120 of continuous flexible line 106 after segment 120 of continuous flexible line 106 exits delivery guide 112. The preceding subject matter of this paragraph characterizes example 157 of the present disclosure, wherein example 157 also includes the subject matter according to example 156, above.

Roughening roller 196, compared to alternative examples of surface roughener 144, may reduce the axial movement of thermosetting-resin component 110 along segment 120 during abrasion thereof. Moreover, roughening-roller surface 198, by being heated by conductive heat source 908 and rolling against segment 120 may provide for efficient heat transfer, and thus curing, of section 194.

Referring generally to FIGS. 1 and 2, roughening-roller surface 198 is shaped to impart a predetermined cross-sectional shape to segment 120 of continuous flexible line 106 after segment 120 of continuous flexible line 106 exits delivery guide 112. The preceding subject matter of this paragraph characterizes example 158 of the present disclosure, wherein example 158 also includes the subject matter according to example 157, above.

It may be desirable, in some applications, to impart a predetermined cross-sectional shape to continuous flexible line 106 as it is being deposited by delivery guide 112.

Referring generally to FIGS. 1 and 2 and particularly to, e.g., FIG. 31, surface roughener 144 comprises roughening drag surface 200 that is configured to translationally abrade at least section 194 of segment 120 of continuous flexible line 106 after segment 120 of continuous flexible line 106 exits delivery guide 112. The preceding subject matter of this paragraph characterizes example 159 of the present disclosure, wherein example 159 also includes the subject matter according to example 158, above.

Roughening drag surface 200, compared to alternative examples of surface roughener 144, may increase the axial movement of thermosetting-resin component 110 along segment 120 during abrasion thereof.

Referring generally to FIGS. 1 and 2 and particularly to, e.g., FIG. 31, surface roughener 144 is biased toward section 194 of segment 120 of continuous flexible line 106 after segment 120 of continuous flexible line 106 exits delivery guide 112. The preceding subject matter of this paragraph characterizes example 160 of the present disclosure, wherein example 160 also includes the subject matter according to any one of examples 156-159, above.

By being biased toward section 194, surface roughener 144 imparts a desired abrasion force against section 194.

Referring generally to FIGS. 1 and 2 and particularly to, e.g., FIG. 31, surface roughener 144 is rotatable relative to delivery guide 112. The preceding subject matter of this paragraph characterizes example 161 of the present disclosure, wherein example 161 also includes the subject matter according to any one of examples 156-160, above.

By being rotatable relative to delivery guide 112, surface roughener 144 may be selectively positioned to abrade section 194 as delivery guide 112 moves, including as it changes directions, relative to surface 114 and/or vice versa.

Referring generally to FIGS. 1 and 2 and particularly to, e.g., FIG. 31, surface roughener 144 is configured to trail delivery guide 112 when delivery guide 112 moves relative to surface 114. The preceding subject matter of this paragraph characterizes example 162 of the present disclosure, wherein example 162 also includes the subject matter according to any one of examples 156-161, above.

By trailing delivery guide 112, surface roughener 144 is selectively positioned to abrade section 194 directly following segment 120 exiting delivery guide 112.

Referring generally to FIGS. 1 and 2 and particularly to, e.g., FIG. 31, system 100, 700 further comprises pivoting arm 152, configured such that pivoting arm 152 trails delivery guide 112 as delivery guide 112 moves relative to surface 114. Surface roughener 144 is coupled to pivoting arm 152. The preceding subject matter of this paragraph characterizes example 163 of the present disclosure, wherein example 163 also includes the subject matter according to any one of examples 156-162, above.

By trailing delivery guide 112, surface roughener 144 is selectively positioned to abrade section 194 directly following segment 120 exiting delivery guide 112.

Referring generally to FIGS. 1 and 2 and particularly to, e.g., FIG. 31, system 100, 700 further comprises pivoting-arm actuator 188, operatively coupled to pivoting arm 152 and configured to actively control a rotational position of pivoting arm 152 relative to delivery guide 112 as delivery guide 112 moves relative to surface 114. The preceding subject matter of this paragraph characterizes example 164 of the present disclosure, wherein example 164 also includes the subject matter according to example 163, above.

Pivoting-arm actuator 188 provides for selective pivoting of pivoting arm 152 and thus of surface roughener 144 relative to delivery guide 112. Accordingly, surface roughener 144 may be selectively positioned to abrade section 194 as delivery guide 112 moves, including as it changes directions, relative to surface 114 and/or vice versa.

Referring generally to FIGS. 1 and 2 and particularly to, e.g., FIG. 31, pivoting-arm actuator 188 is configured to actively coordinate the rotational position of pivoting arm 152 with movement of delivery guide 112 relative to surface 114. The preceding subject matter of this paragraph characterizes example 165 of the present disclosure, wherein example 165 also includes the subject matter according to example 164, above.

Accordingly, surface roughener 144 may be selectively and actively positioned to abrade section 194 as delivery guide 112 moves, including as it changes directions, relative to surface 114 and/or vice versa.

Referring generally to FIGS. 1 and 2 and particularly to, e.g., FIG. 31, system 100, 700 further comprises compactor 138. Surface roughener 144 is positioned to abrade at least section 194 of segment 120 of continuous flexible line 106 following compaction of at least section 194 by compactor 138. The preceding subject matter of this paragraph characterizes example 166 of the present disclosure, wherein example 166 also includes the subject matter according to any one of examples 156-165, above.

System 100, 700 according to example 166 includes both compactor 138 and surface roughener 144. By having surface roughener 144 positioned to abrade section 194 following compaction by compactor 138, the abrasion of section 194 is not hindered, or dulled, by a subsequent compaction thereof. Accordingly, abrasion of section 194 has an increased surface area for better adhesion of a subsequent layer deposited against it.

Referring generally to FIGS. 1 and 2 and particularly to, e.g., FIG. 31, system 100, 700 further comprises debris inlet 202, configured to collect debris resulting from abrading at least section 194 of segment 120 of continuous flexible line 106 with surface roughener 144. The preceding subject matter of this paragraph characterizes example 167 of the present disclosure, wherein example 167 also includes the subject matter according to any one of examples 156-166, above.

Collection by debris inlet 202 of debris that results from abrasion of section 194 by surface roughener 144, avoids unwanted, loose particles of thermosetting-resin component 110 becoming trapped between adjacent deposited layers of continuous flexible line 106 that may otherwise result in unwanted properties of composite part 102.

Referring generally to FIGS. 1 and 2 and particularly to, e.g., FIG. 31, system 100, 700 further comprises vacuum source 203, selectively communicatively coupled with debris inlet 202. The preceding subject matter of this paragraph characterizes example 168 of the present disclosure, wherein example 168 also includes the subject matter according to example 167, above.

Vacuum source 203 draws air and debris from adjacent section 194 through debris inlet 202.

Referring generally to FIGS. 1 and 2 and particularly to, e.g., FIG. 31, system 100, 700 further comprises pivoting arm 152, coupled relative to delivery guide 112 such that pivoting arm 152 trails delivery guide 112 as delivery guide 112 moves relative to surface 114. Debris inlet 202 is operatively coupled to pivoting arm 152. The preceding subject matter of this paragraph characterizes example 169 of the present disclosure, wherein example 169 also includes the subject matter according to any one of examples 167 or 168, above.

By being coupled to pivoting arm 152, debris inlet 202 is selectively positioned to collect debris directly from adjacent section 194 as delivery guide 112 moves relative to surface 114 and/or vice versa.

Referring generally to FIGS. 1 and 2 and particularly to, e.g., FIG. 31, system 100, 700 further comprises pivoting-arm actuator 188, operatively coupled to pivoting arm 152 and configured to actively control a rotational position of pivoting arm 152 relative to delivery guide 112 as delivery guide 112 moves relative to surface 114. The preceding subject matter of this paragraph characterizes example 170 of the present disclosure, wherein example 170 also includes the subject matter according to example 169, above.

Pivoting-arm actuator 188, by actively controlling a rotational position of pivoting arm 152 relative to delivery guide 112, ensures that debris inlet 202 trails delivery guide 112 so that debris inlet 202 is selectively positioned to collect debris directly adjacent to section 194 as delivery guide 112 moves relative to surface 114 and/or vice versa.

Referring generally to FIGS. 1 and 2 and particularly to, e.g., FIG. 31, pivoting-arm actuator 188 is configured to actively coordinate the rotational position of pivoting arm 152 with movement of delivery guide 112 relative to surface 114. The preceding subject matter of this paragraph characterizes example 171 of the present disclosure, wherein example 171 also includes the subject matter according to example 170, above.

Pivoting-arm actuator 188, by actively coordinating a rotational position of pivoting arm 152 relative to delivery guide 112, ensures that debris inlet 202 trails delivery guide 112 so that debris inlet 202 is selectively positioned to collect debris directly adjacent to section 194 as delivery guide 112 moves relative to surface 114 and/or vice versa.

Referring generally to FIGS. 1 and 2 and particularly to, e.g., FIG. 31, system 100, 700 further comprises pressurized-gas outlet 204, configured to disperse debris, resulting from roughening of segment 120 of continuous flexible line 106 by surface roughener 144, with a pressurized gas. The preceding subject matter of this paragraph characterizes example 172 of the present disclosure, wherein example 172 also includes the subject matter according to any one of examples 156-171, above.

Dispersal by pressurized-gas outlet 204 of debris that results from abrasion of section 194 by surface roughener 144, avoids unwanted, loose particles of thermosetting-resin component 110 becoming trapped between adjacent deposited layers of continuous flexible line 106 that may otherwise result in unwanted properties of composite part 102.

Referring generally to FIGS. 1 and 2 and particularly to, e.g., FIG. 31, system 100, 700 further comprises pressurized-gas source 205, selectively communicatively coupled with pressurized-gas outlet 204. The preceding subject matter of this paragraph characterizes example 173 of the present disclosure, wherein example 173 also includes the subject matter according to example 172, above.

Pressurized-gas source 205 provides a source of the pressurized gas to be delivered to section 194 via pressurized-gas outlet 204.

Referring generally to FIGS. 1 and 2 and particularly to, e.g., FIG. 31, system 100, 700 further comprises pivoting arm 152, configured such that pivoting arm 152 trails delivery guide 112 as delivery guide 112 moves relative to surface 114. Pressurized-gas outlet 204 is operatively coupled to pivoting arm 152. The preceding subject matter of this paragraph characterizes example 174 of the present disclosure, wherein example 174 also includes the subject matter according to any one of examples 172 or 173, above.

By being coupled to pivoting arm 152, pressurized-gas outlet 204 is selectively positioned to disperse debris directly from adjacent section 194 as delivery guide 112 moves relative to surface 114 and/or vice versa.

Referring generally to FIGS. 1 and 2 and particularly to, e.g., FIG. 31, system 100, 700 further comprises pivoting-arm actuator 188, operatively coupled to pivoting arm 152 and configured to actively control a rotational position of pivoting arm 152 relative to delivery guide 112 as delivery guide 112 moves relative to surface 114. The preceding subject matter of this paragraph characterizes example 175 of the present disclosure, wherein example 175 also includes the subject matter according to example 174, above.

Pivoting-arm actuator 188, by actively controlling a rotational position of pivoting arm 152 relative to delivery guide 112, ensures that pressurized-gas outlet 204 trails delivery guide 112 so that pressurized-gas outlet 204 is selectively positioned to disperse debris directly adjacent to section 194 as delivery guide 112 moves relative to surface 114 and/or vice versa.

Referring generally to FIGS. 1 and 2 and particularly to, e.g., FIG. 31, pivoting-arm actuator 188 is configured to actively coordinate the rotational position of pivoting arm 152 with movement of delivery guide 112 relative to surface 114. The preceding subject matter of this paragraph characterizes example 176 of the present disclosure, wherein example 176 also includes the subject matter according to example 175, above.

Pivoting-arm actuator 188, by actively coordinating a rotational position of pivoting arm 152 relative to delivery guide 112, ensures that pressurized-gas outlet 204 trails delivery guide 112 so that pressurized-gas outlet 204 is selectively positioned to disperse debris directly adjacent to section 194 as delivery guide 112 moves relative to surface 114 and/or vice versa.

Referring generally to FIGS. 1 and 2 and particularly to, e.g., FIGS. 27 and 31-39, feed mechanism 104 is coupled to delivery guide 112. The preceding subject matter of this paragraph characterizes example 177 of the present disclosure, wherein example 177 also includes the subject matter according to any one of examples 1-176, above.

Having feed mechanism 104 coupled to delivery guide 112 facilitates feed mechanism 104 being able to operatively push continuous flexible line 106 through delivery guide 112.

Referring generally to FIGS. 1 and 2 and particularly to, e.g., FIGS. 27 and 31-33, delivery guide 112 extends from feed mechanism 104. The preceding subject matter of this paragraph characterizes example 178 of the present disclosure, wherein example 178 also includes the subject matter according to any one of examples 1-177, above.

By extending from feed mechanism 104, delivery guide 112 may be positioned for selective deposition of continuous flexible line 106 in a desired location along print path 122.

Referring generally to FIGS. 1 and 2 and particularly to, e.g., FIG. 27, delivery guide 112 comprises guide inlet 170, guide outlet 206, through which continuous flexible line 106 exits delivery guide 112, and guide line passage 154, extending from guide inlet 170 to guide outlet 206. Feed mechanism 104 is configured to push continuous flexible line 106 through guide line passage 154. Feed mechanism 104 comprises support frame 156 and opposing rollers 157, having respective rotational axes 159. Opposing rollers 157 are rotatably coupled to support frame 156. Opposing rollers 157 are configured to engage opposite sides of continuous flexible line 106. Opposing rollers 157 are configured to selectively rotate to push continuous flexible line 106 through guide line passage 154. The preceding subject matter of this paragraph characterizes example 179 of the present disclosure, wherein example 179 also includes the subject matter according to any one of examples 1-178, above.

Support frame 156 provides support for component parts of feed mechanism 104, including opposing rollers 157. Opposing rollers 157, when selectively rotated, act to frictionally engage continuous flexible line 106, thereby feeding it between opposing rollers 157 and pushing it into guide inlet 170 and through guide line passage 154.

Referring generally to FIG. 27 and particularly to, e.g., FIGS. 37-39, opposing rollers 157 are in contact with each other. The preceding subject matter of this paragraph characterizes example 180 of the present disclosure, wherein example 180 also includes the subject matter according to example 179, above.

Contact between opposing rollers 157 may ensure that opposing rollers 157 roll together and avoid imparting an uneven torque that would bend or otherwise create an internal curved bias to continuous flexible line 106 as it is drawn between the rollers. Additionally or alternatively, contact between opposing rollers 157 may permit for only one of opposing rollers 157 to be directly driven by a motor, while the other of opposing rollers 157 simply rotates as a result of being engaged with the driven roller.

Referring generally to FIGS. 27 and 28 and particularly to, e.g., FIGS. 37 and 38, each of opposing rollers 157 comprises circumferential channel 161, configured to contact continuous flexible line 106. The preceding subject matter of this paragraph characterizes example 181 of the present disclosure, wherein example 181 also includes the subject matter according to any one of examples 179 or 180, above.

Inclusion of circumferential channel 161 in each of opposing rollers 157 thereby creates a passage through which continuous flexible line 106 may extend and provides for a greater surface area of contact between opposing rollers 157 and continuous flexible line 106, thereby facilitating continuous flexible line 106 being pushed into guide inlet 170 and through guide line passage 154.

Referring generally to FIG. 27 and particularly to, e.g., FIGS. 37 and 38, one of opposing rollers 157 comprises circumferential channel 161, configured to contact continuous flexible line 106. The preceding subject matter of this paragraph characterizes example 182 of the present disclosure, wherein example 182 also includes the subject matter according to any one of examples 179 or 180, above.

As with example 181, inclusion of one circumferential channel 161 creates a passage through which continuous flexible line 106 may extend and provides for a greater surface area of contact between opposing rollers 157 and continuous flexible line 106, thereby facilitating continuous flexible line 106 being pushed into guide inlet 170 and through guide line passage 154.

Referring generally to FIGS. 1 and 2 and particularly to, e.g., FIGS. 38 and 39, opposing rollers 157 are differently sized. The preceding subject matter of this paragraph characterizes example 183 of the present disclosure, wherein example 183 also includes the subject matter according to any one of examples 179-182, above.

Differently sized opposing rollers 157 may permit for efficient packaging of feed mechanism 104. Additionally or alternatively, differently sized opposing rollers 157 may provide for a desired torque transfer between driven roller 158 and idle roller 160.

Referring generally to FIGS. 1 and 2 and particularly to, e.g., FIG. 27, opposing rollers 157 are identically sized. The preceding subject matter of this paragraph characterizes example 184 of the present disclosure, wherein example 184 also includes the subject matter according to any one of examples 179-182, above.

Identically sized opposing rollers 157 may permit for efficient packaging of feed mechanism 104. Additionally or alternatively, identically sized opposing rollers 157 may provide for a desired torque transfer between driven roller 158 and idle roller 160.

Referring generally to FIGS. 1 and 2 and particularly to, e.g., FIGS. 27 and 37-39, feed mechanism 104 further comprises motor 162, operatively coupled at least to one of opposing rollers 157 and configured to selectively rotate at least one of opposing rollers 157. The preceding subject matter of this paragraph characterizes example 185 of the present disclosure, wherein example 185 also includes the subject matter according to any one of examples 179-184, above.

Motor 162 provides a motive force for rotating opposing rollers 157 for feed mechanism 104 to push continuous flexible line 106 through delivery guide 112.

Referring generally to FIGS. 1 and 2 and particularly to, e.g., FIGS. 27 and 37-39, opposing rollers 157 comprise driven roller 158, operatively coupled to motor 162 and idle roller 160, biased toward driven roller 158 to operatively engage opposing sides of continuous flexible line 106. The preceding subject matter of this paragraph characterizes example 186 of the present disclosure, wherein example 186 also includes the subject matter according to example 185, above.

By having idle roller 160 biased toward driven roller 158, idle roller 160 need not be directly driven by a motor for feed mechanism 104 to push non-resin component 108 through delivery guide 112. Instead, idle roller 160 is rotated by being engaged with driven roller 158 and/or by being engaged with non-resin component 108, which in turn is engaged with driven roller 158.

Idle roller 160 may be biased toward driven roller 158 by biasing member 164, which may be a spring, such as a coil spring.

Referring generally to FIGS. 1 and 2 and particularly to, e.g., FIGS. 37-39, idle roller 160 is biased relative to support frame 156 so that idle roller 160 is biased toward driven roller 158. Idle roller 160 is configured to selectively translate away from driven roller 158. The preceding subject matter of this paragraph characterizes example 187 of the present disclosure, wherein example 187 also includes the subject matter according to example 186, above.

By being configured to selectively translate away from driven roller 158 against the bias of biasing member 164, insertion of continuous flexible line 106 between opposing rollers 157, such as during initial set-up of system 100 or system 700 and/or to change continuous flexible line 106 during manufacture of composite part 102, may be facilitated.

In the example illustrated in FIGS. 37-39, feed mechanism 104 includes rocker arm 169 coupled to idle roller 160 and pivotally coupled to support frame 156, such that rocker arm 169 provides structure for a user to engage and pivot idle roller 160 away from driven roller 158 against the bias of biasing member 164. However, other configurations are within the scope of the present disclosure, including configurations in which idle roller 160 is linearly, as opposed to pivotally, translated away from drive roller 158.

As used herein, "to bias" means to continuously apply a force, which may or may not have a constant magnitude.

Referring generally to FIGS. 1 and 2 and particularly to, e.g., FIGS. 37-39, feed mechanism 104 further comprises adjuster 171, configured to selectively adjust a force applied to idle roller 160 to bias idle roller 160 toward driven roller 158. The preceding subject matter of this paragraph characterizes example 188 of the present disclosure, wherein example 188 also includes the subject matter according to example 187, above.

Adjuster 171 permits a user to selectively adjust the biasing force of idle roller 160 toward driven roller 158 and thus the force applied to continuous flexible line 106 between opposing rollers 157. For example, different magnitudes of force facilitate operation of system 100 or system 700 in connection with different material properties of different configurations and/or different sizes of continuous flexible line 106 and non-resin component 108 that may be used by system 100 or system 700.

Referring generally to FIGS. 1 and 2 and particularly to, e.g., FIGS. 27, 37, and 38, delivery guide 112 further comprises first end portion 163, second end portion 165, and junction 167 between first end portion 163 and second end portion 165. First end portion 163 is shaped to be complementary to one of opposing rollers 157 and second end portion 165 is shaped to be complementary to another of opposing rollers 157. The preceding subject matter of this paragraph characterizes example 189 of the present disclosure, wherein example 189 also includes the subject matter according to any one of examples 179-188, above.

Having first end portion 163 and second end portion 165 complementary with opposing rollers 157, delivery guide 112 may be positioned in very close proximity to opposing rollers 157. Accordingly, when feed mechanism 104 pushes continuous flexible line 106 into and through delivery guide 112, continuous flexible line 106 is less likely to bunch, kink, clog, or otherwise mis-feed from feed mechanism 104 to delivery guide 112.

Referring generally to FIG. 27, a shortest distance D between junction 167 and plane 173, containing respective rotational axes 159 of opposing rollers 157, is less than a radius of a smallest one of opposing rollers 157. The preceding subject matter of this paragraph characterizes example 190 of the present disclosure, wherein example 190 also includes the subject matter according to example 189, above.

Again, having delivery guide 112 in close proximity to opposing rollers 157, such as with junction 167 within distance D of plane 173, non-resin component 108 operatively may be pushed into and through delivery guide 112.

Referring generally to FIGS. 1 and 2 and particularly to, e.g., FIGS. 27, 37, and 38, junction 167 comprises an edge. The preceding subject matter of this paragraph characterizes example 191 of the present disclosure, wherein example 191 also includes the subject matter according to any one of examples 189 or 190, above.

When junction 167 comprises an edge, the edge may be positioned in very close proximity to the interface between opposing rollers 157 and the interface between opposing rollers 157 and continuous flexible line 106.

In some examples, the edge may be linear. In some examples, the edge may be a sharp edge. In some examples, the edge may be a rounded edge.

Referring generally to FIG. 27 and particularly to, e.g., FIGS. 37 and 38, feed mechanism 104 further comprises scraper 172 in contact with at least one of opposing rollers 157 to remove residue of thermosetting-resin component 110 produced by the engagement between opposing rollers 157 and continuous flexible line 106 as opposing rollers 157 rotate to selectively translate continuous flexible line 106 to push continuous flexible line 106 through guide line passage 154. The preceding subject matter of this paragraph characterizes example 192 of the present disclosure, wherein example 192 also includes the subject matter according to any one of examples 179-191, above.

Scraper 172 removes residue of thermosetting-resin component 110 from opposing rollers 157 to ensure that resin does not build up on opposing rollers 157 and hinder operation of feed mechanism 104.

Scraper 172 may take any suitable form to operatively remove, or scrape, resin from opposing rollers 157. For example, with reference to FIGS. 37 and 38, scraper 172 may be a rectangular, or other, projection that extends in close proximity to one of opposing rollers 157, such as within 3 mm, 2 mm, 1 mm, 0.5 mm, or that extends to physically engage one of opposing rollers 157. More specifically, as seen in FIGS. 37 and 38, scraper 172 may extend adjacent to a region of opposing rollers 157 where opposing rollers 157 engage continuous flexible line 106.

Referring generally to FIG. 28, at least one of opposing rollers 157 comprises circumferential channel 161, configured to contact continuous flexible line 106. Scraper 172 comprises projection 175, configured to remove from circumferential channel 161 the residue of thermosetting-resin component 110, produced by the engagement between circumferential channel 161 and continuous flexible line 106 as opposing rollers 157 rotate to selectively translate continuous flexible line 106 to push continuous flexible line 106 through guide line passage 154. The preceding subject matter of this paragraph characterizes example 193 of the present disclosure, wherein example 193 also includes the subject matter according to example 192, above.

In examples of opposing rollers 157 that include circumferential channel 161, scraper 172 having projection 175 extending therein facilitates the scraping, or removal, of any residue of thermosetting-resin component 110 produced by engagement between opposing rollers 157 and continuous flexible line 106.

Referring generally to FIG. 27 and particularly to, e.g., FIGS. 37-39, feed mechanism 104 further comprises collection reservoir 174, coupled to support frame 156. Collection reservoir 174 is configured to collect the residue of thermosetting-resin component 110 removed by scraper 172. The preceding subject matter of this paragraph characterizes example 194 of the present disclosure, wherein example 194 also includes the subject matter according to any one of examples 192 or 193, above.

As mentioned, collection reservoir 174 collects residue that is removed by scraper 172. Accordingly, the residue does not interfere with other components of feed mechanism 104 and does not result in unwanted particles hindering the manufacture of composite part 102. Moreover, collection reservoir 174 may be selectively emptied by a user, such as when full or at the end of a process performed by system 100 or system 700.

Referring generally to FIGS. 1 and 2 and particularly to, e.g., FIGS. 22-24, 31, 40, and 41, delivery guide 112 further comprises guide inlet 170, guide outlet 206, and guide line passage 154, extending from guide inlet 170 to guide outlet 206. Guide outlet 206 is configured to provide an exit for continuous flexible line 106 from delivery guide 112. System 100, 700 further comprises cutter 208, configured to selectively cut continuous flexible line 106 adjacent to guide outlet 206. The preceding subject matter of this paragraph characterizes example 195 of the present disclosure, wherein example 195 also includes the subject matter according to any one of examples 1-194, above.

Inclusion of cutter 208 permits for the selective stopping and starting of delivery of continuous flexible line 106 by delivery guide 112. By having cutter 208 configured to cut continuous flexible line 106 adjacent to guide outlet 206, continuous flexible line 106 may be cut prior to being cured, such as by curing energy 118, and while continuous flexible line 106 is not yet in contact with, and optionally compacted against, a prior deposited layer of continuous flexible line 106. In other words, access to an entirety of the circumference of continuous flexible line 106 by cutter 208 is permitted.

Referring generally to FIGS. 1 and 2 and particularly to, e.g., FIGS. 22 and 24, cutter 208 is positioned within delivery guide 112. The preceding subject matter of this paragraph characterizes example 196 of the present disclosure, wherein example 196 also includes the subject matter according to example 195, above.

Positioning of cutter 208 within delivery guide 112 provides for a compact assembly of system 100 or system 700, such that cutter 208 does not hinder movement of delivery guide 112 relative to surface 114 and/or vice versa.

Referring generally to FIGS. 1 and 2 and particularly to, e.g., FIG. 25, cutter 208 comprises cutting laser 213. The preceding subject matter of this paragraph characterizes example 197 of the present disclosure, wherein example 197 also includes the subject matter according to any one of examples 195 or 196, above.

Use of cutting laser 213 to cut continuous flexible line 106 facilitates precision cutting of continuous flexible line 106 at a desired location during manufacture of composite part 102.

Referring generally to FIGS. 1 and 2 and particularly to, e.g., FIG. 25, cutter 208 further comprises at least one mirror-positioning system 214, configured to direct cutting laser 213 to selectively cut continuous flexible line 106 adjacent to outlet 206. The preceding subject matter of this paragraph characterizes example 198 of the present disclosure, wherein example 198 also includes the subject matter according to example 197, above.

In other words, one or more mirror-positioning systems 214 may actively direct cutting laser 213 at continuous flexible line 106 as continuous flexible line 106 exits delivery guide 112.

Referring generally to FIGS. 1 and 2 and particularly to, e.g., FIGS. 22-24, 31, 40, and 41, cutter 208 comprises at least one blade 210, movable relative to delivery guide 112. The preceding subject matter of this paragraph characterizes example 199 of the present disclosure, wherein example 199 also includes the subject matter according to any one of examples 195 or 196, above.

Inclusion of at least one blade 210 may provide for a cost-effective cutter 208.

Referring generally to FIGS. 1 and 2 and particularly to, e.g., FIG. 22, cutter 208 is iris diaphragm 212. The preceding subject matter of this paragraph characterizes example 200 of the present disclosure, wherein example 200 also includes the subject matter according to example 199, above.

Iris diaphragm 212 enables cutting of continuous flexible line 106 from multiple sides of continuous flexible line 106. Accordingly, a cross-sectional profile of continuous flexible line 106 may be less deformed by iris diaphragm 212 than may otherwise result from other examples of cutter 208.

Referring generally to FIGS. 1 and 2 and particularly to, e.g., FIGS. 29 and 30, system 100, 700 further comprises drive assembly 216, operatively coupled at least to one of delivery guide 112 or surface 114 and configured to operatively and selectively move at least one of delivery guide 112 or surface 114 relative to another. The preceding subject matter of this paragraph characterizes example 201 of the present disclosure, wherein example 201 also includes the subject matter according to any one of examples 1-200, above.

Drive assembly 216 facilitates the relative movement between delivery guide 112 and surface 114 so that composite part 102 is manufactured from continuous flexible line 106 as it is deposited via delivery guide 112.

Referring generally to FIGS. 1 and 2 and particularly to, e.g., FIGS. 29 and 30, drive assembly 216 comprises X-axis drive 217, Y-axis drive 219, and Z-axis drive 215, at least one of which is operatively coupled at least to one of delivery guide 112 or surface 114. The preceding subject matter of this paragraph characterizes example 202 of the present disclosure, wherein example 202 also includes the subject matter according to example 201, above.

System 100, 700 according to example 202 provides for three-dimensional relative movement between delivery guide 112 and surface 114.

Referring generally to FIGS. 1 and 2, drive assembly 216 comprises robotic arm 218. The preceding subject matter of this paragraph characterizes example 203 of the present disclosure, wherein example 203 also includes the subject matter according to any one of examples 201 or 202, above.

Use of robotic arm 218 to operatively and selectively move delivery guide 112 relative to surface 114 and/or vice versa permits for multiple degrees of freedom and the manufacture of complex three-dimensional composite parts 102.

A sub-assembly of system 100 or system 700 therefore may be described as an end-effector for robotic arm 218.

Referring generally to FIGS. 1 and 2 and particularly to, e.g., FIGS. 29 and 30, drive assembly 216 is configured to operatively and selectively move at least one of delivery guide 112 or surface 114 orthogonally in three dimensions relative to another. The preceding subject matter of this paragraph characterizes example 204 of the present disclosure, wherein example 204 also includes the subject matter according to any one of examples 201-203, above.

System 100, 700 according to example 204 may manufacture composite part 102 in three dimensions.

Referring generally to FIGS. 1 and 2 and particularly to, e.g., FIGS. 29, 30, and 42, drive assembly 216 is configured to operatively and selectively move at least one of delivery guide 112 or surface 114 in three dimensions with at least three degrees of freedom relative to another. The preceding subject matter of this paragraph characterizes example 205 of the present disclosure, wherein example 205 also includes the subject matter according to any one of examples 201-203, above.

System 100, 700 according to example 205 may manufacture complex three-dimensional composite parts 102.

Referring generally to FIGS. 1 and 2 and particularly to, e.g., FIG. 42, drive assembly 216 is configured to operatively and selectively move at least one of delivery guide 112 or surface 114 in three dimensions with at least six degrees of freedom relative to another. The preceding subject matter of this paragraph characterizes example 206 of the present disclosure, wherein example 206 also includes the subject matter according to any one of examples 201-203, above.

System 100, 700 according to example 206 may manufacture complex three-dimensional composite parts 102.

Referring generally to FIGS. 1 and 2 and particularly to, e.g., FIG. 42, drive assembly 216 is configured to operatively and selectively move at least one of delivery guide 112 or surface 114 in three dimensions with at least nine degrees of freedom relative to another. The preceding subject matter of this paragraph characterizes example 207 of the present disclosure, wherein example 207 also includes the subject matter according to any one of examples 201-203, above.

System 100, 700 according to example 207 may manufacture complex three-dimensional composite parts 102.

Referring generally to FIGS. 1 and 2 and particularly to, e.g., FIG. 42, drive assembly 216 is configured to operatively and selectively move at least one of delivery guide 112 or surface 114 in three dimensions with at least twelve degrees of freedom relative to another. The preceding subject matter of this paragraph characterizes example 208 of the present disclosure, wherein example 208 also includes the subject matter according to any one of examples 201-203, above.

System 100, 700 according to example 208 may manufacture complex three-dimensional composite parts 102.

With reference to FIG. 42, a schematic illustration according to example 208 is presented, with linear translational elements 290 and rotational elements 292 providing twelve degrees of freedom between delivery guide 112 and surface 114, and with controller 294 being operatively communicatively coupled to linear translational elements 290 and rotational elements 292.

Referring generally to FIGS. 1 and 2, system 100, 700 further comprises shielding-gas outlet 220, configured to at least partially protect segment 120 of continuous flexible line 106 from environmental exposure by delivering shielding gas 221 to segment 120 of continuous flexible line 106 after segment 120 exits delivery guide 112. The preceding subject matter of this paragraph characterizes example 209 of the present disclosure, wherein example 209 also includes the subject matter according to any one of examples 1-208, above.

Inclusion of shielding-gas outlet 220 and delivery of shielding gas 221 therefrom to segment 120 restricts environmental exposure, such as resulting in oxidation, of continuous flexible line 106 prior to being further cured and/or during further curing by source 116.

Referring generally to FIGS. 1 and 2, system 100, 700 further comprises shielding-gas source 222, selectively communicatively coupled with shielding-gas outlet 220. The preceding subject matter of this paragraph characterizes example 210 of the present disclosure, wherein example 210 also includes the subject matter according to example 209, above.

Shielding-gas source 222 provides a source of shielding gas 221 to be delivered to segment 120 via shielding-gas outlet 220.

Referring generally to FIGS. 1 and 2, system 100, 700 further comprises pivoting arm 152, coupled relative to delivery guide 112 such that pivoting arm 152 trails delivery guide 112 as at least one of delivery guide 112 or surface 114 moves relative to another, wherein shielding-gas outlet 220 is operatively coupled to pivoting arm 152. The preceding subject matter of this paragraph characterizes example 211 of the present disclosure, wherein example 211 also includes the subject matter according to any one of examples 209 or 210, above.

By being coupled to pivoting arm 152, shielding-gas outlet 220 is selectively positioned to deliver shielding gas 221 to segment 120 as delivery guide 112 moves relative to surface 114 and/or vice versa.

Referring generally to FIGS. 1 and 2, system 100, 700 further comprises defect detector 224, configured to detect defects in segment 120 of continuous flexible line 106 after segment 120 of continuous flexible line 106 exits delivery guide 112. The preceding subject matter of this paragraph characterizes example 212 of the present disclosure, wherein example 212 also includes the subject matter according to any one of examples 1-211, above.

Detection of defects in segment 120 permits for selective scrapping of composite parts 102 having defects prior to completion of composite parts 102. Accordingly, less material may be wasted. Moreover, defects that otherwise would be hidden from view by various types of defect detectors may be detected by defect detector 224 prior to a subsequent layer of continuous flexible line 106 obscuring, or hiding, the defect from view.

Referring generally to FIGS. 1 and 2, detector 224 comprises optical detector 226 or ultrasonic detector 227. The preceding subject matter of this paragraph characterizes example 213 of the present disclosure, wherein example 213 also includes the subject matter according to example 212, above.

In some applications, optical detector 226 may be well suited to detect defects in segment 120 of continuous flexible line 106. In some applications, ultrasonic detector 227 may be well suited to detect defects in segment 120 of continuous flexible line 106.

Referring generally to FIGS. 1 and 2, defect detector 224 comprises camera 228. The preceding subject matter of this paragraph characterizes example 214 of the present disclosure, wherein example 214 also includes the subject matter according to example 212, above.

Camera 228 may be well suited to detect defects in segment 120 of continuous flexible line 106.

Referring generally to FIGS. 1 and 2, system 100, 700 further comprises controller 230 and one or more of first vessel low-level sensor 246; first supply 262 of first part 253 of thermosetting resin 252; first vessel high-level sensor 248; second vessel low-level sensor 259; second supply 263 of second part 255 of thermosetting resin 252; second vessel high-level sensor 269; first applicator motorized roller 249; second applicator motorized roller 257; origin 126 of non-resin component 108; element combiner 275; first origin 125 of first element 271 of non-resin component 108; second origin 127 of second element 273 of non-resin component 108; tow-separation device 610; origin 614 of tow 612; source 116 of curing energy 118; chamber 258; compactor 138; pivoting-arm actuator 188; surface roughener 144; debris inlet 202; vacuum source 203, selectively communicatively coupled with debris inlet 202; pressurized-gas outlet 204; pressurized-gas source 205, selectively communicatively coupled with pressurized-gas outlet 204; motor 162; cutter 208; drive assembly 216; shielding-gas outlet 220; shielding-gas source 222, selectively communicatively coupled with shielding-gas outlet 220; defect detector 224; heater 602, positioned to heat continuous flexible line 106 prior to exiting delivery guide 112; cooling system 234; surface 114; or vacuum table 115. Controller 230 is programmed to selectively operate one or more of delivery guide 112, first resin-part applicator 236, second resin-part applicator 237, feed mechanism 104, first vessel low-level sensor 246, first supply 262, first vessel high-level sensor 248, second vessel low-level sensor 259, second supply 263, second vessel high-level sensor 269, first applicator motorized roller 249, second applicator motorized roller 257, origin 126, element combiner 275, first origin 125, second origin 127, tow-separation device 610, origin 614, source 116 of curing energy 118, chamber 258, compactor 138, pivoting-arm actuator 188, surface roughener 144, debris inlet 202, vacuum source 203, pressurized-gas outlet 204, pressurized-gas source 205, motor 162, cutter 208, drive assembly 216, shielding-gas outlet 220, shielding-gas source 222, defect detector 224, heater 602, cooling system 234, surface 114, or vacuum table 115. The preceding subject matter of this paragraph characterizes example 215 of the present disclosure, wherein example 215 also includes the subject matter according to any one of examples 1-214, above.

Controller 230 controls the operation of various component parts of system 100 or system 700. For example, precise movement of delivery guide 112 and/or surface 114 relative to each other may be controlled to manufacture a desired three-dimensional composite part 102. Precise pivoting of pivoting arm 152 by pivoting-arm actuator 188 may be controlled to precisely deliver a compaction force by compactor 138, to precisely deliver curing energy 118, to precisely abrade continuous flexible line 106 by surface roughener 144, and so forth. Additionally, operation of various component parts may be selectively started and stopped by controller 230 during manufacture of composite part 102 to create desired properties and configurations of composite part 102.

In FIGS. 1 and 2, communication between controller 230 and various component parts of system 100 or system 700 is schematically represented by lightning bolts. Such communication may be wired and/or wireless in nature.

Controller 230 may include any suitable structure that may be adapted, configured, designed, constructed, and/or programmed to automatically control the operation of at least a portion of system 100 or at least a portion of system 700. As illustrative, non-exclusive examples, controller 230 may include and/or be an electronic controller, a dedicated controller, a special-purpose controller, a personal computer, a display device, a logic device, and/or a memory device. In addition, controller 230 may be programmed to perform one or more algorithms to automatically control the operation of system 100 or the operation of system 700. This may include algorithms that may be based upon and/or that may cause controller 230 to direct system 100 to perform method 400 or to direct system 700 to perform method 500. Methods 400 and 500 are described below.

Referring generally to FIGS. 1 and 2 and particularly to, e.g., FIGS. 29 and 30, system 100, 700 further comprises frame 232, which supports feed mechanism 104 and surface 114. The preceding subject matter of this paragraph characterizes example 216 of the present disclosure, wherein example 216 also includes the subject matter according to any one of examples 1-215, above.

Frame 232 structurally supports feed mechanism 104 and surface 114 so that feed mechanism 104 may operatively and selectively move delivery guide 112 relative to surface 114 and/or vice versa.

Referring generally to FIGS. 1 and 2, thermosetting-resin component 110 is configured to cure at a temperature between about 20° C. and about 30° C. within a period greater than 5 minutes or to cure at a temperature greater than 150° C. within a period of less than 5 seconds. The preceding subject matter of this paragraph characterizes example 217 of the present disclosure, wherein example 217 also includes the subject matter according to any one of examples 1-216, above.

Various thermosetting resins 252 may be used for thermosetting-resin component 110 and may be selected based on one or more of desired properties prior to being cured, desired properties after being fully cured, desired curing properties, such as based on length of time and/or temperatures required to fully cure, etc. The examples set forth in example 217 are illustrative and non-exclusive, and other configurations of thermosetting resin 252, and thus thermosetting-resin component 110, may be used with system 100 or system 700. Moreover, the various temperature values may vary for a particular thermosetting resin 252 and thermosetting-resin component 110 based on a volume of thermosetting resin 252 present at a location being cured.

Referring generally to FIGS. 1 and 2, delivery guide 112 is configured to at least partially cure continuous flexible line 106 prior to exiting delivery guide 112. The preceding subject matter of this paragraph characterizes example 218 of the present disclosure, wherein example 218 also includes the subject matter according to any one of examples 1-217, above.

In some applications, it may be desirable to initiate the curing of continuous flexible line 106 prior to it being deposited.

Referring generally to FIGS. 1 and 2, delivery guide 112 comprises heater 602, positioned to heat continuous flexible line 106 prior to exiting delivery guide 112. The preceding subject matter of this paragraph characterizes example 219 of the present disclosure, wherein example 219 also includes the subject matter according to example 218, above.

Heater 602 may provide for efficient curing, or pre-curing, of continuous flexible line 106 prior to exiting delivery guide 112.

Referring generally to FIGS. 1 and 2, delivery guide 112 further comprises guide inlet 170, guide outlet 206, and guide line passage 154, extending from guide inlet 170 to guide outlet 206. Guide outlet 206 is configured to provide an exit for continuous flexible line 106 from delivery guide 112. Heater 602 comprises resistive heater 604, positioned adjacent to guide outlet 206. The preceding subject matter of this paragraph characterizes example 220 of the present disclosure, wherein example 220 also includes the subject matter according to example 219, above.

Resistive heater 604 may be an efficient and inexpensive option for generating heat for at least partially curing continuous flexible line 106 prior to exiting delivery guide 112. Moreover, resistive heater 604 may provide for efficient packaging of delivery guide 112 with heater 602.

Referring generally to FIGS. 1 and 2, system 100, 700 further comprises cooling system 234, configured to maintain first part 253 of thermosetting resin 252 and second part 255 of thermosetting resin 252 below a threshold temperature at least prior to the first quantity of first part 253 of thermosetting resin 252 and second quantity of second part 255 of thermosetting resin 252 exiting delivery guide 112 as part of continuous flexible line 106. The preceding subject matter of this paragraph characterizes example 221 of the present disclosure, wherein example 221 also includes the subject matter according to any one of examples 1-220, above.

Cooling system 234 maintains first part 253 and second part 255 of thermosetting resin 252 below a threshold temperature, so as to maintain desired properties, such as viscosity of first part 253 and second part 255 prior to being deposited as thermosetting-resin component 110 as part of continuous flexible line 106.

Referring generally to FIGS. 1 and 2, cooling system 234 comprises one or more insulated stores 618. First resin-part applicator 236 and second resin-part applicator 237 are positioned within one or more insulated stores 618. The preceding subject matter of this paragraph characterizes example 222 of the present disclosure, wherein example 222 also includes the subject matter according to example 221, above.

Inclusion of one or more insulated stores 618 within which first resin-part applicator 236 and second resin-part applicator 237 are positioned facilitates maintaining first part 253 and second part 255 below a threshold temperature.

Referring generally to FIGS. 1 and 2, cooling system 234 further comprises pump 620 and coolant line 622, communicatively coupled with pump 620 and thermally coupled with one or more insulated stores 618. Pump 620 is configured to circulate coolant 624 through coolant line 622 to cool one or more insulated stores 618. The preceding subject matter of this paragraph characterizes example 223 of the present disclosure, wherein example 223 also includes the subject matter according to example 222, above.

Pump 620 may be used to circulate coolant 624 through coolant line 622, which due to being thermally coupled with one or more insulated stores 618, draws heat away from insulated stores 618 and further facilitates maintaining first part 253 and second part 255 below a threshold temperature.

Other mechanisms for maintaining insulated stores 618 and first part 253 and second part 255 of thermosetting resin 252 below a threshold temperature, including mechanisms that utilize a refrigeration cycle, also are within the scope of the present disclosure.

Referring generally to FIGS. 1 and 2, first resin-part applicator 236 and second resin-part applicator 237 comprise cooling system 234. The preceding subject matter of this paragraph characterizes example 224 of the present disclosure, wherein example 224 also includes the subject matter according to any one of examples 222 or 223, above.

By having first resin-part applicator 236 and second resin-part applicator 237 comprising cooling system 234, an efficient packaging of system 100 or system 700 may be facilitated, such as avoiding one or more insulated stores 618.

Referring generally to FIGS. 1 and 2, system 100, 700 further comprises cooling system 234, configured to maintain thermosetting-resin component 110 of continuous flexible line 106 below a threshold temperature prior to continuous flexible line 106 being deposited by delivery guide 112. The preceding subject matter of this paragraph characterizes example 225 of the present disclosure, wherein example 225 also includes the subject matter according to any one of examples 1-224, above.

By having cooling system 234 configured to maintain thermosetting-resin component 110, that is, after first part 253 and second part 255 of thermosetting resin 252 have been applied to non-resin component 108, below a threshold temperature, continuous flexible line 106 may be restricted from curing until it is deposited or at least just prior in time to being deposited.

Referring generally to FIGS. 1 and 2, delivery guide 112 comprises cooling system 234. The preceding subject matter of this paragraph characterizes example 226 of the present disclosure, wherein example 226 also includes the subject matter according to example 225, above.

When delivery guide 112 comprises cooling system 234, thermosetting-resin component 110 may be restricted from being cured prior to continuous flexible line 106 being deposited by delivery guide 112.

Referring generally to FIGS. 1 and 2, the threshold temperature is no greater than 20° C., 15° C., 10° C., 5° C., 0° C., −50° C., −100° C., −150° C., −200° C., −200-−100° C., −100-0° C., −50-5° C., 5-20° C., 5-15° C., or 5-10° C. The preceding subject matter of this paragraph characterizes example 227 of the present disclosure, wherein example 227 also includes the subject matter according to any one of examples 221-226, above.

The threshold temperature associated with system 100 or system 700 and cooling system 234 may be selected based on thermosetting resin 252 being used for thermosetting-resin component 110, and the examples set forth in example 227 are illustrative and non-exclusive. Moreover, the threshold temperature may be selected to prevent curing of thermosetting resin 252 and thus thermosetting-resin component 110 prior to being deposited.

Referring generally to FIGS. 1 and 2 and particularly to, e.g., FIGS. 29 and 30, system 100, 700 further comprises surface 114. The preceding subject matter of this paragraph characterizes example 228 of the present disclosure, wherein example 228 also includes the subject matter according to any one of examples 1-227, above.

Inclusion of surface 114 as part of system 100 or system 700 provides for selective properties and characteristics of surface 114.

Referring generally to FIGS. 1 and 2, surface 114 is configured to be selectively heated. The preceding subject matter of this paragraph characterizes example 229 of the present disclosure, wherein example 229 also includes the subject matter according to example 228, above.

Selective heating of surface 114 may facilitate curing of an initial layer of continuous flexible line 106 being deposited. Additionally or alternatively, selective heating of surface 114, such as at or near the completion of composite part 102, may facilitate removal of composite part 102 from surface 114.

Referring generally to FIGS. 1 and 2, surface 114 comprises vacuum table 115. The preceding subject matter of this paragraph characterizes example 230 of the present disclosure, wherein example 230 also includes the subject matter according to any one of examples 228 or 229, above.

Vacuum table 115 may help to secure composite part 102 to surface 114 while composite part 102 is being manufactured using system 100 or system 700.

Referring generally to FIGS. 1 and 2, delivery guide 112 further comprises guide outlet 206, through which continuous flexible line 106 exits delivery guide 112. Guide outlet 206 is further configured to impart a predetermined texture to continuous flexible line 106 as it exits delivery guide 112. The preceding subject matter of this paragraph characterizes example 231 of the present disclosure, wherein example 231 also includes the subject matter according to any one of examples 1-230, above.

By imparting a texture to continuous flexible line 106 at guide outlet 206 of delivery guide 112, a desired adhesion between layers of continuous flexible line 106 being deposited may be achieved. Moreover, in comparison to other examples disclosed herein, a more efficient packaging of system 100 or system 700 may be achieved, while still providing the desired functionality of applying texture to continuous flexible line 106.

Referring, e.g., to FIGS. 1, 3, 4, 27, and 29 and particularly to FIG. 43, method 400 of additively manufacturing composite part 102 is disclosed. Method 400 comprises (block 402) applying thermosetting resin 252 to non-resin component 108 to create continuous flexible line 106 by pulling non-resin component 108 through first resin-part applicator 236, in which a first quantity of first part 253 of thermosetting resin 252 is applied to non-resin component 108, and by pulling non-resin component 108 through second resin-part applicator 237, in which a second quantity of second part 255 of thermosetting resin 252 is applied to at least a portion of the first quantity of first part 253 of thermosetting resin 252, applied to non-resin component 108. Method 400 further comprises (block 404) routing continuous flexible line 106 into delivery guide 112 and (block 406) depositing, via delivery guide 112, segment 120 of continuous flexible line 106 along print path 122. The preceding subject matter of this paragraph characterizes example 232 of the present disclosure.

Method 400 therefore may be performed to manufacture composite parts 102 from at least a composite material that includes non-resin component 108 and thermosetting resin 252 applied to non-resin component 108. By applying thermosetting resin 252 to non-resin component 108 in two parts, the two parts may be kept separate, such as in liquid form, without curing until after the two parts are brought together by method 400. Moreover, method 400 may be performed to manufacture composite parts 102 with continuous flexible line 106 being oriented in desired and/or predetermined orientations throughout composite part 102, such as to define desired properties of composite part 102.

Method 400 may be performed by system 100.

Referring, e.g., to FIGS. 1, 3, and 29 and particularly to FIG. 43, according to method 400, (block 402) pulling non-resin component 108 through first resin-part applicator 236 comprises (block 408) pulling non-resin component 108 through a first volume of first part 253 of thermosetting resin 252 to apply the first quantity of first part 253 of thermosetting resin 252 to non-resin component 108. The preceding subject matter of this paragraph characterizes example 233 of the present disclosure, wherein example 233 also includes the subject matter according to example 232, above.

By pulling non-resin component 108 through the first volume of first part 253, first part 253 may be applied to non-resin component 108 in an efficient manner, such as without complex resin injection systems required.

Referring, e.g., to FIGS. 1, 4, and 29 and particularly to FIG. 43, according to method 400, (block 402) pulling non-resin component 108 through second resin-part applicator 237 comprises (block 410) pulling non-resin component 108 through a second volume of second part 255 of thermosetting resin 252 to apply the second quantity of second part 255 of thermosetting resin 252 to the first quantity of first part 253 of thermosetting resin 252, applied to non-resin component 108. The preceding subject matter of this paragraph characterizes example 234 of the present disclosure, wherein example 234 also includes the subject matter according to any one of examples 232 or 233, above.

By pulling non-resin component 108 through the second volume of second part 255, second part 255 may be applied to first part 253 already applied to non-resin component 108 in an efficient manner, such as without complex resin injection systems required.

Referring, e.g., to FIG. 1 and particularly to FIG. 43, according to method 400, (block 402) applying thermosetting resin 252 to non-resin component 108 comprises (block 412) actively injecting, by second resin-part applicator 237, a flow of second part 255 of thermosetting resin 252 to apply the second quantity of second part 255 of thermosetting resin 252 to at least the portion of the first quantity of first part 253 of thermosetting resin 252, applied to non-resin component 108. The preceding subject matter of this paragraph characterizes example 235 of the present disclosure, wherein example 235 also includes the subject matter according to any one of examples 232 or 233, above.

By actively injecting a flow of second part 255 to apply second part 255 to first part 253 on non-resin component 108, a desired amount of second part 255 may be applied to non-resin component 108 and first part 253 applied thereto, without first part 253 contaminating a volume of second part 255, such as held in a vessel. Moreover, active injection of second part 255 provides for the optional starting and stopping of the application of second part 255, and thus the starting and stopping of the creation of thermosetting-resin component 110 along non-resin component 108, such as to create desired lengths of non-resin component 108 without a counterpart thermosetting-resin component 110 thereon.

Referring, e.g., to FIG. 1 and particularly to FIG. 43, according to method 400, (block 402) applying thermosetting resin 252 to non-resin component 108 comprises (block 414) dripping or spraying, by first resin-part applicator 236, the first quantity of first part 253 of thermosetting resin 252 onto non-resin component 108. The preceding subject matter of this paragraph characterizes example 236 of the present disclosure, wherein example 236 also includes the subject matter according to any one of examples 232, 233, or 235, above.

By dripping or spraying first part 253 onto non-resin component 108, a desired first quantity of first part 253 may be controlled. Moreover, a more uniform application of first part 253 to non-resin component 108 may result, as opposed to, for example, pulling non-resin component 108 through a volume of first part 253.

Referring, e.g., to FIG. 1 and particularly to FIG. 43, according to method 400, (block 402) applying thermosetting resin 252 to non-resin component 108 comprises (block 416) dripping or spraying, by second resin-part applicator 237, the second quantity of second part 255 of thermosetting resin 252 onto non-resin component 108, with the first quantity of first part 253 of thermosetting resin 252 applied to non-resin component 108. The preceding subject matter of this paragraph characterizes example 237 of the present disclosure, wherein example 237 also includes the subject matter according to any one of examples 232, 233, or 236, above.

By dripping or spraying second part 255 onto non-resin component 108 with first part 253 applied thereto, a desired second quantity of second part 255 may be controlled. Moreover, a more uniform application of second part 255 may result, as opposed to, for example, pulling non-resin component 108 through a volume of second part 255. Also, by dripping or spraying second part 255, a volume of second part 255 is not necessarily contaminated with first part 253, as non-resin component 108 with first part 253 applied thereto is pulled through second resin-part applicator 237.

Referring, e.g., to FIGS. 1, 7, and 8 and particularly to FIG. 43, according to method 400, (block 418) non-resin component 108 comprises one or more of a fiber, a carbon fiber, a glass fiber, a synthetic organic fiber, an aramid fiber, a natural fiber, a wood fiber, a boron fiber, a silicon-carbide fiber, an optical fiber, a fiber bundle, a fiber tow, a fiber weave, a wire, a metal wire, a conductive wire, or a wire bundle. The preceding subject matter of this paragraph characterizes example 238 of the present disclosure, wherein example 238 also includes the subject matter according to any one of examples 232-237, above.

Inclusion of a fiber or fibers in continuous flexible line 106 permits for selecting desired properties of composite part 102. Moreover, selection of specific materials of fibers and/or selection of specific configurations of fibers (e.g., a bundle, a tow, and/or a weave) may permit for precise selection of desired properties of composite part 102. Example properties of composite parts 102 include strength, stiffness, flexibility, ductility, hardness, electrical conductivity, thermal conductivity, etc. Non-resin component 108 is not limited to the identified examples, and other types of non-resin component 108 may be used.

Referring, e.g., to FIGS. 2, 5, 6, 27, and 30 and particularly to FIG. 44, method 500 of additively manufacturing composite part 102 is disclosed. Method 500 comprises (block 502) applying a first quantity of first part 253 of thermosetting resin 252 to first element 271 of non-resin component 108 by pulling first element 271 of non-resin component 108 through first resin-part applicator 236. The method 500 further comprises (block 504) applying a second quantity of second part 255 of thermosetting resin 252 to second element 273 of non-resin component 108 by pulling second element 273 of non-resin component 108 through second resin-part applicator 237. Method 500 also comprises (block 506) combining: first element 271 of non-resin component 108 with the first quantity of first part 253 of thermosetting resin 252, applied to first element 271 of non-resin component 108; and second element 273 of non-resin component 108 with the second quantity of second part 255 of thermosetting resin 252, applied to second element 273 of non-resin component 108, to create continuous flexible line 106. Continuous flexible line 106 comprises non-resin component 108 and thermosetting-resin component 110 that comprises at least some of the first quantity of first part 253 of thermosetting resin 252 and at least some of the second quantity of second part 255 of thermosetting resin 252. Method 500 additionally comprises (block 508) routing continuous flexible line 106 into delivery guide 112 and (block 510) depositing, via delivery guide 112, segment 120 of continuous flexible line 106 along print path 122. The preceding subject matter of this paragraph characterizes example 239 of the present disclosure.

Method 500 therefore may be performed to manufacture composite parts 102 from at least a composite material that includes non-resin component 108 and thermosetting resin 252 applied to non-resin component 108. By applying thermosetting resin 252 to two separate parts of non-resin component 108, that is, by applying first part 253 to first element 271 and applying second part 255 to second element 273, the two parts may be kept separate, such as in liquid form, without curing until after the two parts are brought together by method 500. Moreover, first element 271 and/or second element 273 may be selected to result in desired properties for composite part 102. In addition, method 500 may be performed to manufacture composite parts 102 with continuous flexible line 106 being oriented in desired and/or predetermined orientations throughout composite part 102, such as to define desired properties of composite part 102.

Method 500 may be performed by system 700.

Referring, e.g., to FIGS. 2, 5, and 30 and particularly to FIG. 44, according to method 500, (block 502) pulling first element 271 of non-resin component 108 through first resin-part applicator 236 comprises (block 512) pulling first element 271 of non-resin component 108 through a first volume of first part 253 of thermosetting resin 252 to apply the first quantity of first part 253 of thermosetting resin 252 to first element 271 of non-resin component 108. The preceding subject matter of this paragraph characterizes example 240 of the present disclosure, wherein example 240 also includes the subject matter according to example 239, above.

By pulling first element 271 through the first volume of first part 253, first part 253 may be applied to first element 271 in an efficient manner, such as without complex resin injection systems required.

Referring, e.g., to FIGS. 2, 6, and 30 and particularly to FIG. 44, according to method 500, (block 504) pulling second element 273 of non-resin component 108 through second resin-part applicator 237 comprises (block 514) pulling second element 273 of non-resin component 108 through a second volume of second part 255 of thermosetting resin 252 to apply the second quantity of second part 255 of thermosetting resin 252 to second element 273 of non-resin component 108. The preceding subject matter of this paragraph characterizes example 241 of the present disclosure, wherein example 241 also includes the subject matter according to any one of examples 239 or 240, above.

By pulling second element 273 through the second volume of second part 255, second part 255 may be applied to second element 273 in an efficient manner, such as without complex resin injection systems required.

Referring, e.g., to FIG. 2 and particularly to FIG. 44, according to method 500, (block 502) applying the first quantity of first part 253 of thermosetting resin 252 to first element 271 of non-resin component 108 comprises (block 516) dripping or spraying, by first resin-part applicator 236, the first quantity of first part 253 of thermosetting resin 252 onto first element 271 of non-resin component 108. The preceding subject matter of this paragraph characterizes example 242 of the present disclosure, wherein example 242 also includes the subject matter according to any one of examples 239 or 241, above.

By dripping or spraying first part 253 onto first element 271, a desired first quantity of first part 253 may be controlled. Moreover, a more uniform application of first part 253 to first element 271 may result, as opposed to, for example, pulling first element 271 through a volume of first part 253.

Referring, e.g., to FIG. 2 and particularly to FIG. 44, according to method 500, (block 504) applying the second quantity of second part 255 of thermosetting resin 252 to second element 273 of non-resin component 108 comprises (block 518) dripping or spraying, by second resin-part applicator 237, the second quantity of second part 255 of thermosetting resin 252 onto second element 273 of non-resin component 108. The preceding subject matter of this paragraph characterizes example 243 of the present disclosure, wherein example 243 also includes the subject matter according to any one of examples 239, 240, or 242, above.

By dripping or spraying second part 255 onto second element 273, a desired second quantity of second part 255 may be controlled. Moreover, a more uniform application of second part 255 may result, as opposed to, for example, pulling second element 273 through a volume of second part 255.

Referring, e.g., to FIGS. 2 and 9-12 and particularly to FIG. 44, according to method 500, (block 520) first element 271 of non-resin component 108 and second element 273 of non-resin component 108 each comprises one or more of a fiber, a carbon fiber, a glass fiber, a synthetic organic fiber, an aramid fiber, a natural fiber, a wood fiber, a boron fiber, a silicon-carbide fiber, an optical fiber, a fiber bundle, a fiber tow, a fiber weave, a wire, a metal wire, a conductive wire, or a wire bundle. The preceding subject matter of this paragraph characterizes example 244 of the present disclosure, wherein example 244 also includes the subject matter according to any one of examples 239-243, above.

Inclusion of a fiber or fibers in continuous flexible line 106 permits for selecting desired properties of composite part 102. Moreover, selection of specific materials of fibers and/or selection of specific configurations of fibers (e.g., a bundle, a tow, and/or a weave) may permit for precise selection of desired properties of composite part 102. Example properties of composite parts 102 include strength, stiffness, flexibility, ductility, hardness, electrical conductivity, thermal conductivity, etc. Non-resin component 108 is not limited to the identified examples, and other types of non-resin component 108 may be used.

Referring, e.g., to FIG. 2 and particularly to FIG. 44, method 500 further comprises (block 522) separating tow 612 into first element 271 of non-resin component 108 and second element 273 of non-resin component 108 upstream of first resin-part applicator 236 and second resin-part applicator 237. The preceding subject matter of this paragraph characterizes example 245 of the present disclosure, wherein example 245 also includes the subject matter according to any one of examples 239-244, above.

Separating tow 612 into first element 271 and second element 273 permits for the creation of first element 271 and second element 272 from tow 612. In some applications, it may be less expensive to source a tow of fibers that may be split into first element 271 and second element 273 than to source two separate origins of fibers, such as in the form of first element 271 and second element 273.

Referring, e.g., to FIGS. 1, 2, 13-15, 19, 26, and 31-36 and particularly to FIGS. 43 and 44, method 400, 500 further comprises, (blocks 424, 524) while advancing continuous flexible line 106 toward print path 122, delivering a predetermined or actively determined amount of curing energy 118 at least to portion 124 of segment 120 of continuous flexible line 106 at a controlled rate after segment 120 of continuous flexible line 106 is deposited along print path 122 to at least partially cure at least portion 124 of segment 120 of continuous flexible line 106. The preceding subject matter of this paragraph characterizes example 246 of the present disclosure, wherein example 246 also includes the subject matter according to any one of examples 232-245, above.

By delivering a predetermined or actively determined amount of curing energy 118 to portion 124, continuous flexible line 106, and thus composite part 102, is at least partially cured while composite part 102 is being manufactured, or in situ. As a result of delivering a predetermined or actively determined amount of curing energy 118 at a controlled rate, a desired level, or degree, of cure may be established with respect to portion 124 of segment 120 at any given time during manufacture of composite part 102. For example, as discussed herein, in some examples, it may be desirable to cure one portion 124 greater than or less than another portion 124 during manufacture of composite part 102.

Referring, e.g., to FIGS. 1, 2, and 13 and particularly to FIGS. 43 and 44, according to method 400, 500, (blocks 424, 524) delivering the predetermined or actively determined amount of curing energy 118 at least to portion 124 of segment 120 of continuous flexible line 106 at the controlled rate comprises (block 426, 526) partially curing first layer 140 of segment 120 of continuous flexible line 106 as first layer 140 is being deposited and further curing first layer 140 as second layer 142 is being deposited against first layer 140. The preceding subject matter of this paragraph characterizes example 247 of the present disclosure, wherein example 247 also includes the subject matter according to example 246, above.

By only partially curing first layer 140 as first layer 140 is being deposited, first layer 140 may remain tacky, or sticky, thereby facilitating adhesion of second layer 142 against first layer 140 as second layer 142 is deposited against first layer 140. Then, first layer 140 is further cured as second layer 142 is being partially cured for deposition of a subsequent layer against second layer 142, and so forth.

Referring, e.g., to FIGS. 1, 2, and 13 and particularly to FIGS. 43 and 44, according to method 400, 500, (blocks 424, 524) delivering the predetermined or actively determined amount of curing energy 118 at least to portion 124 of segment 120 of continuous flexible line 106 at the controlled rate comprises (block 428, 528) partially curing first layer 140 of segment 120 of continuous flexible line 106 as first layer 140 is being deposited and fully curing first layer 140 as second layer 142 is being deposited against first layer 140. The preceding subject matter of this paragraph characterizes example 248 of the present disclosure, wherein example 248 also includes the subject matter according to any one of examples 246 or 247, above.

Again, by only partially curing first layer 140 as first layer 140 is being deposited, first layer 140 may remain tacky, or sticky, thereby facilitating adhesion of second layer 142 against first layer 140 as second layer 142 is deposited against first layer 140. However, according to this example 248, first layer 140 is fully cured as second layer 142 is being partially cured.

Referring, e.g., to FIGS. 1 and 2 and particularly to FIGS. 43 and 44, according to method 400, 500, (blocks 424, 524) delivering the predetermined or actively determined amount of curing energy 118 at least to portion 124 of segment 120 of continuous flexible line 106 at the controlled rate comprises (blocks 430, 530) curing less than an entirety of composite part 102. The preceding subject matter of this paragraph characterizes example 249 of the present disclosure, wherein example 249 also includes the subject matter according to any one of examples 246-248, above.

In some applications, a less cured portion may be desirable so that it may be subsequently worked on by a subsequent process, such as to remove material and/or add a structural or other component to composite part 102.

Referring, e.g., to FIGS. 1 and 2 and particularly to FIGS. 43 and 44, method 400, 500 further comprises (blocks 432, 532) restrictively curing at least a portion of composite part 102. The preceding subject matter of this paragraph characterizes example 250 of the present disclosure, wherein example 250 also includes the subject matter according to any one of examples 246-249, above.

Again, in some applications, a less cured portion may be desirable so that it may be subsequently worked on by a subsequent process, such as to remove material and/or add a structural or other component to composite part 102, and a less cured portion may result from restriction of the curing process.

Referring, e.g., to FIGS. 1 and 2 and particularly to FIGS. 43 and 44, according to method 400, 500, (blocks 434, 534) the portion of composite part 102 is restrictively cured to facilitate subsequent processing of the portion. The preceding subject matter of this paragraph characterizes example 251 of the present disclosure, wherein example 251 also includes the subject matter according to example 250, above.

Subsequent processing on composite part 102 may be desirable, such as to remove material and/or add a structural or other component to composite part 102.

Referring, e.g., to FIGS. 1 and 2 and particularly to FIGS. 43 and 44, according to method 400, 500, (blocks 424, 524) delivering the predetermined or actively determined amount of curing energy 118 at least to portion 124 of segment 120 of continuous flexible line 106 at the controlled rate comprises (blocks 436, 536) selectively varying at least one of a delivery rate or a delivery duration of curing energy 118 to impart varying physical characteristics to composite part 102. The preceding subject matter of this paragraph characterizes example 252 of the present disclosure, wherein example 252 also includes the subject matter according to any one of examples 246-251, above.

By imparting varying physical characteristics of composite part 102, a customized composite part 102 may be manufactured with sub-parts having desirable properties that are different from other sub-parts.

Referring to FIGS. 43 and 44, according to method 400, 500, (blocks 438, 538) the varying physical characteristics comprise at least one of strength, stiffness, flexibility, ductility, or hardness. The preceding subject matter of this paragraph characterizes example 253 of the present disclosure, wherein example 253 also includes the subject matter according to example 252, above.

Each of these physical characteristics may be selected for a particular purpose. For example, in composite part 102 that when in use receives a significant torque on a sub-part thereof compared to the remainder of composite part 102, it may be desirable to have such sub-part less stiff and/or more flexible than other parts of composite part 102. Additionally, it may be desirable to build more strength into a sub-part than other parts of composite part 102 for various reasons depending on a specific application of composite part 102.

Referring, e.g., to FIGS. 1 and 2 and particularly to FIGS. 43 and 44, method 400, 500 further comprises (blocks 440, 540), simultaneously with delivering the predetermined or actively determined amount of curing energy 118 at least to portion 124 of segment 120 of continuous flexible line 106 at the controlled rate, at least partially protecting at least portion 124 of segment 120 of continuous flexible line 106 from environmental exposure after segment 120 exits delivery guide 112. The preceding subject matter of this paragraph characterizes example 254 of the present disclosure, wherein example 254 also includes the subject matter according to any one of examples 246-253, above.

Protecting portion 124 from environmental exposures, such as oxidation, may facilitate the subsequent and/or simultaneous curing of portion 124.

Referring, e.g., to FIGS. 1 and 2 and particularly to FIGS. 43 and 44, according to method 400, 500, (blocks 442, 542) at least portion 124 of segment 120 of continuous flexible line 106 is at least partially protected from the environmental exposure with shielding gas 221. The preceding subject matter of this paragraph characterizes example 255 of the present disclosure, wherein example 255 also includes the subject matter according to example 254, above.

Again, protecting portion 124 from environmental exposure may facilitate the subsequent and/or simultaneous curing of portion 124.

Referring to FIGS. 43 and 44, according to method 400, 500, (blocks 444, 544) at least one of depositing segment 120 of continuous flexible line 106 along print path 122 or delivering the predetermined or actively determined amount of curing energy 118 at least to portion 124 of segment 120 of continuous flexible line 106 at the controlled rate provides different physical characteristics at different locations of composite part 102. The preceding subject matter of this paragraph characterizes example 256 of the present disclosure, wherein example 256 also includes the subject matter according to any one of examples 246-255, above.

By imparting varying physical characteristics at different locations of composite part 102, a customized composite part 102 may be manufactured with sub-parts having desirable properties that are different from other sub-parts.

Referring to FIGS. 43 and 44, according to method 400, 500, (blocks 446, 546) the physical characteristics comprise at least one of strength, stiffness, flexibility, ductility, or hardness. The preceding subject matter of this paragraph characterizes example 257 of the present disclosure, wherein example 257 also includes the subject matter according to example 256, above.

Each of these physical characteristics may be selected for a particular purpose. For example, in composite part 102 that when in use receives a significant torque on a sub-part thereof compared to the remainder of composite part 102, it may be desirable to have such sub-part less stiff and/or more flexible than other parts of composite part 102. Additionally, it may be desirable to build more strength into a sub-part than other parts of composite part 102 for various reasons depending on a specific application of composite part 102.

Referring, e.g., to FIGS. 1 and 2 and particularly to FIGS. 43 and 44, method 400, 500 further comprises (blocks 448, 548) maintaining thermosetting resin 252 below a threshold temperature at least prior to applying thermosetting resin 252 to non-resin component 108. The preceding subject matter of this paragraph characterizes example 258 of the present disclosure, wherein example 258 also includes the subject matter according to any one of examples 232-257, above.

Maintaining thermosetting resin 252 below a threshold temperature prior to being applied to non-resin component 108 restricts curing of thermosetting-resin component 110 before continuous flexible line 106 is deposited.

Referring, e.g., to FIGS. 1 and 2 and particularly to FIGS. 43 and 44, method 400, 500 further comprises (blocks 450, 550) maintaining thermosetting-resin component 110 below a threshold temperature prior to depositing segment 120 of continuous flexible line 106 along print path 122. The preceding subject matter of this paragraph characterizes example 259 of the present disclosure, wherein example 259 also includes the subject matter according to any one of examples 232-258, above.

Maintaining thermosetting-resin component 110 below a threshold temperature prior to continuous flexible line 106 being deposited restricts curing of thermosetting-resin component 110.

Referring to FIGS. 43 and 44, according to method 400, 500, (blocks 452, 552) the threshold temperature is no greater than 20° C., 15° C., 10° C., 5° C., 0° C., −50° C., −100° C., −150° C., −200° C., −200−−100° C., −100-0° C., −50-5° C., 5-20° C., 5-15° C., or 5-10° C. The preceding subject matter of this paragraph characterizes example 260 of the present disclosure, wherein example 260 also includes the subject matter according to any one of examples 258 or 259, above.

The threshold temperature associated with method 400 or method 500 may be selected based on thermosetting resin 252 being used, and the examples set forth in example 260 are illustrative and non-exclusive.

Referring, e.g., to FIGS. 1, 2, and 13 and particularly to FIGS. 43 and 44, according to method 400, 500, (blocks 406, 510) depositing segment 120 of continuous flexible line 106 along print path 122 comprises (blocks 454, 554) layering continuous flexible line 106 against itself to additively manufacture composite part 102. The preceding subject matter of this paragraph characterizes example 261 of the present disclosure, wherein example 261 also includes the subject matter according to any one of examples 232-260, above.

By layering continuous flexible line 106 against itself or a previously deposited segment 120, a three-dimensional composite part 102 may be manufactured by performing method 400 or method 500.

Referring, e.g., to FIGS. 1 and 2 and particularly to FIGS. 43 and 44, according to method 400, 500, (blocks 406, 510) depositing segment 120 of continuous flexible line 106 along print path 122 comprises (blocks 456, 556) depositing continuous flexible line 106 in a predetermined pattern to selectively control one or more physical characteristics of composite part 102. The preceding subject matter of this paragraph characterizes example 262 of the present disclosure, wherein example 262 also includes the subject matter according to any one of examples 232-261, above.

By controlling one or more physical characteristics of composite part 102, less overall material may be used and/or the size of a specific part may be reduced when compared to a similar part manufactured by a traditional composite layup method.

For example, in contrast to composite parts constructed from multiple layers of planar plies of composite material, composite part 102 may be manufactured so that the orientation of continuous flexible line 106, and thus of non-resin component 108, results in desired properties. As an example, if a part includes holes, continuous flexible line 106 may be arranged generally in concentric circles or spiral around the holes, resulting in no or few interruptions to continuous flexible line 106 at the boundary of the holes. As a result, the strength and integrity of the composite part may be significantly greater around the hole than a similar part constructed by traditional composite layup methods. In addition the composite part may be less subject to cracks and propagation thereof at the boundary of the holes. Moreover, because of the desired properties around the holes, the overall thickness, volume, and/or mass of the composite part may be reduced while achieving the desired properties, when compared to a similar part constructed by traditional composite layup methods.

Referring to FIGS. 43 and 44, according to method 400, 500, (blocks 458, 558) the physical characteristics comprise at least one of strength, stiffness, flexibility, ductility, or hardness. The preceding subject matter of this paragraph characterizes example 263 of the present disclosure, wherein example 263 also includes the subject matter according to any one of examples 261 or 262, above.

Each of these physical characteristics may be selected for a particular purpose. For example, in a composite part that when in use receives a significant torque on a sub-part thereof compared to the remainder of the composite part, it may be desirable to have such sub-part less stiff and/or more flexible than other portions of the composite part. Additionally, it may be desirable to build more strength into a sub-part than other portions of composite part 102 for various reasons depending on a specific application of composite part 102.

Referring, e.g., to FIGS. 1, 2, 17-21, 31, and 33 and particularly to FIGS. 43 and 44, method 400, 500 further comprises (blocks 460, 560), simultaneously with depositing segment 120 of continuous flexible line 106 along print path 122, compacting at least section 180 of segment 120 of continuous flexible line 106 after segment 120 of continuous flexible line 106 is deposited along print path 122. The preceding subject matter of this paragraph characterizes example 264 of the present disclosure, wherein example 264 also includes the subject matter according to any one of examples 232-263, above.

Compaction of section 180 of continuous flexible line 106 during performance of method 400 or method 500 facilitates adherence between adjacent layers of continuous flexible line 106 being deposited during performance of method 400 or method 500.

Referring, e.g., to FIG. 18 and particularly to FIGS. 43 and 44, according to method 400, 500, (blocks 460, 560) compacting at least section 180 of segment 120 of continuous flexible line 106 after segment 120 of continuous flexible line 106 is deposited along print path 122 comprises (blocks 462,562) imparting a desired cross-sectional shape to segment 120 of continuous flexible line 106. The preceding subject matter of this paragraph characterizes example 265 of the present disclosure, wherein example 265 also includes the subject matter according to example 264, above.

It may be desirable, in some applications, to impart a predetermined cross-sectional shape to continuous flexible line 106 as it is being deposited.

Referring, e.g., to FIGS. 1, 2, 17-21, 31, and 33 and particularly to FIGS. 43 and 44, according to method 400, 500, (blocks 460, 560) compacting at least section 180 of segment 120 of continuous flexible line 106 after segment 120 of continuous flexible line 106 is deposited along print path 122 comprises (blocks 464, 564) heating section 180 of segment 120 of continuous flexible line 106 to at least partially cure at least section 180 of segment 120 of continuous flexible line 106. The preceding subject matter of this paragraph characterizes example 266 of the present disclosure, wherein example 266 also includes the subject matter according to any one of examples 264 or 265, above.

Having compaction also deliver heat to continuous flexible line 106 efficiently cures continuous flexible line 106.

Referring, e.g., to FIGS. 1, 2, and 31 and particularly to FIGS. 43 and 44, method 400, 500 further comprises (blocks 466, 566), simultaneously with depositing segment 120 of continuous flexible line 106 along print path 122, roughening at least section 194 of segment 120 of continuous flexible line 106 after segment 120 of continuous flexible line 106 is deposited along print path 122. The preceding subject matter of this paragraph characterizes example 267 of the present disclosure, wherein example 267 also includes the subject matter according to any one of examples 232-266, above.

Roughening section 194 of continuous flexible line 106 increases the surface area thereof and aids in adhesion of a subsequent layer of continuous flexible line 106 deposited against it during performance of method 400 or method 500.

Referring, e.g., to FIGS. 1, 2, and 31 and particularly to FIGS. 43 and 44, method 400, 500 further comprises (blocks 468, 568), simultaneously with roughening at least section 194 of segment 120 of continuous flexible line 106, collecting debris resulting from roughening at least section 194 of segment 120 of continuous flexible line 106. The preceding subject matter of this paragraph characterizes example 268 of the present disclosure, wherein example 268 also includes the subject matter according to example 267, above.

Collection of debris that results from roughening section 194 avoids unwanted, loose particles of thermosetting-resin component 110 becoming trapped between adjacent deposited layers of continuous flexible line 106 that may otherwise result in unwanted properties of composite part 102.

Referring, e.g., to FIGS. 1, 2, and 31 and particularly to FIGS. 43 and 44, method 400, 500 further comprises (blocks 470, 570), simultaneously with roughening at least section 194 of segment 120 of continuous flexible line 106, dispersing debris resulting from roughening at least section 194 of segment 120 of continuous flexible line 106. The preceding subject matter of this paragraph characterizes example 269 of the present disclosure, wherein example 269 also includes the subject matter according to any one of examples 267 or 268, above.

Dispersal of debris that results from roughening section 194 avoids unwanted, loose particles of thermosetting-resin component 110 becoming trapped between adjacent deposited layers of continuous flexible line 106 that may otherwise result in unwanted properties of composite part 102.

Referring, e.g., to FIGS. 1, 2, and 31 and particularly to FIGS. 43 and 44, according to method 400, 500, (blocks 466, 566) roughening at least section 194 of segment 120 of continuous flexible line 106 after segment 120 of continuous flexible line 106 is deposited along print path 122 comprises (blocks 472, 572) heating section 194 of segment 120 of continuous flexible line 106 to at least partially cure at least section 194 of segment 120 of continuous flexible line 106. The preceding subject matter of this paragraph characterizes example 270 of the present disclosure, wherein example 270 also includes the subject matter according to any one of examples 267-269, above.

Having the roughening also deliver heat to continuous flexible line 106 efficiently cures continuous flexible line 106.

Referring, e.g., to FIGS. 1, 2, 22-25, 31, 40, and 41 and particularly to FIGS. 43 and 44, method 400, 500 further comprises (blocks 474, 574) selectively cutting continuous flexible line 106. The preceding subject matter of this paragraph characterizes example 271 of the present disclosure, wherein example 271 also includes the subject matter according to any one of examples 232-270, above.

Selective cutting of continuous flexible line 106 during performance of method 400 or method 500 permits for the stopping and starting of continuous flexible line 106 in different locations on composite part 102.

Referring, e.g., to FIGS. 1, 2, 22-25, 31, 40, and 41 and particularly to FIGS. 43 and 44, according to method 400, 500, (blocks 476, 576) continuous flexible line 106 is selectively cut simultaneously with depositing segment 120 of continuous flexible line 106 along print path 122. The preceding subject matter of this paragraph characterizes example 272 of the present disclosure, wherein example 272 also includes the subject matter according to example 271, above.

Simultaneous cutting and delivering of continuous flexible line 106 provides for controlled deposition of continuous flexible line 106 along print path 122.

Referring, e.g., to FIGS. 1 and 2 and particularly to FIGS. 43 and 44, method 400, 500 further comprises (blocks 478, 578), simultaneously with depositing segment 120 of continuous flexible line 106 along print path 122, detecting defects in composite part 102. The preceding subject matter of this paragraph characterizes example 273 of the present disclosure, wherein example 273 also includes the subject matter according to any one of examples 232-272, above.

Detection of defects in segment 120 permits for selective scrapping of composite parts 102 having defects prior to completion of composite parts 102. Accordingly, less material may be wasted. Moreover, defects that otherwise would be hidden from view by various types of defect detectors may be detected prior to a subsequent layer of continuous flexible line 106 obscuring, or hiding, the defect from view.

Referring, e.g., to FIGS. 1 and 2 and particularly to FIGS. 43 and 44, according to method 400, 500, (blocks 406, 510) depositing segment 120 of continuous flexible line 106 along print path 122 comprises (blocks 480, 580) depositing at least a portion of segment 120 of continuous flexible line 106 over one or more sacrificial layers. The preceding subject matter of this paragraph characterizes example 274 of the present disclosure, wherein example 274 also includes the subject matter according to any one of examples 232-273, above.

Use of sacrificial layers may permit for deposition of an initial layer of continuous flexible line 106 in midair without requiring an outer mold, surface 114, or other rigid structure for initial deposition of the initial layer. That is, a sacrificial layer may become an outer mold for subsequent deposition of layers that are not sacrificial. Additionally or alternatively, a sacrificial layer may be deposited within an internal volume of composite part 102, such as to facilitate the formation of a void within composite part 102, with the sacrificial layer remaining within the void or with the sacrificial layer subsequently being removed or otherwise disintegrated, for example, so that it does not impact the structural integrity of composite part 102.

Referring, e.g., to FIGS. 1 and 2 and particularly to FIGS. 43 and 44, method 400, 500 further comprises (blocks 482, 582) removing the one or more sacrificial layers to form composite part 102. The preceding subject matter of this paragraph characterizes example 275 of the present disclosure, wherein example 275 also includes the subject matter according to example 274, above.

Removal of the sacrificial layer(s) results in composite part 102 being in a desired state, which may be a completed state or may be a state that is subsequently operated on by processes after completion of method 400 or method 500.

Referring, e.g., to FIGS. 1 and 2 and particularly to FIGS. 43 and 44, method 400, 500 further comprises (blocks 484, 584) depositing segment 120A of continuous flexible line 106A along print path 122. The preceding subject matter of this paragraph characterizes example 276 of the present disclosure, wherein example 276 also includes the subject matter according to any one of examples 232-275, above.

In other words, different configurations of continuous flexible line 106 may be used during performance of method 400 or method 500.

For example, different properties of different continuous flexible lines 106 may be selected for different sub-parts of composite part 102. As an example, continuous flexible line 106 may comprise non-resin component 108 that comprises carbon fiber for a significant portion of composite part 102, but continuous flexible line 106 may comprise non-resin component 108 that comprises copper wiring for another portion to define an integral electrical path for connection to an electrical component. Additionally or alternatively, a different non-resin component 108 may be selected for an outer surface of composite part 102 than non-resin component 108 selected for internal portions of composite part 102. Similarly, various first elements 271 and/or second elements 273 may be selected to result in desired properties at desired locations within composite part 102. Various other examples also are within the scope of example 276.

Referring, e.g., to FIGS. 1 and 2 and particularly to FIGS. 43 and 44, according to method 400, 500, (blocks 486, 586) continuous flexible line 106A differs from continuous flexible line 106 in at least one of non-resin component 108 or thermosetting-resin component 110. The preceding subject matter of this paragraph characterizes example 277 of the present disclosure, wherein example 277 also includes the subject matter according to example 276, above.

Varying non-resin component 108 and/or thermosetting resin component 110 during performance of method 400 permits for customized composite parts 102 to be manufactured with varying and desired properties throughout composite part 102.

Referring, e.g., to FIGS. 1, 2, 27, and 31-39 and particularly to FIGS. 43 and 44, according to method 400, 500, (blocks 406, 510) depositing segment 120 of continuous flexible line 106 along print path 122 comprises (blocks 488, 588) pushing continuous flexible line 106 through delivery guide 112. The preceding subject matter of this paragraph characterizes example 278 of the present disclosure, wherein example 278 also includes the subject matter according to any one of examples 232-277, above.

By pushing continuous flexible line 106 through delivery guide 112, delivery guide 112 may be positioned downstream of the source of motive force that pushes continuous flexible line 106, such as feed mechanism 104 herein. As a result, such source of motive force does not interfere with deposition of continuous flexible line 106, and delivery guide 112 may be more easily manipulated in complex three-dimensional patterns during performance of method 400 or method 500.

Referring, e.g., to FIGS. 1 and 2 and particularly to FIGS. 43 and 44, according to method 400, 500, (blocks 406, 510) depositing segment 120 of continuous flexible line 106 along print path 122 comprises (blocks 490, 590) pulling continuous flexible line 106 through delivery guide 112. The preceding subject matter of this paragraph characterizes example 279 of the present disclosure, wherein example 279 also includes the subject matter according to any one of examples 232-277, above.

In some applications, the movement of delivery guide 112 relative to surface 114 may operate to pull continuous flexible line 106 out of delivery guide 112 without, for example, feed mechanism 104 needing to continuously and operatively push continuous flexible line 106 out of delivery guide 112. Such an operation may be desirable, for example, to restrict undesirable bunching, or kinking, of continuous flexible line 106 within delivery guide 112.

Referring to FIGS. 43 and 44, method 400, 500 further comprises (blocks 492, 592) curing composite part 102 in an autoclave or in an oven. The preceding subject matter of this paragraph characterizes example 280 of the present disclosure, wherein example 280 also includes the subject matter according to any one of examples 232-279, above.

In some applications, it may be desirable to not fully cure composite part, in situ, that is, when continuous flexible line 106 is being deposited to form composite part 102. For example, as discussed, in some applications, it may be desirable to not fully cure composite part, in situ, to permit for subsequent work on composite part 102. In such applications, following the subsequent work, a full cure may be achieved in an autoclave or oven.

Referring, e.g., to FIGS. 1 and 2 and particularly to FIGS. 43 and 44, according to method 400, 500, (blocks 494, 594) depositing segment 120 of continuous flexible line 106 along print path 122 is performed within chamber 258 that is one of positively pressurized or negatively pressurized relative to atmospheric pressure. The preceding subject matter of this paragraph characterizes example 281 of the present disclosure, wherein example 281 also includes the subject matter according to any one of examples 232-280, above.

Depending on the configuration of composite part 102 being manufactured, it may be desirable to increase and/or decrease the pressure within chamber 258 during curing to obtain desirable properties of composite part 102.

Chamber 258 may be described as, or as comprising or as being comprised by, an autoclave.

Referring, e.g., to FIGS. 1 and 2 and particularly to FIGS. 43 and 44, according to method 400, 500, (blocks 406, 510) depositing segment 120 of continuous flexible line 106 along print path 122 comprises (blocks 496, 596) initially depositing segment 120 of continuous flexible line 106 against surface 114. The preceding subject matter of this paragraph characterizes example 282 of the present disclosure, wherein example 282 also includes the subject matter according to any one of examples 232-281, above.

Surface 114 therefore provides at least an initial deposition surface, against which continuous flexible line 106 may be deposited. However, subsequent layers of continuous flexible line 106 may be deposited against previously deposited layers of continuous flexible line 106, with surface 114 ultimately providing the structural support for composite part 102 and optionally compaction thereof.

Referring, e.g., to FIGS. 1 and 2 and particularly to FIGS. 43 and 44, method 400, 500 further comprises (blocks 498, 598) heating surface 114. The preceding subject matter of this paragraph characterizes example 283 of the present disclosure, wherein example 283 also includes the subject matter according to example 282, above.

Selective heating of surface 114 may facilitate curing of an initial layer of continuous flexible line 106 being deposited. Additionally or alternatively, selective heating of surface 114, such as at or near the completion of composite part 102, may facilitate removal of composite part 102 from surface 114.

Referring, e.g., to FIGS. 1 and 2 and particularly to FIGS. 43 and 44, method 400, 500 further comprises (blocks 499, 599) applying a vacuum to surface 114. The preceding subject matter of this paragraph characterizes example 284 of the present disclosure, wherein example 284 also includes the subject matter according to any one of examples 282 or 283, above.

Applying a vacuum to surface 114 secures composite part 102 to surface 114 while composite part 102 is being manufactured by method 400 or method 500.

Referring, e.g., to FIGS. 1 and 2 and particularly to FIGS. 43 and 44, according to method 400, 500, (blocks 497, 597) surface 114 comprises removable gasket 105. The preceding subject matter of this paragraph characterizes example 285 of the present disclosure, wherein example 285 also includes the subject matter according to any one of examples 282-284, above.

Removable gasket 105 may be used, for example, when surface 114 has a vacuum applied thereto, to define an area within which composite part 102 is being built on surface 114.

Referring, e.g., to FIGS. 1 and 2 and particularly to FIGS. 43 and 44, method 400, 500 further comprises (blocks 495, 595) texturing continuous flexible line 106 as continuous flexible line 106 is being deposited. The preceding subject matter of this paragraph characterizes example 286 of the present disclosure, wherein example 286 also includes the subject matter according to any one of examples 232-285, above.

By texturing continuous flexible line 106 as it is being deposited, adhesion between adjacent layers of continuous flexible line may be achieved.

Examples of the present disclosure may be described in the context of aircraft manufacturing and service method 1100 as shown in FIG. 45 and aircraft 1102 as shown in FIG. 46. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator e.g., a customer. For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 46, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus (es), method(s), or combination thereof may be utilized during production stages (blocks 1108 and 1110), for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Additional examples of apparatuses and methods are disclosed in U.S. patent application Ser. Nos. 14/841,423, 14/841,470, 14/920,748, 14/931,573, and 14/995,507, the disclosures of which are incorporated herein by reference.

Different examples of the apparatus(es) and method(s) disclosed and incorporated herein include a variety of components, features, and functionalities. It should be understood that the various examples of the apparatus(es) and method(s) disclosed and incorporated herein may include any of the components, features, and functionalities of any of the other examples of the apparatus(es) and method(s) disclosed and incorporated herein in any combination, and all of such possibilities are intended to be within the scope of the present disclosure.

Many modifications of examples set forth and incorporated herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method of additively manufacturing a composite part, the method comprising:
  applying a thermosetting resin to a non-resin component to create a continuous flexible line, comprising the non-resin component and a thermosetting-resin component, by pulling, using a feed mechanism, the non-resin component through a first resin-part applicator, in which a first quantity of a first part of the thermosetting resin is applied to the non-resin component, and by pulling the non-resin component through a second resin-part applicator, in which a second quantity of a second part of the thermosetting resin is applied to at least a portion of the first quantity of the first part of the thermosetting resin, applied to the non-resin component, to create the thermosetting-resin component that comprises at least some of the first quantity of the first part of the thermosetting resin and at least some of the second quantity of the second part of the thermosetting resin, and wherein the feed mechanism comprises opposing rollers and a scraper in contact with at least one of the opposing rollers;
  routing the continuous flexible line into a delivery guide;
  depositing, via the delivery guide, a segment of the continuous flexible line along a print path;
  removing, using the scraper, residue of the thermosetting-resin component, produced by the engagement between the opposing rollers and the continuous flexible line as the opposing rollers rotate to translate the continuous flexible line to push the continuous flexible line through the delivery guide; and
  collecting, into a collection reservoir, the residue of the thermosetting-resin component, removed by the scraper.

2. The method according to claim 1, wherein:
  the delivery guide comprises a guide line passage through which the continuous flexible line is delivered to the print path;
  the guide line passage of the delivery guide has an inlet;
  the feed mechanism is configured to push the continuous flexible line through the guide line passage;
  the opposing rollers have respective rotational axes;
  the delivery guide further comprises a first end portion, a second end portion, and a junction between the first end portion and the second end portion;
  the first end portion is shaped to be complementary to one of the opposing rollers and the second end portion is shaped to be complementary to another of the opposing rollers; and
  a shortest distance (D) between the junction and a plane, containing the respective rotational axes of the opposing rollers, is less than a radius of a smallest one of the opposing rollers.

3. The method according to claim 2, wherein the junction comprises an edge.

4. The method according to claim 1, wherein pulling the non-resin component through the first resin-part applicator comprises pulling the non-resin component through a first volume of the first part of the thermosetting resin to apply the first quantity of the first part of the thermosetting resin to the non-resin component.

5. The method according to claim 4, wherein pulling the non-resin component through the second resin-part applicator comprises pulling the non-resin component through a second volume of the second part of the thermosetting resin to apply the second quantity of the second part of the thermosetting resin to the first quantity of the first part of the thermosetting resin, applied to the non-resin component.

6. The method according to claim 4, wherein applying the thermosetting resin to the non-resin component comprises actively injecting, by the second resin-part applicator, a flow of the second part of the thermosetting resin to apply the second quantity of the second part of the thermosetting resin to at least the portion of the first quantity of the first part of the thermosetting resin, applied to the non-resin component.

7. The method according to claim 4, wherein applying the thermosetting resin to the non-resin component comprises dripping or spraying, by the second resin-part applicator, the second quantity of the second part of the thermosetting resin onto the non-resin component with the first quantity of the first part of the thermosetting resin applied to the non-resin component.

8. The method according to claim 1, wherein applying the thermosetting resin to the non-resin component comprises dripping or spraying, by the first resin-part applicator, the first quantity of the first part of the thermosetting resin onto the non-resin component.

9. The method according to claim 1, further comprising, while advancing the continuous flexible line toward the print path, delivering a predetermined or actively determined amount of curing energy at least to a portion of the segment of the continuous flexible line at a controlled rate after the segment of the continuous flexible line is deposited along the print path to at least partially cure at least the portion of the segment of the continuous flexible line; and wherein delivering the predetermined or actively determined amount of the curing energy at least to the portion of the segment of the continuous flexible line at the controlled rate comprises partially curing a first layer of the segment of the continuous flexible line as the first layer is being deposited and further curing the first layer as a second layer is being deposited against the first layer.

10. The method according to claim 1, further comprising, while advancing the continuous flexible line toward the print path, delivering a predetermined or actively determined amount of curing energy at least to a portion of the segment of the continuous flexible line at a controlled rate after the segment of the continuous flexible line is deposited along the print path to at least partially cure at least the portion of the segment of the continuous flexible line; and wherein delivering the predetermined or actively determined amount of the curing energy at least to the portion of the segment of the continuous flexible line at the controlled rate comprises curing less than an entirety of the composite part.

11. The method according to claim 1, further comprising, while advancing the continuous flexible line toward the print path, delivering a predetermined or actively determined amount of curing energy at least to a portion of the segment of the continuous flexible line at a controlled rate after the segment of the continuous flexible line is deposited along the print path to at least partially cure at least the portion of the segment of the continuous flexible line; and wherein delivering the predetermined or actively determined amount of the curing energy at least to the portion of the segment of the continuous flexible line at the controlled rate comprises selectively varying at least one of a delivery rate or a delivery duration of the curing energy to impart varying physical characteristics to the composite part.

12. The method according to claim 1, further comprising:
while advancing the continuous flexible line toward the print path, delivering a predetermined or actively determined amount of curing energy at least to a portion of the segment of the continuous flexible line at a controlled rate after the segment of the continuous flexible line is deposited along the print path to at least partially cure at least the portion of the segment of the continuous flexible line; and
simultaneously with delivering the predetermined or actively determined amount of the curing energy at least to the portion of the segment of the continuous flexible line at the controlled rate, at least partially protecting at least the portion of the segment of the continuous flexible line from environmental exposure after the segment exits the delivery guide.

13. The method according to claim 1, further comprising maintaining the thermosetting resin below a threshold temperature at least prior to applying the thermosetting resin to the non-resin component.

14. The method according to claim 13, wherein the threshold temperature is no greater than 20° C.

15. The method according to claim 1, further comprising maintaining the thermosetting-resin component below a threshold temperature prior to depositing the segment of the continuous flexible line along the print path.

16. The method according to claim 1, wherein depositing the segment of the continuous flexible line along the print path comprises layering the continuous flexible line against itself to additively manufacture the composite part.

17. The method according to claim 1, wherein depositing the segment of the continuous flexible line along the print path comprises depositing the continuous flexible line in a predetermined pattern to selectively control one or more physical characteristics of the composite part.

18. The method according to claim 1, further comprising, simultaneously with depositing the segment of the continuous flexible line along the print path, compacting at least a section of the segment of the continuous flexible line after the segment of the continuous flexible line is deposited along the print path.

19. The method according to claim 18, wherein compacting at least the section of the segment of the continuous flexible line after the segment of the continuous flexible line is deposited along the print path comprises heating the section of the segment of the continuous flexible line to at least partially cure at least the section of the segment of the continuous flexible line.

20. The method according to claim 18, wherein compacting at least the section of the segment of the continuous flexible line after the segment of the continuous flexible line is deposited along the print path comprises imparting a desired cross-sectional shape to the segment of the continuous flexible line.

21. The method according to claim 1, further comprising, simultaneously with depositing the segment of the continuous flexible line along the print path, roughening at least a section of the segment of the continuous flexible line after the segment of the continuous flexible line is deposited along the print path.

22. The method according to claim 21, further comprising, simultaneously with roughening at least the section of the segment of the continuous flexible line, collecting debris, resulting from roughening at least the section of the segment of the continuous flexible line.

23. The method according to claim 21, further comprising, simultaneously with roughening at least the section of the segment of the continuous flexible line, dispersing debris, resulting from roughening at least the section of the segment of the continuous flexible line.

24. The method according to claim 21, wherein roughening at least the section of the segment of the continuous flexible line after the segment of the continuous flexible line is deposited along the print path comprises heating the section of the segment of the continuous flexible line to at least partially cure at least the section of the segment of the continuous flexible line.

25. The method according to claim 1, further comprising selectively cutting the continuous flexible line, and wherein the continuous flexible line is selectively cut simultaneously with depositing the segment of the continuous flexible line along the print path.

26. The method according to claim 1, wherein:
the continuous flexible line is a first continuous flexible line;
the segment of the continuous flexible line is a first segment of the first continuous flexible line;
the method further comprises depositing a second segment of a second continuous flexible line along the print path; and
the second continuous flexible line comprises at least one component that differs from at least one component of the first continuous flexible line.

27. The method according to claim 1, further comprising texturing the continuous flexible line as the continuous flexible line is being deposited.

28. The method according to claim 1, wherein:
at least one of the opposing rollers comprises a circumferential channel that contacts the continuous flexible line, and
the scraper comprises a projection that removes from the circumferential channel the residue of the thermosetting-resin component, produced by the engagement between the circumferential channel and the continuous flexible line as the opposing rollers rotate to translate the continuous flexible line to push the continuous flexible line through the delivery guide.

29. The method according to claim 1, further comprising, simultaneously with depositing the segment of the continuous flexible line along the print path, detecting defects in the composite part.

30. The method according to claim 1, wherein:
depositing the segment of the continuous flexible line along the print path comprises depositing at least a portion of the segment of the continuous flexible line over one or more sacrificial layers; and
the method further comprises removing the one or more sacrificial layers to form the composite part.

31. The method according to claim 1, further comprising curing the composite part in an autoclave or in an oven.

32. The method according to claim 1, wherein depositing the segment of the continuous flexible line along the print path is performed within a chamber that is either positively pressurized or negatively pressurized relative to atmospheric pressure.

33. The method according to claim 1, wherein:
depositing the segment of the continuous flexible line along the print path comprises initially depositing the segment of the continuous flexible line against a surface; and
the method further comprises heating the surface.

34. The method according to claim 1, wherein:
depositing the segment of the continuous flexible line along the print path comprises initially depositing the segment of the continuous flexible line against a surface; and
the method further comprises applying a vacuum to the surface.

35. A method of additively manufacturing a composite part, the method comprising:
applying a thermosetting resin to a non-resin component to create a continuous flexible line by pulling the non-resin component through a first resin-part applicator, in which a first quantity of a first part of the thermosetting resin is applied to the non-resin component, and by pulling the non-resin component through a second resin-part applicator, in which a second quantity of a second part of the thermosetting resin is applied to at least a portion of the first quantity of the first part of the thermosetting resin, applied to the non-resin component;
routing the continuous flexible line into a delivery guide;
depositing, via the delivery guide, a segment of the continuous flexible line along a print path; and
while advancing the continuous flexible line toward the print path, delivering a ring of curing energy that intersects at least a portion of the segment of the continuous flexible line to at least partially cure at least the portion of the segment of the continuous flexible line, and wherein the ring of the curing energy is delivered by at least one galvanometer mirror-positioning system.

36. The method according to claim 35, wherein delivering the ring of curing energy comprises partially curing a first layer of the segment of the continuous flexible line as the first layer is being deposited and further curing the first layer as a second layer is being deposited against the first layer.

37. The method according to claim 35, wherein delivering the ring of curing energy comprises curing less than an entirety of the composite part.

38. The method according to claim 35, further comprising restrictively curing at least a portion of the composite part (102).

39. The method according to claim 38, wherein the portion of the composite part is restrictively cured to facilitate subsequent processing of the portion.

40. The method according to claim 35, wherein:
delivering the ring of the curing energy comprises selectively varying at least one of a delivery rate or a delivery duration of the curing energy to impart varying physical characteristics to the composite part; and
the varying physical characteristics comprise at least one of strength, stiffness, flexibility, ductility, or hardness.

41. The method according to claim 35, further comprising, simultaneously with delivering the ring of the curing energy, at least partially protecting at least the portion of the segment of the continuous flexible line from environmental exposure after the segment exits the delivery guide.

42. The method according to claim 41, wherein at least the portion of the segment of the continuous flexible line is at least partially protected from the environmental exposure with a shielding gas.

43. The method according to claim 35, wherein:
at least one of depositing the segment of the continuous flexible line along the print path or delivering the ring of the curing energy provides different physical characteristics at different locations of the composite part; and
the physical characteristics comprise at least one of strength, stiffness, flexibility, ductility, or hardness.

* * * * *

UNITED STATES PATENT AND TRADEMARK OFFICE
CERTIFICATE OF CORRECTION

PATENT NO. : 10,179,446 B2
APPLICATION NO. : 15/063417
DATED : January 15, 2019
INVENTOR(S) : Nick S. Evans et al.

It is certified that error appears in the above-identified patent and that said Letters Patent is hereby corrected as shown below:

In the Claims

Claim 38, Column 80, Line 33, delete "(102)".

Signed and Sealed this
Twenty-sixth Day of February, 2019

Andrei Iancu
*Director of the United States Patent and Trademark Office*